United States Patent
Zhou et al.

(10) Patent No.: US 12,544,578 B2
(45) Date of Patent: Feb. 10, 2026

(54) VENTRICULAR CONDUCTION SYSTEM PACING THERAPY CONTROL

(71) Applicant: Medtronic, Inc., Minneapolis, MN (US)

(72) Inventors: Xiaohong Zhou, Woodbury, MN (US); Wade M. Demmer, Coon Rapids, MN (US); Robert W. Stadler, Shoreview, MN (US)

(73) Assignee: Medtronic, Inc., Minneapolis, MN (US)

( * ) Notice: Subject to any disclaimer, the term of this patent is extended or adjusted under 35 U.S.C. 154(b) by 793 days.

(21) Appl. No.: 17/735,628

(22) Filed: May 3, 2022

(65) Prior Publication Data

US 2022/0362558 A1  Nov. 17, 2022

Related U.S. Application Data

(60) Provisional application No. 63/188,795, filed on May 14, 2021.

(51) Int. Cl.
*A61N 1/365* (2006.01)
*A61N 1/37* (2006.01)

(52) U.S. Cl.
CPC ......... *A61N 1/36592* (2013.01); *A61N 1/365* (2013.01); *A61N 1/3712* (2013.01)

(58) Field of Classification Search
CPC ... A61N 1/36592; A61N 1/365; A61N 1/3712
See application file for complete search history.

(56) References Cited

U.S. PATENT DOCUMENTS

| 8,050,756 | B2 | 11/2011 | Zhu et al. |
| 8,467,871 | B2 | 6/2013 | Maskara |
| 8,538,521 | B2 | 9/2013 | Zhu et al. |
| 8,838,237 | B1 | 9/2014 | Niazi |
| 8,954,138 | B2 | 2/2015 | Maskara et al. |
| 9,352,159 | B2 | 5/2016 | Fishel |
| 10,850,108 | B2 | 12/2020 | Li et al. |
| 2003/0083710 | A1* | 5/2003 | Ternes ............... A61N 1/36843 607/27 |

(Continued)

FOREIGN PATENT DOCUMENTS

CN   111405925 A   *  7/2020   ............. A61N 1/056

OTHER PUBLICATIONS

Zhou, et al., U.S. Appl. No. 62/876,634, filed Jul. 20, 2019, 67 pages.

(Continued)

*Primary Examiner* — James M Kish
*Assistant Examiner* — Laura Hodge

(57) ABSTRACT

A medical device is configured to sense at least one cardiac electrical signal and generate pacing pulses according to a first pacing therapy by generating pacing pulses for delivery to a first combination of ventricular pacing sites including at least one ventricular conduction system pacing site. The medical device may be configured to determine a ventricular conduction condition based on a QRS signal feature of the sensed cardiac signal during the first pacing therapy. The medical device may change to a second pacing therapy different than the first pacing therapy based on the determined ventricular conduction condition.

21 Claims, 17 Drawing Sheets

(56) References Cited

U.S. PATENT DOCUMENTS

| | | | |
|---|---|---|---|
| 2009/0192562 A1* | 7/2009 | Corbucci | A61B 5/4836 |
| | | | 607/25 |
| 2011/0202102 A1 | 8/2011 | Blomqvist | |
| 2012/0310101 A1 | 12/2012 | Patangay et al. | |
| 2013/0131751 A1* | 5/2013 | Stadler | A61N 1/36842 |
| | | | 607/25 |
| 2016/0339247 A1* | 11/2016 | Ghosh | A61N 1/36592 |
| 2017/0100594 A1* | 4/2017 | Huelskamp | A61N 1/36542 |
| 2017/0246460 A1 | 8/2017 | Ghosh | |
| 2018/0126173 A1* | 5/2018 | Ternes | A61N 1/056 |
| 2018/0161580 A1* | 6/2018 | Demmer | A61N 1/3682 |
| 2018/0361166 A1* | 12/2018 | Nabutovsky | A61N 1/3627 |
| 2019/0083800 A1 | 3/2019 | Yang et al. | |
| 2019/0111264 A1 | 4/2019 | Zhou | |
| 2019/0111270 A1 | 4/2019 | Zhou | |
| 2019/0126040 A1* | 5/2019 | Shuros | A61N 1/362 |
| 2020/0046984 A1 | 2/2020 | Sambelashvili et al. | |
| 2020/0129772 A1 | 4/2020 | Casavant et al. | |
| 2020/0179705 A1* | 6/2020 | Ternes | A61N 1/3702 |
| 2020/0353265 A1 | 11/2020 | Ghosh et al. | |
| 2021/0015389 A1 | 1/2021 | Zhou et al. | |
| 2021/0015390 A1 | 1/2021 | Zhou et al. | |
| 2021/0085986 A1 | 3/2021 | Li et al. | |
| 2022/0023640 A1 | 1/2022 | Zhou et al. | |

OTHER PUBLICATIONS

Zhou, et al., U.S. Appl. No. 63/057,263, filed Jul. 27, 2020, 83 pages.
Zhou, et al., U.S. Appl. No. 63/112,980, filed Nov. 12, 2020, 131 pages.
(PCT/US2022/028007) PCT Notification of Transmittal of the International Search Report and the Written Opinion of the International Searching Authority, Mailed Aug. 4, 2022, 11 pages.
Goodyer W. et al., "Fates Aligned: Origins and Mechanisms of Ventricular Conduction System and Ventricular Wall Development," Pediatr Cardiol. Mar. 28, 2018;39(6):1090-1098.

* cited by examiner

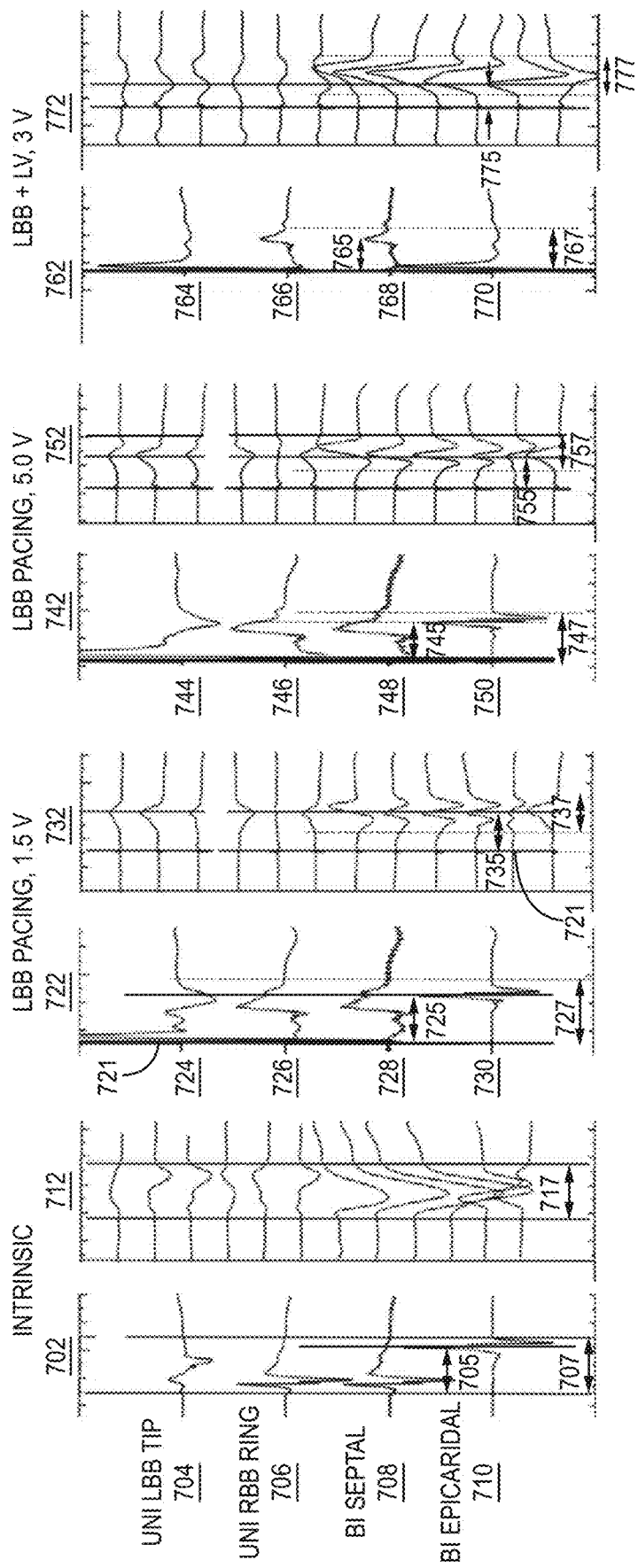

VENTRICULAR CONDUCTION SYSTEM PACING THERAPY CONTROL

REFERENCE TO RELATED APPLICATIONS

This application claims the benefit of provisional U.S. Patent Application No. 63/188,795, filed on May 14, 2021, incorporated herein by reference in its entirety.

TECHNICAL FIELD

This disclosure relates to a system for controlling changes between pacing therapies in a medical device for delivering ventricular conduction system pacing.

BACKGROUND

During normal sinus rhythm (NSR), the heartbeat is regulated by electrical signals produced by the sino-atrial (SA) node located in the right atrial wall. Each depolarization signal produced by the SA node spreads across the atria, causing the depolarization and contraction of the atria, and arrives at the atrioventricular (AV) node. The AV node responds by propagating a depolarization signal through the bundle of His of the atrioventricular septum and thereafter to the left and right bundle branches and the Purkinje muscle fibers of the right and left ventricles, sometimes referred to as the "His-Purkinje system."

Patients with a conduction system abnormality, e.g., poor AV node conduction, poor SA node function, or other conduction abnormalities, may receive a pacemaker to restore a more normal heart rhythm and heart chamber synchrony. Ventricular pacing may be performed to maintain the ventricular rate in a patient having atrioventricular conduction abnormalities. A single chamber ventricular pacemaker may be coupled to a transvenous ventricular lead carrying electrodes placed in the right ventricle (RV), e.g., in the right ventricular apex. The pacemaker itself is generally implanted in a subcutaneous pocket with the transvenous ventricular lead tunneled to the subcutaneous pocket. Intracardiac pacemakers have been introduced or proposed for implantation entirely within a patient's heart, eliminating the need for transvenous leads. An intracardiac pacemaker may provide sensing and pacing from within a chamber of the patient's heart, e.g., from within the right ventricle in a patient having AV conduction block.

Dual chamber pacemakers are available which include a transvenous atrial lead carrying electrodes which are placed in the right atrium and a transvenous ventricular lead carrying electrodes that are placed in the right ventricle via the right atrium. A dual chamber pacemaker senses atrial electrical signals and ventricular electrical signals and can provide both atrial pacing and ventricular pacing as needed to promote a normal atrial and ventricular rhythm and promote AV synchrony when SA and/or AV node or other conduction abnormalities are present.

SUMMARY

The techniques of this disclosure generally relate to methods for controlling ventricular conduction system (VCS) pacing according to different types of VCS pacing therapies to improve electrical synchrony of the heart. Each VCS pacing therapy may include a selected combination of ventricular pacing sites including at least one ventricular conduction system pacing site. A processor of the medical device system is configured to receive and analyze cardiac electrical signals for selecting a VCS pacing therapy according to a determined ventricular conduction condition. In various examples, the cardiac electrical signals may be sensed during an intrinsic ventricular rhythm, when no ventricular pacing pulses are delivered to any VCS or ventricular myocardial pacing site, for determining an intrinsic ventricular conduction condition. The cardiac electrical signals may be sensed during pacing at fewer pacing sites than the combination of pacing sites of the currently selected VCS pacing therapy for determining an improvement or correction of an abnormal ventricular conduction condition. The cardiac electrical signals may be sensed during ventricular pacing according to the currently selected VCS pacing therapy using multiple pacing control parameter settings for controlling the timing of the pacing pulses delivered to each pacing site of the currently selected VCS pacing therapy for detecting an uncorrected abnormal ventricular conduction condition. Based on an analysis of the sensed cardiac electrical signals, the processor may determine the ventricular conduction condition and select a VCS pacing therapy based on the ventricular conduction condition.

In one example, the disclosure provides a medical device including a sensing circuit configured to sense at least one cardiac electrical signal and a therapy delivery circuit configured to generate pacing pulses according to a first pacing therapy by generating pacing pulses for delivery to a combination of ventricular pacing sites including at least one ventricular conduction system pacing site. The medical device includes a control circuit configured to control the therapy delivery circuit to withhold a pacing pulse from at least one ventricular pacing site of the combination of ventricular pacing sites for at least one ventricular cycle, determine a QRS signal feature from the at least one cardiac electrical signal sensed by the sensing circuit during the at least one ventricular cycle, and determine a ventricular conduction condition based on the QRS signal feature. The therapy delivery circuit may be configured to generate pacing pulses according to a second pacing therapy different than the first pacing therapy based on the ventricular conduction condition determined by the control circuit.

In another example, the disclosure provides a method including sensing at least one cardiac electrical signal, generating pacing pulses according to a first pacing therapy by generating pacing pulses for delivery to a combination of ventricular pacing sites including at least one ventricular conduction system pacing site, withholding a pacing pulse from at least one ventricular pacing site of the combination of ventricular pacing sites for at least one ventricular cycle, determining a QRS signal feature from the at least one cardiac electrical signal sensed by the sensing circuit during the at least one ventricular cycle, and determining a ventricular conduction condition based on the QRS signal feature. The method may include generating pacing pulses according to a second pacing therapy different than the first pacing therapy based on the determined ventricular conduction condition.

In another example, the disclosure provides a non-transitory computer readable medium storing instructions which, when executed by a control circuit of a medical device, cause the medical device to sense at least one cardiac electrical signal, generate pacing pulses according to a first pacing therapy by generating pacing pulses for delivery to a combination of ventricular pacing sites comprising at least one ventricular conduction system pacing site, withhold a pacing pulse from at least one ventricular pacing site of the combination of ventricular pacing sites for at least one ventricular cycle, determine a QRS signal feature from the at least one cardiac electrical signal sensed by the sensing circuit during the at least one ventricular cycle, and determine a ventricular conduction condition based on the QRS signal feature. The instructions may further cause the medical device to generate pacing pulses according to a second pacing therapy different than the first pacing therapy based on the determined ventricular conduction condition.

Further disclosed herein is the subject matter of the following clauses

1. A medical device, comprising:
    a sensing circuit configured to sense at least one cardiac electrical signal;
    a therapy delivery circuit configured to generate pacing pulses according to a first pacing therapy by generating pacing pulses for delivery to a first combination of ventricular pacing sites comprising at least a first ventricular conduction system pacing site; and
    a control circuit configured to:
        control the therapy delivery circuit to withhold a pacing pulse from at least one ventricular pacing site of the first combination of ventricular pacing sites for at least one ventricular cycle;
        determine a QRS signal feature from the at least one cardiac electrical signal sensed by the sensing circuit during the at least one ventricular cycle; and
        determine a ventricular conduction condition based on the QRS signal feature;
    wherein the therapy delivery circuit is configured to generate pacing pulses according to a second pacing therapy different than the first pacing therapy based on the ventricular conduction condition determined by the control circuit.

2. The medical device of clause 1, wherein the therapy delivery circuit is configured to generate the pacing pulses for delivery to the first ventricular conduction system pacing site comprises generating pacing pulses for delivery to a left bundle branch.

3. The medical device of any of clauses 1-2, wherein:
    the therapy delivery circuit is configured to generate the pacing pulses according to the first pacing therapy by generating pacing pulses for capturing the first combination of ventricular pacing sites during a first percentage of ventricular cycles; and
    the control circuit is configured to:
        control the therapy delivery circuit to withhold a pacing pulse from at least one ventricular pacing site by withholding a pacing pulse from each ventricular pacing site of the first combination of ventricular pacing sites; and
        determine the ventricular conduction condition by determining a normal intrinsic ventricular conduction condition based on the QRS signal feature; and
    the therapy delivery circuit is configured to:
        generate the pacing pulses according to the second pacing therapy by generating pacing pulses for capturing the first combination of ventricular pacing sites during a second percentage of ventricular cycles that is less than the first percentage of ventricular cycles in response to the control circuit determining the normal intrinsic ventricular conduction condition.

4. The medical device of clause 3, wherein:
    the control circuit is further configured to:
        determine a heart rate from the at least one cardiac electrical signal sensed by the sensing circuit; and
        determine that the heart rate is less than a threshold rate; and
    the therapy delivery circuit is configured to generate the pacing pulses according to the second pacing therapy by withholding generating pacing pulses for capturing the first combination of ventricular pacing sites in response to the control circuit determining that the heart rate is less than the threshold rate.

5. The medical device of any of clauses 1-4, further comprising an activity sensor sensing a patient activity signal,
    wherein the control circuit is further configured to:
        determine a pacing rate based on the patient activity signal, and
        determine when the pacing rate is less than a threshold rate; and
    wherein the therapy delivery circuit is configured to generate the pacing pulses according to the second pacing therapy by withholding generating pacing pulses for capturing the first combination of ventricular pacing sites in response to the control circuit determining that the pacing rate is less than the threshold rate.

6. The medical device of any of clauses 1-5, wherein:
    the control circuit is further configured to determine a time of day; and
    the therapy delivery circuit is configured to generate the pacing pulses according to the second pacing therapy by withholding generating the pacing pulses for capturing the first combination of ventricular pacing sites based on the time of day.

7. The medical device of any of clauses 1-6, wherein the therapy delivery circuit is configured to generate pacing pulses for delivery to the first combination of ventricular pacing sites by generating pacing pulses for delivery to the first ventricular conduction system pacing site and at least one of a second ventricular conduction system pacing site and a myocardial pacing site.

8. The medical device of any of clauses 1-7, wherein:
    the control circuit is further configured to determine when ventricular conduction block is occurring during the second pacing therapy; and
    the therapy delivery circuit is configured to generate the pacing pulses according to the second pacing therapy by generating pacing pulses for delivery to the first combination of ventricular pacing sites when the control circuit determines that the ventricular conduction block is occurring and withholding generating the pacing pulses during the second pacing therapy when the control circuit determines that the ventricular conduction block is not occurring.

9. The medical device of any of clauses 1-7, wherein:
    the control circuit is further configured to detect ventricular conduction block during the second pacing therapy; and
    the therapy delivery circuit is configured to change from generating the pacing pulses according to the second pacing therapy to generating pacing pulses according to the first pacing therapy in response to the control circuit detecting the ventricular conduction block during the second pacing therapy.

10. The medical device of any of clauses 1-2, wherein the therapy delivery circuit is configured to generate the pacing pulses according to the second pacing therapy by generating pacing pulses for delivery to a second combination of ventricular pacing sites, wherein the second combination of ventricular pacing sites is different than the first combination of ventricular pacing sites.

11. The medical device of clause 10, wherein:
 the therapy delivery circuit is configured to generate pacing pulses for delivery to the first combination of ventricular pacing sites by generating pacing pulses for delivery to the first ventricular conduction system pacing site and at least one of a second ventricular conduction system pacing site and a myocardial pacing site;
 the control circuit is configured to:
  determine the ventricular conduction condition to be a corrected ventricular conduction block condition based on the QRS signal feature determined from the at least one cardiac electrical signal sensed by the sensing circuit during the at least one ventricular cycle;
 the therapy delivery circuit is configured to generate pacing pulses according to the second pacing therapy by generating pacing pulses for delivery to the second combination of ventricular pacing sites comprising fewer ventricular pacing sites than the first combination of ventricular pacing sites in response to the control circuit determining the corrected ventricular conduction block condition.

12. The medical device of clause 11, wherein the control circuit is configured to determine the corrected ventricular conduction block condition to be a corrected bundle branch block condition,
 wherein the therapy delivery circuit is configured to generate the pacing pulses according to the second pacing therapy by generating pacing pulses for delivery to the second combination of ventricular pacing sites comprising only the first ventricular conduction system pacing site.

13. The medical device of any of clauses 1-12, wherein:
 the therapy delivery circuit is further configured to generate each pacing pulse according to the first pacing therapy by generating each pacing pulse at an expiration of a pacing interval; and
 the control circuit is further configured to:
  control the therapy delivery circuit during the first pacing therapy to generate a test pacing pulse for delivery to at least one ventricular pacing site of the first combination of ventricular pacing sites at an expiration of each one of a plurality of test pacing intervals;
  determine a QRS signal feature from the cardiac electrical signal sensed by the sensing circuit following each of the test pacing pulses;
  determine a corrected ventricular conduction block condition associated with one test pacing interval of the plurality of test pacing intervals based on the determined QRS signal features; and
  set the pacing interval to the one test pacing interval associated with the corrected bundle branch block condition.

14. The medical device of any of clauses 1-12, wherein:
 the therapy delivery circuit is further configured to deliver each pacing pulse according to the first pacing therapy by generating each pacing pulse at an expiration of a pacing interval; and
 the control circuit is further configured to:
  control the therapy delivery circuit during the first pacing therapy to generate a test pacing pulse to at least one ventricular pacing site of the first combination of ventricular pacing sites at an expiration of each one of a plurality of test pacing intervals;
  determine a QRS signal feature from the cardiac electrical signal sensed by the sensing circuit following each of the test pacing pulses; and
  determine an uncorrected ventricular conduction block condition associated with each test pacing interval of the plurality of test pacing intervals based on the determined QRS signal features; and
 wherein the therapy delivery circuit is configured to generate pacing pulses according to a third pacing therapy different than the first pacing therapy in response to the control circuit determining the uncorrected ventricular conduction block condition, wherein the third pacing therapy comprises a third combination of ventricular pacing sites including more ventricular pacing sites than the first combination of ventricular pacing sites.

15. The medical device of clause 14, wherein the therapy delivery circuit is configured to generate pacing pulses according to the third pacing therapy comprises generating pacing pulses for delivery to at least the first ventricular conduction system pacing site and at least one of a second ventricular conduction system pacing site and a ventricular myocardial pacing site.

16. The medical device of any of clauses 13-15, wherein the therapy delivery circuit is configured to set the pacing interval to one of an atrioventricular delay and a ventricular-to-ventricular delay.

17. The medical device of any of clauses 1-16, wherein the control circuit is configured to determine the QRS signal feature by determining at least one of:
 a QRS width, a peak amplitude, a peak amplitude time, a maximum positive slope, a maximum negative slope, a maximum positive slope time, a maximum negative slope time, a QRS area, and a peak polarity.

18. The medical device of any of clauses 1-17, wherein:
 the sensing circuit is configured to sense a first cardiac electrical signal from a first sensing electrode vector and a second cardiac electrical signal from a second sensing electrode vector;
 the control circuit is configured to determine the QRS signal feature by determining an activation time difference as a time interval from a first fiducial point of a first QRS signal of the first cardiac electrical signal to a second fiducial point of a second QRS signal of the second cardiac electrical signal; and
 determine the ventricular conduction condition based on the activation time difference.

19. The medical device of any of clauses 1-18, wherein the control circuit is further configured to:
 control the therapy delivery circuit during the first pacing therapy to generate a capture test pacing pulse for delivery to each ventricular pacing site of the first combination of ventricular pacing sites at a premature pacing interval; and
 verify capture of each ventricular pacing site based on the at least one cardiac electrical signal sensed by the sensing circuit following each of the capture test pacing pulses.

20. The medical device of any of clauses 1-18, wherein:
 the control circuit is further configured to:
  control the therapy delivery circuit during the first pacing therapy to generate a capture test pacing pulse for delivery to each ventricular pacing site of the first combination of ventricular pacing sites at a premature pacing interval; and
  determine loss of capture of at least one ventricular pacing site based on the at least one cardiac electrical signal sensed by the sensing circuit following each of the capture test pacing pulses; and the therapy delivery circuit is configured to adjust at least one of a pacing pulse amplitude, pacing pulse width, and pacing electrode vector for delivering generated pacing pulses to the at least one ventricular pacing site associated with the determined loss of capture.

21. A method, comprising:
sensing at least one cardiac electrical signal;
generating pacing pulses according to a first pacing therapy by generating pacing pulses for delivery to a first combination of ventricular pacing sites comprising at least a first ventricular conduction system pacing site;
withholding a pacing pulse from at least one ventricular pacing site of the first combination of ventricular pacing sites for at least one ventricular cycle;
determining a QRS signal feature from the at least one cardiac electrical signal sensed by the sensing circuit during the at least one ventricular cycle;
determining a ventricular conduction condition based on the QRS signal feature; and
generating pacing pulses according to a second pacing therapy different than the first pacing therapy based on the determined ventricular conduction condition.

22. The method of clause 21, wherein generating pacing pulses for delivery to the first ventricular conduction system pacing site comprises generating pacing pulses for delivery to a left bundle branch.

23. The method of any of clauses 21-22, comprising:
generating the pacing pulses according to the first pacing therapy by generating pacing pulses for capturing the first combination of ventricular pacing sites during a first percentage of ventricular cycles;
withholding a pacing pulse from at least one ventricular pacing site of the first combination of ventricular pacing sites by withholding a pacing pulse from each ventricular pacing site of the first combination of ventricular pacing sites;
determining the ventricular conduction condition by determining a normal intrinsic ventricular conduction condition based on the QRS signal feature; and
generating the pacing pulses according to the second pacing therapy by generating pacing pulses for capturing the first combination of ventricular pacing sites during a second percentage of ventricular cycles that is less than the first percentage of ventricular cycles in response to determining the normal intrinsic ventricular conduction condition.

24. The method of clause 23, comprising:
determining a heart rate from the at least one cardiac electrical signal;
determining that the heart rate is less than a threshold rate; and
generating the pacing pulses according to the second pacing therapy by withholding pacing pulses for capturing the first combination of ventricular pacing sites, in response to the control circuit determining that the heart rate is less than the threshold rate.

25. The method of any of clauses 21-24, further comprising:
sensing a patient activity signal,
determine a pacing rate based on the patient activity signal,
determining that the pacing rate is less than a threshold rate; and
generating the pacing pulses according to the second pacing therapy by withholding generating pacing pulses for capturing the first combination of ventricular pacing sites, in response to the control circuit determining that the pacing rate is less than the threshold rate.

26. The method of any of clauses 21-25, further comprising:
determining a time of day; and
generating the pacing pulses according to the second pacing by withholding generating pacing pulses for capturing the first combination of ventricular pacing sites, based on the time of day.

27. The method of any of clauses 21-26, further comprising generating the pacing pulses for delivery to the first combination of ventricular pacing sites by generating pacing pulses for delivery to the first ventricular conduction system pacing site and at least one of a second ventricular conduction system pacing site and a myocardial pacing site.

28. The method of any of clauses 21-27, further comprising:
determine when ventricular conduction block is occurring during the second pacing therapy; and
generating the pacing pulses according to the second pacing therapy by generating pacing pulses for delivery to the first combination of ventricular pacing sites when the ventricular conduction block is determined to be occurring and withholding generating pacing pulses for delivery to the first combination of ventricular pacing sites when the ventricular conduction block is determined to not be occurring.

29. The method of any of clauses 21-27, further comprising:
detecting ventricular conduction block during the second pacing therapy; and
changing from generating pacing pulses according to the second pacing therapy to generating pacing pulses according to the first pacing therapy in response to detecting the ventricular conduction block during the second pacing therapy.

30. The method of any of clauses 21-22, further comprising:
generating the pacing pulses according to the second pacing therapy by generating pacing pulses for delivery to a second combination of ventricular pacing sites, wherein the second combination of ventricular pacing sites is different than the first combination of ventricular pacing sites.

31. The method of clause 30, further comprising:
generating pacing pulses for delivery to the first combination of ventricular pacing sites by generating pacing pulses for delivery to the first ventricular conduction system pacing site and at least one of a second ventricular conduction system pacing site and a myocardial pacing site;
determining the ventricular conduction condition to be a corrected ventricular conduction block condition based on the QRS signal feature determined from the at least one cardiac electrical signal sensed by the sensing circuit during the at least one ventricular cycle;
generating pacing pulses according to the second pacing therapy by generating pacing pulses for delivery to the second combination of ventricular pacing sites comprising fewer ventricular pacing sites than the first combination of ventricular pacing sites in response to the control circuit determining the corrected ventricular conduction block condition.

32. The method of clause 31, further comprising:
determining the corrected ventricular conduction block condition to be a corrected bundle branch block condition,
generating the pacing pulses according to the second pacing therapy by generating pacing pulses for delivery to the second combination of ventricular pacing sites comprising only the first ventricular conduction system pacing site.

33. The method of any of clauses 21-32, further comprising:
generating each pacing pulse according to the first pacing therapy by generating each pacing pulse at an expiration of a pacing interval; and
during the first pacing therapy, generating a test pacing pulse for delivery to at least one ventricular pacing site of the first combination of ventricular pacing sites at an expiration of each one of a plurality of test pacing intervals;
determining a QRS signal feature from the cardiac electrical signal sensed by the sensing circuit following each of the test pacing pulses;
determining a corrected ventricular conduction block condition associated with one test pacing interval of the plurality of test pacing intervals based on the determined QRS signal features; and
setting the pacing interval to the one test pacing interval associated with the corrected bundle branch block condition.

34. The method of any of clauses 21-32, further comprising:
generating each pacing pulse according to the first pacing therapy by generating each pacing pulse at an expiration of a pacing interval;
during the first pacing therapy, generating a test pacing pulse to at least one ventricular pacing site of the first combination of ventricular pacing sites at an expiration of each one of a plurality of test pacing intervals;
determining a QRS signal feature from the cardiac electrical signal sensed by the sensing circuit following each of the test pacing pulses; and
determining an uncorrected ventricular conduction block condition associated with each test pacing interval of the plurality of test pacing intervals based on the determined QRS signal features; and
generating pacing pulses according to a third pacing therapy different than the first pacing therapy in response to the control circuit determining the uncorrected ventricular conduction block condition, wherein the third pacing therapy comprises a third combination of ventricular pacing sites including more ventricular pacing sites than the first combination of ventricular pacing sites.

35. The method of clause 34, wherein generating pacing pulses according to the third pacing therapy comprises generating pacing pulses for delivery to at least the first ventricular conduction system pacing site and at least one of a second ventricular conduction system pacing site and a ventricular myocardial pacing site.

36. The method of any of clauses 33-35, further comprising setting the pacing interval to one of an atrioventricular delay and a ventricular-to-ventricular delay.

37. The method of any of clauses 21-36, wherein determining the QRS signal feature comprises determining at least one of:
a QRS width, a peak amplitude, a peak amplitude time, a maximum positive slope, a maximum negative slope, a maximum positive slope time, a maximum negative slope time, a QRS area, and a peak polarity.

38. The method of any of clauses 21-37, further comprising:
sensing a first cardiac electrical signal from a first sensing electrode vector and a second cardiac electrical signal from a second sensing electrode vector;
determining the QRS signal feature by determining an activation time difference as a time interval from a first fiducial point of a first QRS signal of the first cardiac electrical signal to a second fiducial point of a second QRS signal of the second cardiac electrical signal; and
determining the ventricular conduction condition based on the activation time difference.

39. The method of any of clauses 21-38, further comprising:
during the first pacing therapy, generating a capture test pacing pulse to each ventricular pacing site of the first combination of ventricular pacing sites at a premature pacing interval; and
verifying capture of each ventricular pacing site based on the at least one cardiac electrical signal sensed by the sensing circuit following each of the capture test pacing pulses.

40. The method of any of clauses 21-38, further comprising:
during the first pacing therapy, generating a capture test pacing pulse for delivery to each ventricular pacing site of the first combination of ventricular pacing sites at a premature pacing interval;
determine loss of capture of at least one ventricular pacing site based on the at least one cardiac electrical signal sensed by the sensing circuit following each of the capture test pacing pulses; and
adjusting at least one of a pacing pulse amplitude, pacing pulse width, and pacing electrode vector for delivering generated pacing pulses to the at least one ventricular pacing site associated with the determined loss of capture.

41. A non-transitory, computer-readable medium storing a set of instructions which, when executed by a control circuit of a medical device, cause the medical device to:
sense at least one cardiac electrical signal;
generate pacing pulses according to a first pacing therapy by generating pacing pulses for delivery to a first combination of ventricular pacing sites comprising at least a first ventricular conduction system pacing site;
withhold a pacing pulse from at least one ventricular pacing site of the first combination of ventricular pacing sites for at least one ventricular cycle;
determine a QRS signal feature from the at least one cardiac electrical signal sensed by the sensing circuit during the at least one ventricular cycle; and
determine a ventricular conduction condition based on the QRS signal feature; and
generate pacing pulses according to a second pacing therapy different than the first pacing therapy based on the determined ventricular conduction condition.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 13 is a diagram of EGM signals and ECG signals that may be sensed and analyzed during an intrinsic ventricular cycle for determining a ventricular conduction condition as LBB block according to one example.

FIG. 14 is a diagram of EGM signals and ECG signals that may be sensed and analyzed following a LBB pacing pulse according to one example.

FIG. 15 is a diagram of EGM signals and ECG signals that may be sensed during LBB pacing therapy after adjusting LBB pacing control parameters to correct LBB block according to one example.

FIG. 16 is a diagram of EGM signals and ECG signals that may be sensed and analyzed for controlling changing from an LBB pacing therapy to a VCS plus left ventricular (LV) myocardial pacing therapy.

DETAILED DESCRIPTION

Figure 1:
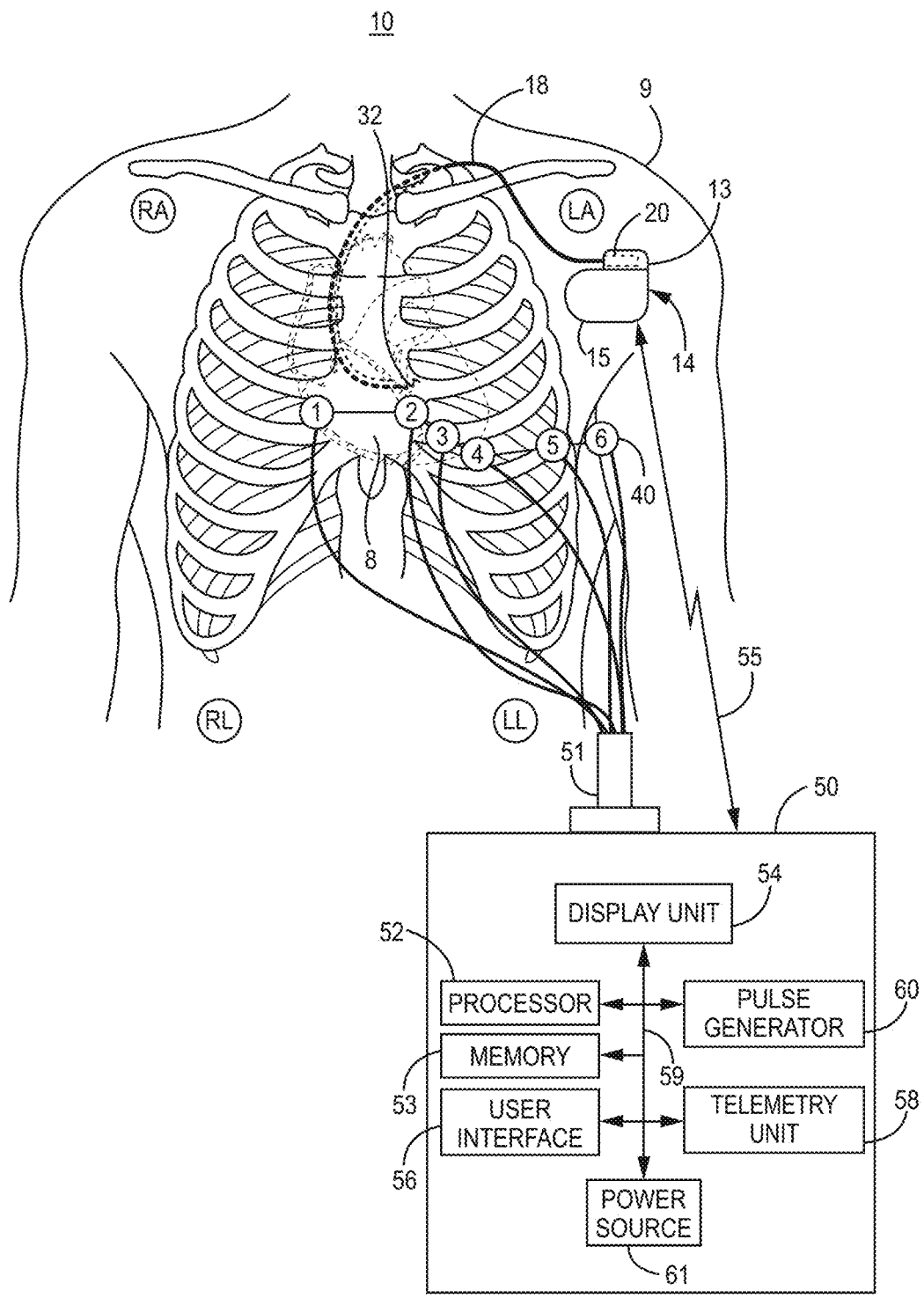
FIG. 1 is a conceptual diagram of one example of a medical device system for sensing and analyzing cardiac electrical signals and delivering cardiac pacing pulses according to the VCS pacing therapy techniques disclosed herein.

A medical device system capable of delivering different types of VCS pacing therapies to improve electrical synchrony of the heart is disclosed herein. Ventricular pacing via electrodes at or near the right ventricular apex has been found to be associated with increased risk of atrial fibrillation and heart failure. Alternative pacing sites along the VCS may provide a more physiological electrical activation of the heart along the heart's native conduction system. Pacing the ventricles via the His bundle or a bundle branch (BB), for example, allows recruitment along the heart's natural conduction system, including the Purkinje fibers. A processor of a medical device system as disclosed herein is configured to receive and analyze cardiac electrical signals for selecting a VCS pacing therapy for controlling the delivery of VCS pacing. The cardiac electrical signals may be sensed during an intrinsic ventricular rhythm, when no ventricular pacing pulses are delivered, and/or during ventricular pacing via the left bundle branch (LBB), right bundle branch (RBB) and/or ventricular myocardium. Based on the cardiac electrical signal analysis, the processor may select a VCS pacing therapy and may subsequently adjust pacing control parameters such as the pacing pulse output, pacing electrode configuration and/or a pacing interval.

As used herein, the term "VCS pacing therapy" refers to cardiac pacing delivered to a combination of ventricular pacing sites that includes at least one ventricular conduction system pacing site, e.g., the His bundle, LBB, RBB, Purkinje fibers, or any combination thereof. As such, references to "ventricular pacing" herein refer to pacing that is delivered to at least one ventricular conduction system pacing site and, in some examples, more than one ventricular conduction system pacing site or at least one ventricular conduction pacing site and at least one ventricular myocardial pacing site. When ventricular myocardial pacing is combined with a ventricular conduction system pacing site in a VCS pacing therapy, the ventricular myocardial pacing site may be any selected myocardial pacing location, such as the left ventricular lateral free wall, interventricular septum (right or left side), or a right ventricular location. The term "VCS pacing therapy" may additionally refer in general to how often VCS pacing is being delivered relative to intrinsically conducted ventricular cycles. A VCS pacing therapy may be associated with an intended ventricular pacing burden, e.g., a minimized ventricular pacing burden for promoting intrinsically conducted heart rhythms or a maximized ventricular pacing burden to promote electrical synchrony through VCS pacing. The ventricular pacing burden may be defined as a percentage of paced ventricular cycles out of all ventricular cycles during a given time period. During paced ventricular cycles, pacing pulses are delivered to the combination of pacing sites of the VCS pacing therapy (including at least one VCS pacing site).

For example, the intended ventricular pacing burden may refer to whether pacing is intended to be delivered a majority of the ventricular cycles or less than a majority of the ventricular cycles. For instance, a VCS pacing therapy may be intended to deliver pacing pulses to the combination of pacing sites including at least one ventricular conduction system pacing site (e.g., His bundle, LBB and/or RBB) on a beat-by-beat basis or relatively high percentage of ventricular cycles to promote ventricular electrical synchrony during most or a majority of ventricular cycles, which may include resting and non-resting heart rates. In other examples, the VCS pacing therapy may be intended to deliver pacing to the combination of pacing sites including at least one VCS pacing site during a relatively lower percentage of the ventricular cycles, e.g., less than a majority of the ventricular cycles, to promote intrinsic ventricular depolarization during a higher percentage or a majority of ventricular cycles. According to the techniques disclosed herein, a VCS pacing therapy including a combination of at least one ventricular conduction system pacing site and an intended ventricular pacing burden may be selected by a medical device processor based on a determination of a ventricular conduction condition determined by the processor through analysis of sensed cardiac electrical signals.

As used herein, the term "ventricular conduction condition" refers generally to the rate or propagation of conduction of electrical depolarizations along the His-Purkinje conduction system, also referred to herein as the "ventricular conduction system." The ventricular conduction condition may be "normal" when intrinsic electrical activation of the ventricles occurs synchronously, e.g., as evidenced by a relatively narrow QRS waveform, and at a relatively short electrical activation time following an atrial electrical event or a ventricular pacing pulse with relatively small electrical activation time differences between different ventricular sensing sites. The ventricular conduction condition may be "abnormal" when the electrical depolarization is slowed, delayed or completely blocked along the VCS, e.g., as evidenced by a relatively wide QRS waveform, a relatively long electrical activation time following an atrial electrical event or a ventricular pacing pulse, relatively large electrical activation time differences between different ventricular sensing sites or other QRS signal abnormalities.

An abnormal ventricular conduction condition may be due to a slowed, delayed or blocked propagation of VCS depolarization wavefront anywhere along the His-Purkinje system and/or myocardial tissue, which may include multiple sites along the His-Purkinje system and/or myocardial tissue. For example, an abnormal ventricular conduction condition may be an LBB block condition when conduction through the LBB is delayed or blocked. An abnormal ventricular conduction condition may be an RBB block condition when conduction through the RBB is delayed or blocked. Bilateral or dual BB block may exist when conduction through both the RBB and LBB is delayed or blocked. An LV conduction delay may exist when the activation time difference between the electrical activation time at an LBB sensing site or RBB sensing site and the electrical activation time at an LV myocardial sensing site, e.g., along the LV lateral wall, is relatively long.

The ventricular conduction condition may be determined by a medical device processor according to the techniques disclosed herein. The ventricular conduction condition may be determined based on an analysis of sensed cardiac electrical signals, e.g., based on an analysis of QRS signal features from one or more sensed cardiac electrical signals. The sensed cardiac signals may be intrinsic QRS signals or signal features determined from a cardiac electrical signal that is sensed by the medical device when ventricular pacing is withheld.

In other instances pacing evoked QRS signals and/or signal features may be analyzed when ventricular pacing is delivered to at least one pacing site. Pacing pulses may be withheld from other pacing sites of a combination of multiple pacing sites of a given VCS pacing therapy in order to sense the cardiac electrical signal during pacing at a limited number of pacing sites, e.g., less than all of the pacing sites of the combination of pacing sites of the VCS pacing therapy. For instance, if the VCS pacing therapy includes LBB pacing and LV myocardial pacing sites, a LBB pacing pulse may be delivered but the LV myocardial pacing pulse may be withheld to sense a cardiac electrical signal following the LBB pacing pulse, determine QRS signal feature(s), and determine a ventricular conduction condition such as an LV conduction delay from the LBB pacing site to an LV myocardial site based on the QRS signal feature(s). In some cases, a conduction delay may exist distal to a VCS pacing site, requiring pacing at an additional VCS and/or ventricular myocardial pacing site to correct the conduction delay.

In some examples, a first pacing therapy that is selected in response to a ventricular conduction condition determined based on an analysis of intrinsic ventricular electrical signals may be changed to a second pacing therapy based on an analysis of paced ventricular electrical signals during the first pacing therapy in order to achieve greater ventricular electrical synchrony provided by the second pacing therapy compared to the first pacing therapy. The first pacing therapy may include a lower number of ventricular pacing sites and/or lower intended ventricular pacing burden compared to the second pacing therapy. In other instances, a first pacing therapy that is selected based on intrinsic ventricular electrical signals may be changed to a second pacing therapy in order to promote a greater degree of intrinsic conduction of ventricular depolarizations during the second pacing therapy compared to the first pacing therapy. The first pacing therapy may include a higher number of ventricular pacing sites and/or greater intended ventricular pacing burden compared to the second pacing therapy.

Each VCS pacing therapy is controlled according to multiple pacing control parameters, which may include a pacing mode, a pacing electrode configuration, and a pacing pulse output as examples. Pacing control parameters may be adjusted by the medical device during a given pacing therapy to improve the ventricular electrical synchrony achieved in response to the VCS pacing therapy as needed. The pacing control parameters may include an electrode configuration selected for pacing the ventricular pacing sites included in the selected VCS pacing therapy. As used herein, the term "pacing electrode configuration" refers to the number of pacing electrodes and their assigned polarities included in one or more unipolar and/or bipolar pacing electrode vectors selected for delivering ventricular pacing according to the ventricular pacing sites included in the selected pacing therapy. In some examples presented herein, the pacing electrode configuration includes at least one unipolar or bipolar electrode vector for delivering ventricular pacing to at least one bundle branch, e.g., the LBB or the RBB. A pacing electrode configuration may include additional electrodes for pacing both the LBB and the RBB or at least one bundle branch and the LV myocardium according to the selected pacing therapy. In some examples, the pacing electrode configuration may be adjusted during a given pacing therapy to promote reliable capture of ventricular pacing sites in accordance with the VCS pacing therapy based on determining capture or loss of capture at a given pacing site. For example, an electrode polarity may be changed from cathode to anode or vice versa, a unipolar vector may be changed to a bipolar vector, or a different electrode pair may be selected for pacing a given site included in the pacing therapy pacing sites in order to promote successful capture at the intended pacing site.

Another pacing control parameter that may be adjusted during a given VCS pacing therapy is the pacing pulse output. As used herein the term "pacing pulse output" refers to the pacing pulse amplitude and pulse width of a generated pacing pulse. For example, the pacing pulse output delivered via a given pacing electrode vector may be increased by increasing the pacing pulse amplitude and/or increasing the pacing pulse width. The pacing pulse output may be decreased by decreasing the pacing pulse amplitude and/or decreasing the pacing pulse width. The pacing pulse amplitude and pacing pulse width of a pacing pulse contribute to the pacing pulse energy delivered to a pacing site, which also depends on the pacing electrode impedance. The pacing pulse output or energy is required to be equal to or greater than a pacing capture threshold for causing depolarization of the intended pacing site. The pacing pulse output may be increased to promote capture and avoid loss of capture at a pacing site that is included in the selected VCS pacing therapy. Accordingly, the medical device performing techniques disclosed herein may be configured to determine the pacing capture threshold for a given pacing site, e.g., the LBB, the RBB or the LV myocardium, in order to select a pacing pulse amplitude and pacing pulse width that promotes capture at the given pacing site.

Other VCS pacing therapy control parameters include pacing intervals that may be used to control the timing of delivered pacing pulses, e.g., relative to a preceding pacing pulse or sensed cardiac event signals. The pacing intervals used to control the timing of the delivered pacing pulses are generally associated with a pacing mode. As used herein, the term "pacing mode" refers to the heart chamber(s) being paced, the heart chambers(s) being sensed and the pacing response to a sensed cardiac event signal, e.g., inhibited or triggered. As such, the pacing mode may be a dual chamber pacing mode including sensing and pacing in both the atrial and ventricular chambers and both inhibited and triggered pacing responses, sometimes referred to as a "DDD pacing mode." Ventricular pacing pulses may be delivered at desired ventricular pacing sites according to the selected pacing therapy and the timing of the ventricular pacing pulses may be controlled according to the DDD pacing mode, e.g., using a programmed atrioventricular (AV) delay to control the timing of ventricular pacing pulses delivered to at least one ventricular pacing site, to provide atrial synchronous ventricular pacing. The AV delay is the time interval from an atrial pacing pulse or a sensed atrial P-wave to a ventricular pacing pulse and is controlled by pace timing circuitry of the pacemaker. The AV delay may be set to 0 to 120 milliseconds (ms) as examples and may be set according to an individual patient's ventricular conduction condition.

In other examples, the ventricular pacing pulses may be delivered according to a ventricular demand pacing mode or a non-tracking pacing mode, e.g., a non-atrial tracking ventricular pacing mode (VVI, DVI, or DDI as examples). A non-atrial tracking ventricular pacing mode may be used during atrial fibrillation or atrial rates greater than an atrial tracking maximum rate limit. In this case, a pacing interval may be set to a lower rate interval (LRI) for controlling timing of the ventricular pacing pulses being delivered to selected pacing sites according to the VCS pacing therapy.

In some examples, the VCS pacing therapy may include a ventricular-to-ventricular (VV) delay set to control the time interval between pacing pulses delivered to a first ventricular pacing site, e.g., a first VCS pacing site, and a second ventricular pacing site, e.g., a second VCS pacing site or a ventricular myocardial pacing site, of the combination of pacing sites of the VCS pacing therapy. The VV delay, therefore, is the time interval controlled by pace timing circuitry of the pacemaker between ventricular pacing pulses delivered to two different ventricular pacing sites. The VV delay may be set to 0 to 80 ms, as examples, but may be tailored to the ventricular conduction condition of a given patient.

As used herein, the term "LBB pacing" refers to delivery of pacing pulses to or in the vicinity of the His bundle or LBB such that the LBB is at least partially or wholly captured by the pacing pulses. Accordingly a "LBB pacing site" or "LBB pacing location" may refer to a location in the tissue adjacent to the His-Purkinje system. The LBB pacing site may be accessed from the right ventricular septum such that a pacing electrode may be advanced toward the LBB pacing site. The term "RBB pacing" refers to delivery of pacing pulses to or in the vicinity of the His bundle or RBB such that the RBB is at least partially or wholly captured by the pacing pulses. The term "bilateral BB pacing" refers to delivery of pacing pulses via one or more than one pacing electrode vector for capturing both the LBB and the RBB. Bilateral BB pacing may also be referred to as "dual BB pacing." The selected pacing electrode configuration may depend on the pacing capture thresholds for the RBB and the LBB and the available electrodes coupled to the pacemaker.

As used herein, the term "bipolar bilateral BB pacing" refers to bilateral BB pacing using a single bipolar electrode pair that captures, at least partially or wholly, both the LBB and the RBB simultaneously by capturing one bundle branch via anodal capture at the pacing anode electrode and one bundle branch via cathodal capture at the pacing cathode electrode. Bilateral BB pacing may be achieved, however, using other pacing electrode configurations that include one pacing electrode vector, unipolar or bipolar, for pacing the RBB and a second pacing electrode vector, unipolar or bipolar, for pacing the LBB. Furthermore, in some instances, unipolar pacing of one bundle branch, right or left, may directly capture that bundle branch while virtual current or break excitation generated by the pacing electrode may excite the other bundle branch, potentially resulting in unipolar bilateral BB pacing, with capture of both the LBB and RBB. As such, bilateral BB pacing may be achieved using a single unipolar pacing electrode vector, a single bipolar pacing electrode vector, two bipolar pacing electrode vectors, two unipolar pacing electrode vectors, or one unipolar and one bipolar pacing electrode vectors in various pacing electrode configurations.

FIG. 1 is a conceptual diagram of a medical device system 10 for sensing and analyzing cardiac electrical signals and delivering cardiac pacing pulses according to one example. Medical device system 10 includes a pacemaker 14 implanted in a patient 9 and coupled to a BB pacing lead 18. BB pacing lead 18 is shown coupled to pacemaker 14 and advanced within a patient's heart 8 for positioning pacing tip electrode 32 within the interventricular septum in the vicinity of a BB, e.g., at an LBB pacing site or at an RBB pacing site. While tip electrode 32 is referred to herein as "BB pacing tip electrode 32," it is to be understood that the tip electrode 32 may be positioned along the His bundle or the left or right BB for pacing at least one VCS pacing site. Furthermore BB pacing tip electrode 32 and other "pacing electrodes" referred to herein are not necessarily used only for delivering pacing pulses. BB pacing tip electrode 32 and other electrodes included in various pacing electrode configurations described herein may also be used for sensing cardiac electrical signals. The terms "pacing electrode," "pacing tip electrode," and "pacing ring electrode," therefore, are not intended to limit the function of a given electrode only for pacing since the electrode may be used for both pacing and sensing, only for pacing or only for sensing in various instances. Depending on selected pacing and sensing electrode vectors, at times a "pacing electrode" may be used only for sensing and not used in a pacing electrode vector or not used at all for pacing or sensing when other electrodes are selected instead for pacing and sensing.

Pacemaker 14 includes a housing 15, which may be hermetically sealed, to enclose internal circuitry corresponding to the various circuits and components for sensing cardiac signals from heart 8 and controlling electrical stimulation therapy, e.g., VCS pacing therapy, delivered by pacemaker 14. Pacemaker 14 includes a connector block 13 coupled to housing 15 including at least one lead connector bore configured to receive the proximal lead connector 20 of pacing lead 18. Connector block 13 may have additional connector bores for optionally receiving an atrial pacing and sensing lead, RV pacing and sensing lead, and/or coronary sinus pacing and sensing lead in other examples and as further described below in conjunction with FIGS. 2A-2D.

As described below, cardiac electrical signal sensing circuitry included in pacemaker 14 may receive a cardiac electrical signal sensed from electrodes carried by BB pacing lead 18. According to techniques disclosed herein, processing circuitry included in pacemaker 14 may receive the sensed cardiac electrical signal and analyze QRS signals attendant to ventricular depolarizations for determining a ventricular conduction condition and selecting a VCS pacing therapy based on the ventricular conduction condition. Pacemaker 14 includes therapy delivery circuitry for generating pacing pulses delivered to one or more ventricular pacing sites, including at least one VCS pacing site such as the LBB, according to a selected VCS pacing therapy. The VCS pacing therapy may include a combination of ventricular pacing sites, which may include any combination of the RBB, the LBB, and/or LV myocardium, as examples, using additional electrodes and/or leads coupled to the therapy delivery circuitry of pacemaker 14.

Medical device system 10 may include an external medical device 50 for receiving and analyzing cardiac electrical signals according to some examples. For instance, during pacemaker implantation, during clinical follow-up procedures, or during remote monitoring of patient 9, external device 50 may receive and analyze cardiac signals according to techniques disclosed herein for selecting a VCS pacing therapy and adjusting pacing control parameters that are programmable in pacemaker 14 by external device 50. External device 50 may be embodied as a programmer used in a hospital, clinic or physician's office to acquire and analyze cardiac signals. External device 50 may alternatively be embodied as a handheld device or pacing system analyzer. In some examples, external device 50 is a home monitor configured to interrogate pacemaker 14 to receive signals or data from pacemaker 14 via a wireless communication link 55.

External device 50 may receive ECG signals from one or more cutaneous or subcutaneous electrodes 40. In the example shown, ECG electrodes 40 including cutaneous electrodes 1-6 along with the four limb leads (R1, L1, R2 and L2) may be placed for acquiring a 12-lead ECG by external device 50 via interface 51. Other ECG electrode configurations may be used with fewer lead and electrodes than shown in FIG. 1. Additionally or alternatively, external device 50 may receive an intracardiac electrogram (EGM) signal sensed from electrodes carried by cardiac pacing lead 18 (and/or other electrodes carried by other cardiac pacing leads and/or a pacemaker housing as further described below) via wireless communication link 55. In some examples, BB pacing lead 18 may be electrically coupled to external device 50 via proximal connector 20 and interface 51 for providing raw cardiac electrical signals received via electrode 32 paired with another sensing electrode, which may be another electrode carried by BB pacing lead 18 or a cutaneous or subcutaneous indifferent electrode, before coupling lead 18 to pacemaker 14. Proximal lead connector 20 may enable electrical connection to external device 50, e.g., using electrical connectors such as alligator clips or other types of electrical connectors and wires, via electrode/lead interface 51.

External device 50 is shown to include electrode/lead interface 51 for receiving input from ECG electrodes 40 and/or lead 18 and further includes processor 52, memory 53, display unit 54, user interface unit 56, telemetry unit 58, and pulse generator 60. Processor 52 may be configured to process and analyze cardiac electrical signals received from ECG electrodes 40 and/or pacemaker 14 (via wireless telemetry or directly from BB pacing lead 18 and/or other implantable leads or electrodes as described below) for analyzing ECG and/or EGM signals sensed during an intrinsic ventricular rhythm (when all ventricular pacing is withheld), during ventricular pacing according to a VCS pacing therapy, and/or during ventricular pacing according to various tests performed to optimize pacing control parameters or determine a ventricular conduction condition. Cardiac electrical signal analysis may be performed by processor 52 for determining a recommended pacing therapy for controlling BB pacing. For example, during an implantation or follow-up procedure, processor 52 may be configured to analyze the ECG and/or EGM signals for detecting QRS signal features indicative of LBB block, RBB block or other conduction abnormalities. Based on the signal analysis, processor 52 may determine a recommended VCS pacing therapy for controlling ventricular pacing, which may include LBB pacing, RBB pacing and/or LV myocardial pacing in some instances, for correcting electrical conduction abnormalities detected from QRS signals and promoting ventricular electrical synchrony.

Processor 52 is coupled to the other components and units of external device 50, e.g., via a data bus 59, for controlling the functions attributed to external device 50 herein. For example, processor 52 may pass sensed ECG and/or EGM signals and/or data derived therefrom such as QRS signal features to a display unit 54, control pulse generator 60 to generate pacing pulses during testing of different pacing therapies and pacing control parameters, and store QRS signal data in memory 53, etc. External device 50 may be equipped with a pulse generator 60 so that during an implant procedure, pulse generator 60 may generate pacing pulses delivered via electrodes carried by lead 18, before connection to pacemaker 14.

According to the techniques disclosed herein, processor 52 may determine a ventricular conduction condition and select a recommended VCS pacing therapy based on the ventricular conduction condition. Among the ventricular conduction conditions that may be determined are normal intrinsic ventricular conduction, LBB block, corrected LBB block, RBB block, corrected RBB, delayed LV myocardial activation, and AV conduction block or long P-R interval. The P-R interval, which may also be referred to as an A-V interval, refers to the time interval between a sensed atrial P-wave or atrial pacing pulse and a subsequent sensed, intrinsic ventricular R-wave. The A-V interval can be determined by the pacemaker control circuitry as a representative measurement of the intrinsic conduction time between the atria and the ventricles. The ventricular conduction condition may be determined based on an analysis of the ECG and/or EGM signals received during an intrinsic ventricular rhythm (no ventricular pacing delivered) and/or during ventricular pacing according to a VCS pacing therapy with ventricular pacing withheld from at least one pacing site of the VCS pacing therapy combination of pacing sites.

As used herein the term "ventricular electrical event signal" generally refers to the cardiac electrical signal waveform attendant to the depolarization of the ventricular tissue. The ventricular electrical event signal may also be referred to as the "QRS signal" even though in some examples the QRS complex representing the depolarization of the ventricular tissue, which may be an intrinsic or a pacing evoked depolarization, may have a QS, QSr' or other waveform morphology that is different than the normal QRS complex. A sensed EGM signal may be a near-field or far-field electrical signal, meaning that a sensing electrode pair may be located in the vicinity of a BB pacing site (near-field), e.g., within the interventricular septum, or located remotely from the BB pacing site (far-field), e.g., using an electrode along the LV lateral wall, in the RV or the pacemaker housing 15.

Processor 52 executes instructions stored in memory 53. Processor 52 may include any one or more of a microprocessor, a controller, a digital signal processor (DSP), an application specific integrated circuit (ASIC), a field-programmable gate array (FPGA), or equivalent discrete or analog logic circuitry. In some examples, processor 52 may include multiple components, such as any combination of one or more microprocessors, one or more controllers, one or more DSPs, one or more ASICs, or one or more FPGAs, as well as other discrete or integrated logic circuitry. The functions attributed to processor 52 herein may be embodied as software, firmware, hardware or any combination thereof.

Memory 53 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital or analog media. Memory 53 may be configured to store instructions executed by processor 52 for obtaining and analyzing cardiac electrical signals for determining a recommended VCS pacing therapy and/or pacing control parameter settings. Memory 53 may store cardiac signal features determined by processor 52 for use in determining when the signal features meet various criteria relating to determining a ventricular conduction condition, such as LBB block, RBB block, corrected LBB block, or corrected RBB block.

Display unit 54, which may include a liquid crystal display, light emitting diodes (LEDs) and/or other visual display components, may generate a display of the ECG and/or EGM signals and/or data derived therefrom. Display unit 54 may be configured to generate a graphical user interface (GUI) including various windows, icons, user selectable menus, etc. to facilitate interaction by a user with the external device 50. Display unit 54 may function as an input and/or output device using technologies including liquid crystal displays (LCD), quantum dot display, dot matrix displays, light emitting diode (LED) displays, organic light-emitting diode (OLED) displays, cathode ray tube displays, e-ink, or monochrome, color, or any other type of display capable of generating tactile, audio, and/or visual output. In some examples, display unit 54 is a presence-sensitive display that may serve as a user interface device that operates both as one or more input devices and one or more output devices.

In response to data received from processor 52, display unit 54 may generate a visual representation of ECG and/or EGM signals, which may include signals received during different VCS pacing therapies, pacing according to different pacing control parameters, and/or pacing according to different testing control parameters to enable a user to observe changes in the cardiac electrical signals that occur during an intrinsic rhythm and/or during a VCS pacing therapy, which may be indicative of a change in a ventricular conduction condition or correction of an abnormal ventricular conduction condition due to the VCS pacing therapy. Processor 52 may determine values of one or more cardiac electrical event signal features, e.g., QRS width, QRS amplitude, septal-myocardial activation time, LBB activation time, RBB activation time, or other features, during no ventricular pacing and/or during ventricular pacing according to different VCS pacing therapies. Values or relative comparisons of determined cardiac electrical event signal features during the intrinsic ventricular rhythm or VCS pacing therapy may be displayed by display unit 54 for review by a clinician. The display of cardiac electrical event signal data may include an indication of a recommended or selected VCS pacing therapy and/or pacing control parameters settings (such as pacing electrode configuration, pacing pulse output settings, and/or ventricular pacing intervals such as AV delay or VV delay) in some examples.

User interface unit 56 may include a mouse, touch screen, keypad or the like to enable a user to interact with external device 50, e.g., to initiate and terminate an interrogation session for retrieving data from pacemaker 14, adjust settings of display unit 54, enter programming commands or selections or make other user requests. Telemetry unit 58 includes a transceiver and antenna configured for bidirectional communication with a telemetry circuit included in an implantable pacemaker 14, e.g., in response to user requests.

Telemetry unit 58 is configured to operate in conjunction with processor 52 for sending and receiving data relating to pacemaker functions via a wireless communication link 55 with the implantable pacemaker 14. Communication link 55 may be established using a radio frequency (RF) link such as BLUETOOTH®, Wi-Fi, Medical Implant Communication Service (MICS) or other communication bandwidth. In some examples, external device 50 may include a programming head that is placed proximate pacemaker 14 to establish and maintain a communication link 55, and in other examples external device 50 and pacemaker 14 may be configured to communicate using a distance telemetry algorithm and circuitry that does not require the use of a programming head and does not require user intervention to maintain a communication link.

It is contemplated that external device 50 may be in wired or wireless connection to a communications network via telemetry circuit 58 that includes a transceiver and antenna or via a hardwired communication line for transferring data to a centralized database or computer to allow remote management of the patient. Remote patient management systems including a centralized patient database may be configured to utilize the presently disclosed techniques to enable a clinician to be notified when a recommended VCS pacing therapy is changed or other device or patient related data is available for review. Review of a determined ventricular conduction condition, EGM signals, marker channel data or other data collected from pacemaker 14 may be performed remotely by a clinician who may authorize programming of the VCS pacing therapy and pacing control parameters in pacemaker 14, e.g., after viewing a visual representation of related data, which may include EGM signals, and marker channel data.

In some examples, external device 50 may include a pulse generator 60 for generating and delivering pacing pulses via lead 18, e.g., during an implant procedure. Pulse generator 60 may include charging circuitry, one or more holding capacitors that can be charged to a pacing pulse voltage amplitude by the charging circuitry using a power source 61 of external device 50. The holding capacitor(s) may be coupled to an output capacitor via switching circuitry to deliver the pacing pulse via a selected pacing electrode configuration, e.g., tip electrode 32 and ring electrode 34 of lead 18 (as seen in FIG. 2A), as the holding capacitor(s) are discharged for a selected pacing pulse width.

As described below, post-pace ECG and/or EGM signals may be analyzed by processor 52 for determining a ventricular conduction condition and selecting a recommended VCS pacing therapy and/or pacing control parameters used for delivering the VCS pacing therapy. In some examples, external device 50 may control pulse generator 60 to generate pacing pulses to perform pacing capture tests during the electrode implantation procedure for verifying the location of one or more electrodes within the septum. Examples of cardiac electrical signal and image based guidance techniques for implanting an electrode for use in delivering VCS pacing are described in provisional U.S. Patent Application No. 62/876,634 filed on Jul. 20, 2019 (Zhou, et al.), and corresponding U.S. Patent Publication No. 2021/0015389, filed Jul. 17, 2020 (Zhou, et al.) granted as U.S. Pat. No. 11,911,166, and in U.S. Patent Publication No. 2021/0015390, filed Aug. 11, 2020 (Zhou, et al.) granted as U.S. Pat. No. 12,023,167, all of which are incorporated herein by reference in their entirety. Pulse generator 60 may vary the pacing pulse output for verifying capture and determining pacing capture thresholds. Examples of methods for determining pacing capture threshold for delivering VCS pacing are generally disclosed in provisional U.S. Patent Application No. 63/057,263 filed on Jul. 27, 2020 (Zhou, et al.), provisional U.S. Patent Application No. 63/112,980, filed on Nov. 12, 2020 (Zhou, et al.) and corresponding U.S. Publication No. 2022/023640 filed Jul. 8, 2021 (Zhou, et al.) granted as U.S. Pat. No. 11,964,160, all of which are incorporated herein by reference in their entirety.

External device 50 includes a power source 61 that is coupled to the various units of external device 50 for providing power to unit circuits and components as needed. Power source 61 may include one or more rechargeable or non-rechargeable batteries or may be coupled to an external power source, such as plugged into an electrical outlet.

Figure 2A:
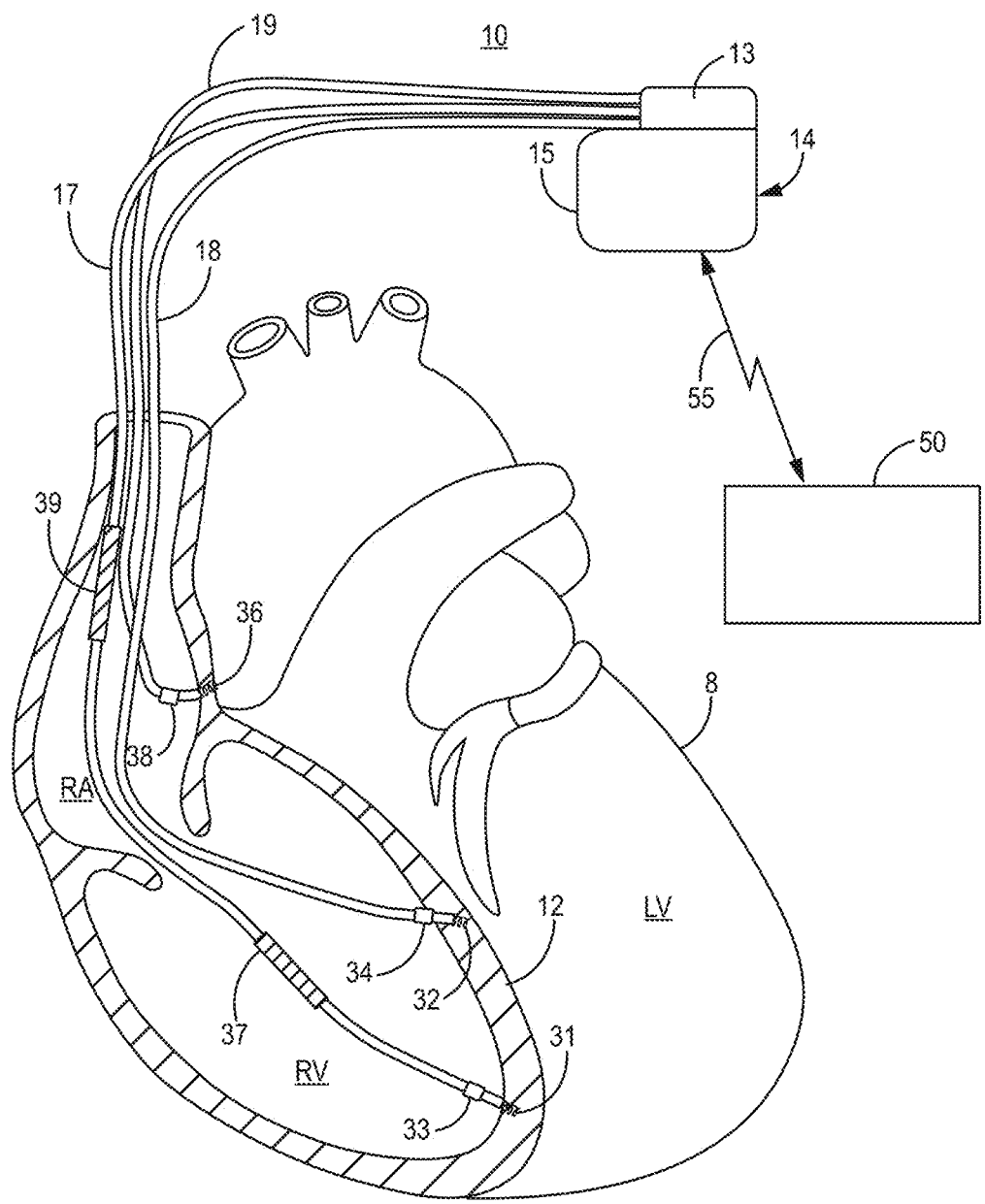
FIG. 2A is a conceptual diagram of another example of a medical device system including a pacemaker and transvenous leads for delivering VCS pacing therapies according to the techniques disclosed herein.

FIG. 2A is a conceptual diagram of pacing lead 18 coupled to implantable pacemaker 14. As shown in FIG. 1, pacemaker 14 may be a single chamber device capable of delivering ventricular pacing pulses and sensing electrical signals in the ventricles via lead 18. In the example shown in FIG. 2A, pacemaker 14 is a dual chamber device configured to receive an atrial pacing and sensing lead 19, which may be positioned in the right atrial chamber for delivering atrial pacing pulses and sensing atrial electrical signals via atrial electrodes 36 and 38. Pacemaker 14 may be configured to sense intrinsic atrial P-waves and deliver atrial pacing pulses in the absence of sensed P-waves. Pacemaker 14 may be configured to deliver atrial synchronized ventricular pacing by setting an AV delay in response to each sensed P-wave or atrial pacing pulse and delivering ventricular pacing pulses via lead 18 upon the expiration of the AV delay.

In other examples, pacemaker 14 may be configured as a multi-chamber or multi-site pacemaker coupled to two or more leads for sensing cardiac electrical signals from multiple sites and/or multiple heart chambers and delivering pacing pulses at multiple sites and/or to multiple heart chambers. For instance, as shown in FIG. 2A, pacemaker 14 may be coupled to a right ventricular (RV) lead 17 including RV pacing tip electrode 31 and ring electrode 33. RV pacing electrodes 31 and 33 are shown positioned at a RV apical location for sensing RV electrical signals and delivering RV myocardial pacing pulses. RV pacing electrodes 31 and 33 may be implanted at other locations, however.

It is to be understood that although pacemaker 14 is illustrated in FIG. 2A as a pacemaker capable of delivering atrial pacing via RA lead 19 and ventricular pacing via BB pacing lead 18, pacemaker 14 may be configured as an implantable cardioverter defibrillator capable of delivering both low voltage cardiac pacing therapies and high voltage cardioversion and defibrillation (CV/DF) shocks. In this case, RV lead 17 may include an RV coil electrode 37 and a superior vena cava (SVC) coil electrode 39 for delivering high voltage CV/DF shocks. Coil electrodes 37 and 39 may be used in various sensing electrode vectors for sensing ventricular signals which may be analyzed by processing circuitry of pacemaker 14 for determining QRS signal features and determining a ventricular conduction condition and/or adjusting VCS pacing control parameters based on the QRS signal features. Examples of other pacing electrode configurations that may include additional leads and electrodes than those shown in FIG. 2A are described below in conjunction with FIGS. 2B-2D.

BB pacing lead 18 may be advanced transvenously into the right ventricle (RV) via the right atrium (RA) for positioning BB pacing and sensing electrodes 32 and 34 within the interventricular septum 12. In particular, BB pacing tip electrode 32 may be advanced within the septum 12 from the RV toward the LV to position tip electrode 32 at an LBB pacing site in some examples. BB pacing tip electrode 32 may be a helical "screw-in" electrode that may be rotatably advanced into the septum 12, e.g., by rotation of the proximal lead connector 20 (shown in FIG. 1). In other examples, BB pacing lead 18 may be advanced to a BB pacing site from an RA approach. For example, the BB pacing tip electrode 32 may be advanced into the inferior end of the interatrial septum, beneath the AV node and near the tricuspid valve annulus to position BB pacing tip electrode 32 in, along or proximate to the His bundle.

A BB pacing ring electrode 34 may be spaced proximally from BB pacing tip electrode 32 and may be used as the return anode electrode with the cathode tip electrode 32 for delivering VCS pacing pulses and for sensing ventricular electrical signals. In some instances, the pacing pulse output may be adjusted to capture both the LBB and the RBB by cathodal capture at the pacing tip electrode 32 and anodal capture of the RBB at the pacing ring electrode 34 or vice versa. In this way, bipolar bilateral BB pacing may be delivered using BB pacing lead 18.

The BB pacing electrodes 32 and 34 are coupled to respective insulated conductors extending within the elongated, insulative body of ventricular lead 18. Each conductor provides electrical connection of a respective electrode 32 or 34 to the proximal lead connector 20 (seen in FIG. 1). Proximal lead connector 20 may be coupled to connector block 13 of pacemaker 14, and thereby to circuitry enclosed within pacemaker housing 15.

As described below in conjunction with FIG. 4, cardiac electrical signal sensing circuitry included in pacemaker 14 may receive a cardiac electrical signal from BB pacing electrodes 32 and/or 34 of pacing lead 18 for sensing ventricular signals including QRS signals attendant to ventricular depolarization. BB pacing electrodes 32 and 34 may be selected in a bipolar ventricular pacing and/or sensing electrode pair or one or both electrodes carried by BB pacing lead 18 may be used in combination with pacemaker housing 15 or one of coil electrodes 37 or 39 (if present) for delivering unipolar pacing pulses and/or receiving a unipolar cardiac electrical signal for sensing cardiac electrical events by cardiac electrical signal sensing circuitry. Techniques disclosed herein enable a processor of pacemaker 14 (or external device 50) to determine a ventricular conduction condition for selecting a VCS pacing therapy for controlling delivery of pacing pulses to the LBB and/or the RBB, and more generally the VCS, via lead 18.

Pacemaker 14 is shown in telemetric communication with external device 50 by a communication link 55. Communication link 55 may be established between pacemaker 14 and external device 50 using a wireless radio frequency (RF) link such as BLUETOOTH®, Wi-Fi, or Medical Implant Communication Service (MICS) or other RF or communication frequency bandwidth or communication protocols. Data stored or acquired by pacemaker 14, including physiological signals or associated data derived therefrom, results of device diagnostics, and histories of detected rhythm episodes and delivered therapies, may be retrieved from pacemaker 14 by external device 50 following an interrogation command. As described above, external device 50 may be used in a hospital, clinic or physician's office to retrieve data from pacemaker 14 and to program cardiac signal sensing parameters, cardiac rhythm detection parameters and therapy control parameters used by pacemaker 14 in sensing the heart rhythm and delivering pacing therapies.

Figure 2B:
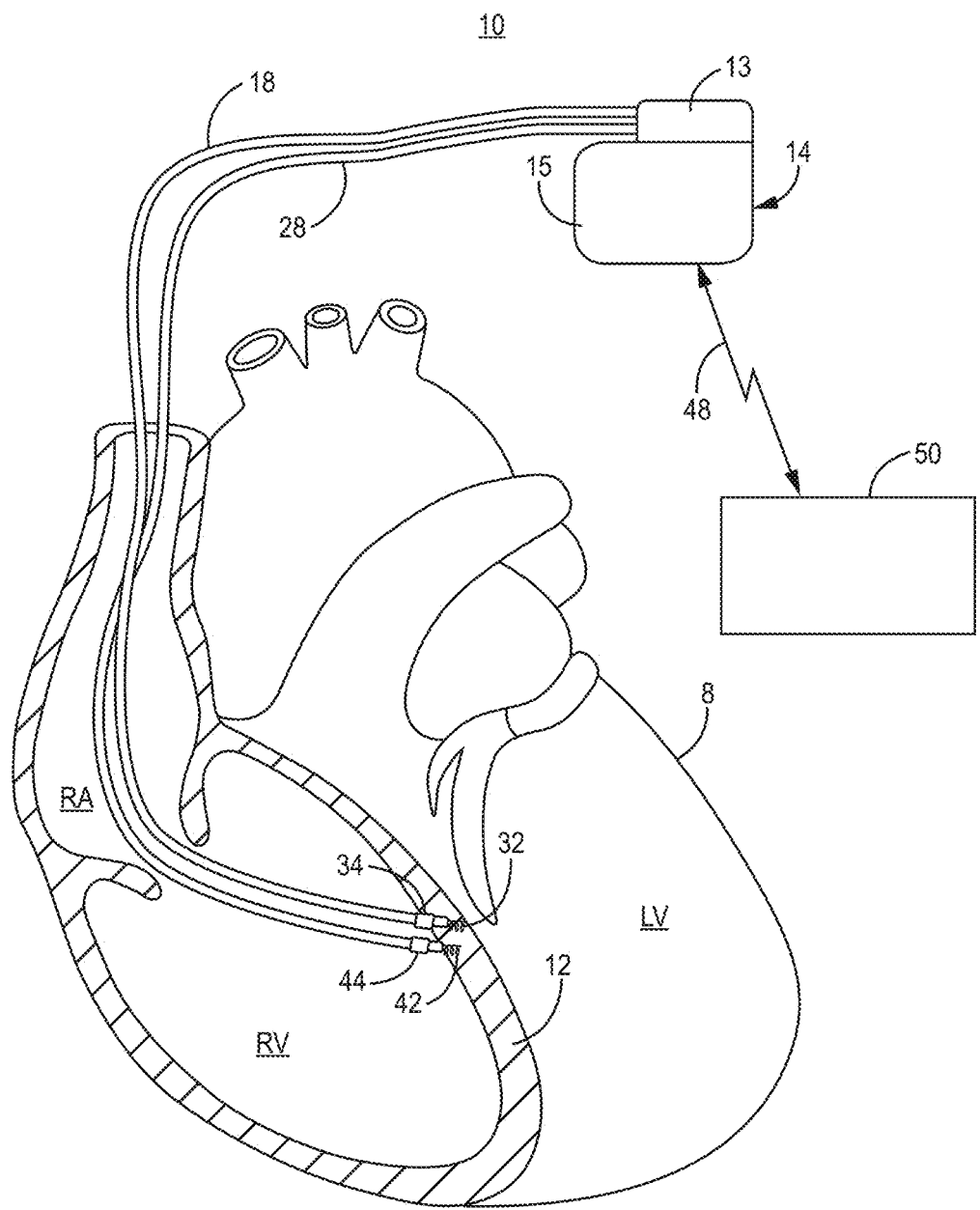
FIG. 2B is a conceptual diagram of another example of a medical device system for delivering VCS pacing therapies according to the techniques disclosed herein.

FIG. 2B is a conceptual diagram of pacemaker 14 coupled to two bipolar pacing and sensing leads 18 and 28 that may be implanted in heart 8 for providing bilateral BB pacing according to another example. In this example, lead 18 may be advanced to position BB pacing tip electrode 32 in the left portion of the interventricular septum 12, in the vicinity of the LBB, for pacing the LBB in a bipolar pacing electrode configuration between tip electrode 32 as the cathode and ring electrode 34 as the return anode electrode. A second bipolar BB pacing lead 28 may be advanced to position tip electrode 42 in the right portion of the ventricular septum 12, in the vicinity of the RBB, for pacing the RBB in a bipolar pacing electrode configuration between tip electrode 42 and ring electrode 44. In other examples, leads 18 and 28 may be positioned to provide two pacing electrode vectors for pacing along the VCS at two different locations, such as the His bundle and RBB, His bundle and LBB, or a posterior or anterior fascicle of the LBB and the RBB or His bundle, as examples.

In this pacing electrode configuration, two bipolar electrode vectors may be used to individually to pace the LBB and the RBB. The LBB pacing pulses and the RBB pacing pulses may be delivered via the two separate bipolar pacing electrode vectors simultaneously or separated by an interventricular pacing interval, referred to herein as a "VV delay." The timing of the LBB pacing pulses and the RBB pacing pulses may be controlled relative to each other and/or relative to an atrial pacing pulse or sensed P-wave at a respective AV delay.

When two leads 18 and 28 are provided, one or both may be unipolar leads carrying a single electrode for pacing in a unipolar pacing electrode vector with pacemaker housing 15. One or both leads may be bipolar leads as shown and each electrode may be individually selectable as the anode or the cathode of a bipolar pacing electrode vector. Additionally, each electrode 32 or 34 and each electrode 42 or 44 may be selectable as the cathode electrode in a unipolar pacing electrode vector including pacemaker housing 15. Any available pacing electrode vector may be selected from the four electrodes 32, 34, 42, and 44 and pacemaker housing 15 for delivering LBB pacing, RBB pacing or bilateral BB pacing. Thus multiple pacing electrode configurations may be selectable from among the electrodes 32, 34, 42 and 44 including bipolar pacing electrode vectors for providing bipolar bilateral BB pacing using a single bipolar pacing electrode vector to achieve anodal and cathodal capture, bilateral BB pacing using two different bipolar pacing electrode vectors, bilateral BB pacing using two different unipolar pacing electrode vectors, bilateral BB pacing using one unipolar and one bipolar pacing electrode vector, or single bundle branch pacing of only the LBB or only the RBB using a selected unipolar or bipolar pacing electrode vector. Furthermore, the electrodes 32, 34, 42 and 44 may be selected in various sensing electrode vectors for sensing ventricular electrical signals using any available unipolar or bipolar combination of cathode and anode electrodes.

Figure 2C:
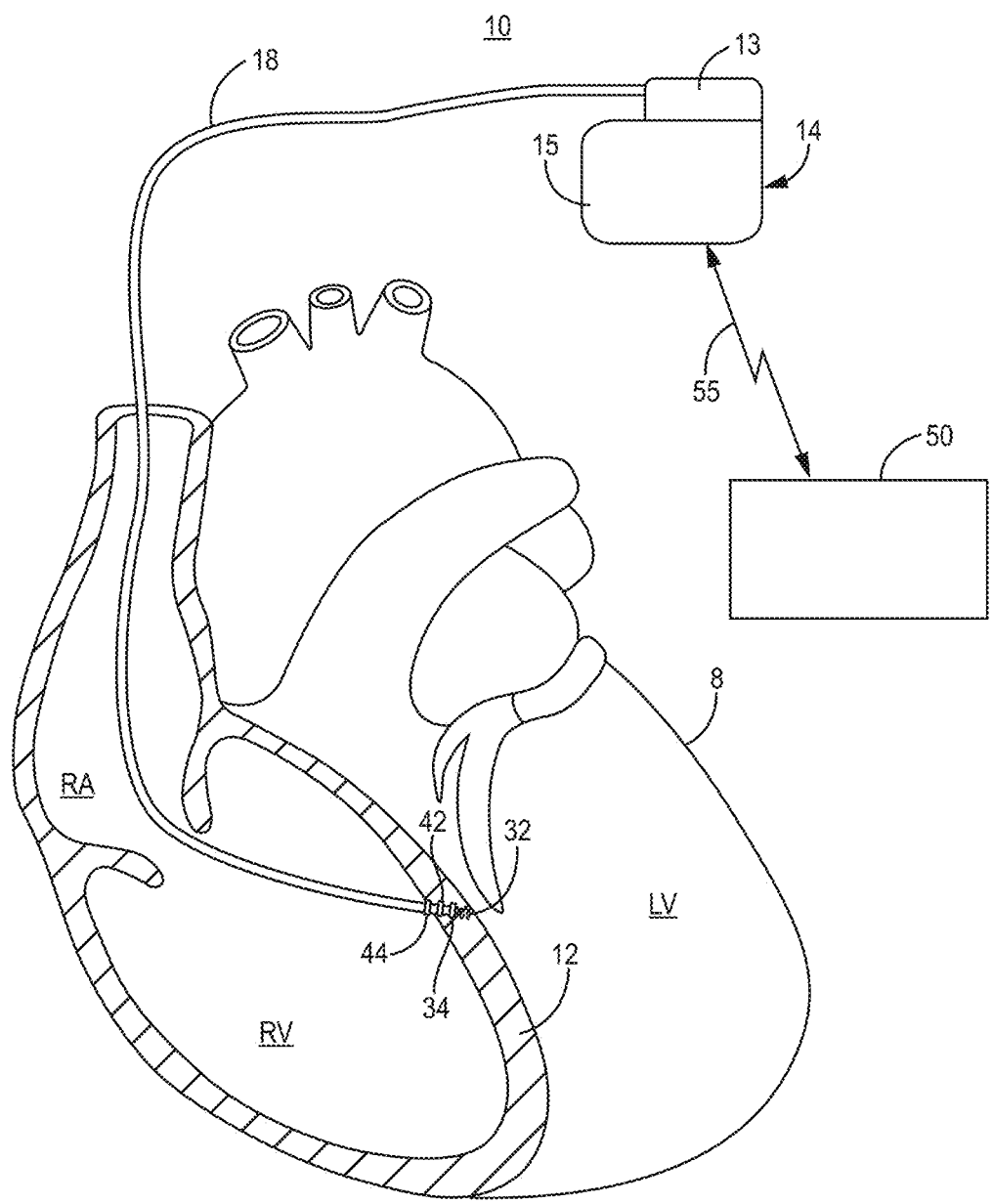
FIG. 2C is a conceptual diagram of another example of a medical device system for delivering VCS pacing therapies according to the techniques disclosed herein.

FIG. 2C is a conceptual diagram of lead 18 provided as a quadripolar lead carrying four electrodes 32, 34, 42 and 44 along a single lead body of lead 18 rather than on two different lead bodies as shown in FIG. 2B. As described above, multiple pacing electrode configurations are selectable for delivering bundle branch pacing using electrodes 32, 34, 42 and/or 44 in various unipolar and/or bipolar pacing electrode vectors and selectable anode and cathode polarity assignments of each electrode 32, 34, 42 and 44. For example, tip electrode 32 and ring electrode 34 may deliver bipolar pacing pulses for capturing the LBB and ring electrodes 42 and 44 may deliver bipolar pacing pulses for capturing the RBB using two distinct bipolar pacing electrode vectors. Alternatively, a single bipolar pacing electrode vector, e.g., tip electrode 32 paired with any one of electrodes 34, 42 or 44, may be selected to deliver bipolar bilateral BB pacing including cathodal and anodal capture. Any combination of two electrodes out of electrodes 32, 34, 42 and 44 may be selected in a bipolar pacing electrode vector with selectable anode and cathode polarities to achieve bipolar bilateral BB pacing using a single bipolar pacing electrode vector. The selected electrode combination may be based on anodal and cathodal pacing capture thresholds of the LBB and RBB and/or the greatest improvement in ventricular electrical synchrony based on an analysis of ECG and/or EGM signals according to the techniques disclosed herein.

Furthermore, any of the electrodes 32, 34, 42 and 44 may be selected as a pacing cathode electrode in a unipolar pacing electrode vector including pacemaker housing 15 for pacing either the RBB or the LBB. Two unipolar pacing electrode vectors may be selected based on the lowest pacing pulse output required to capture both of the RBB and the LBB. In some examples, however, correction of a ventricular conduction condition and improvement in ventricular electrical synchrony may be achieved by a VCS pacing therapy that includes only single bundle branch pacing, e.g., only LBB pacing or only RBB pacing, using a selected bipolar or unipolar pacing electrode vector with only cathodal capture at the selected cathode electrode.

As described below, a processor of pacemaker 14 or external device processor 52 may analyze ECG and/or EGM signals and determine QRS signal features for determining a ventricular conduction condition and selecting a VCS pacing therapy as well as corresponding pacing electrode configuration, pacing pulse output settings (based on pacing capture thresholds) and pacing timing intervals (e.g., AV delay and VV delay). The VCS pacing therapy may be selected based on the determined ventricular conduction condition, e.g., LBB block, RBB block, or complete BB block as examples. The pacing electrode configuration and pacing pulse output settings that result in capture at selected pacing sites to provide correction of LBB block and/or RBB block during a VCS pacing therapy delivered to the LBB and/or RBB may be used to deliver pacing pulses according to the selected VCS pacing therapy.

Figure 2D:
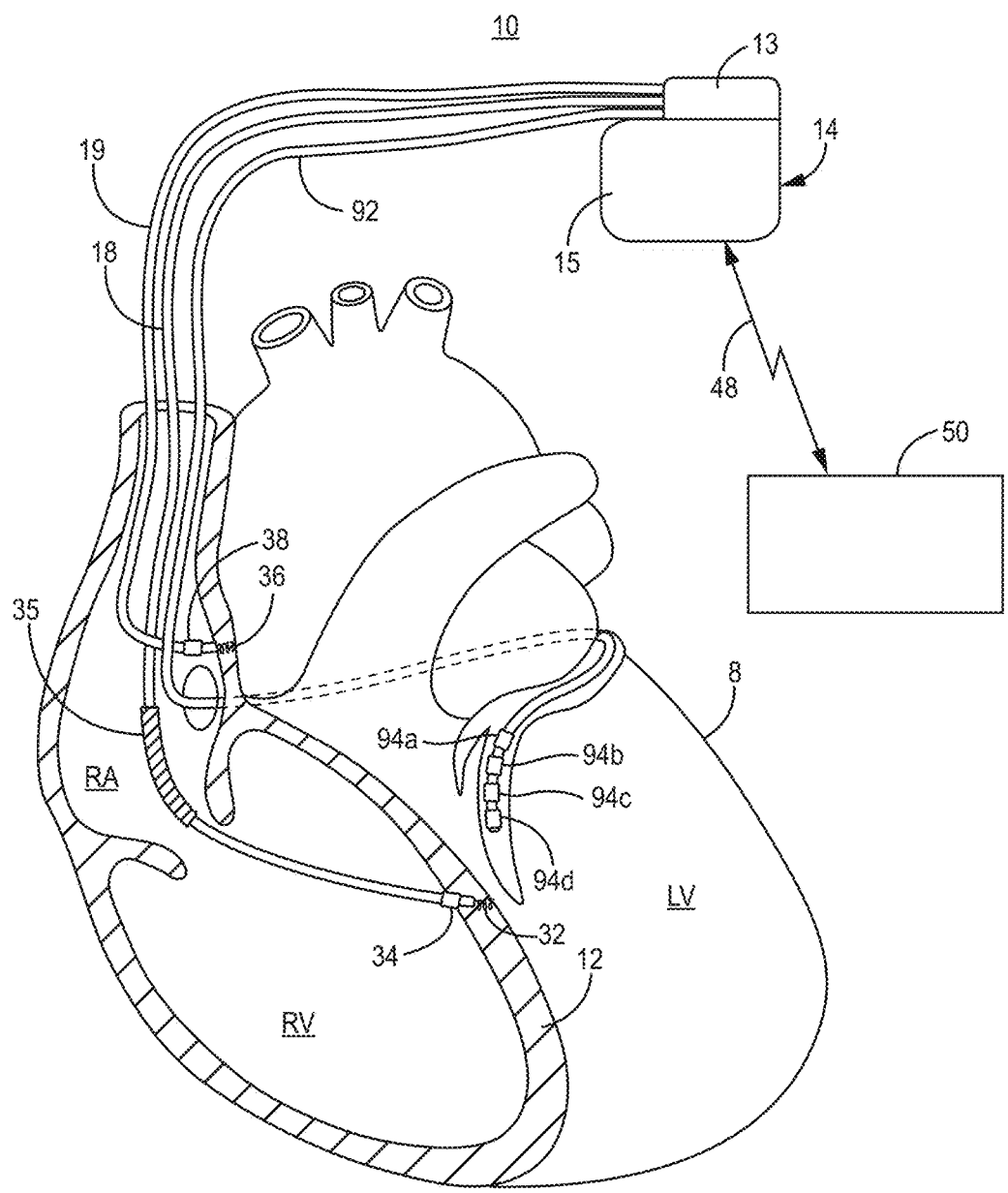
FIG. 2D is a conceptual diagram of yet another example of a medical device system for delivering VCS pacing therapies according to the techniques disclosed herein.

FIG. 2D is a conceptual diagram of pacemaker 14 configured as a multi-chamber pacemaker including an RA pacing and sensing lead 19 and a coronary sinus (CS) lead 92 in addition to lead 18 configured for delivering BB pacing. While atrial lead 19 is not shown in FIGS. 2B-2C for the sake of clarity, it is to be understood that various pacing lead and electrode configurations described herein and shown in the accompanying drawings for delivering a VCS pacing therapy may include an atrial lead 19 for providing atrial sensing and pacing and enabling pacemaker 14 to deliver atrial synchronized ventricular pacing. Furthermore, any of the leads carrying one or more electrodes shown in FIGS. 2A-2D may be combined in other combinations than the illustrative examples presented herein, with more or fewer leads and/or electrodes than shown in these examples.

In FIG. 2D, pacemaker 14 is shown coupled to RA lead 19 carrying a pacing tip electrode 36 and proximal ring electrode 38 which may be used for sensing RA signals and delivering atrial pacing to the RA. CS lead 92 may be advanced into the RA, through the coronary sinus ostium and into a cardiac vein of the LV for positioning electrodes 94a, 94b, 94c and 94d (collectively "CS electrodes 94") epicardially along the LV myocardium for sensing EGM signals and pacing the LV myocardium. CS lead 92 is shown as a quadripolar lead carrying four electrodes 94a-d that may be selected in various bipolar pacing electrode pairs for pacing the LV myocardial tissue and for sensing LV epicardial EGM signals. One of CS electrodes 94 may be selected in combination with pacemaker housing 15 (or a coil electrode 35 if available) for delivering unipolar LV myocardial pacing and/or sensing unipolar ventricular EGM signals.

In this example, pacemaker 14 may be capable of delivering high voltage CV/DF shock therapies for cardioverting or defibrillating the heart 8 in response to detecting a ventricular tachyarrhythmia. As such, lead 18 is shown carrying a coil electrode 35 for delivering high voltage shock pulses. One or more coil electrodes may be included along one or more of leads 18, 19 or 92 in various examples. A coil electrode such as coil electrode 35 may be selected in a unipolar pacing electrode vector with any of the lead-based tip or ring electrodes 32, 34, 66, 68 or 94 for sensing unipolar EGM signals for analysis and determination of ventricular conduction conditions. In some instances, coil electrode 35 may be used with housing 15 for sensing a far-field EGM signal for analyzing the QRS signal for determining a ventricular conduction condition and selecting a VCS pacing therapy.

When pacing lead 18 is positioned for delivering BB pacing, of one or both bundle branches, VCS pacing may be combined with ventricular myocardial pacing of the LV (using CS lead 92) to correct an LV conduction delay and achieve electrical and mechanical synchrony of the ventricles. As such, in some examples, a processor of pacemaker 14 may select a VCS plus LV myocardial pacing therapy that includes, for example, single or bilateral BB pacing, e.g., using lead 18, combined with LV myocardial pacing using CS lead 92. As described below, processing circuitry of pacemaker 14 or external device processor 52 may receive a septal EGM signal sensed using LBB pacing tip electrode 32 and/or ring electrode 34 and an epicardial EGM signal sensed using CS lead electrodes 94 for use in determining a septal-epicardial activation time and/or QRS width or other QRS signal features for determining a ventricular conduction condition and selecting a VCS pacing therapy. In various examples, two or more EGM signals sensed using two or more respective sensing electrode vectors selected from the available electrodes coupled to pacemaker 14, and in some instances housing 15, may be analyzed by pacemaker 14 (or external device processor 52) for determining the ventricular conduction condition and selecting the VCS pacing therapy for controlling delivery of ventricular pacing at one or more ventricular pacing sites including at least one VCS pacing site.

Figure 3:
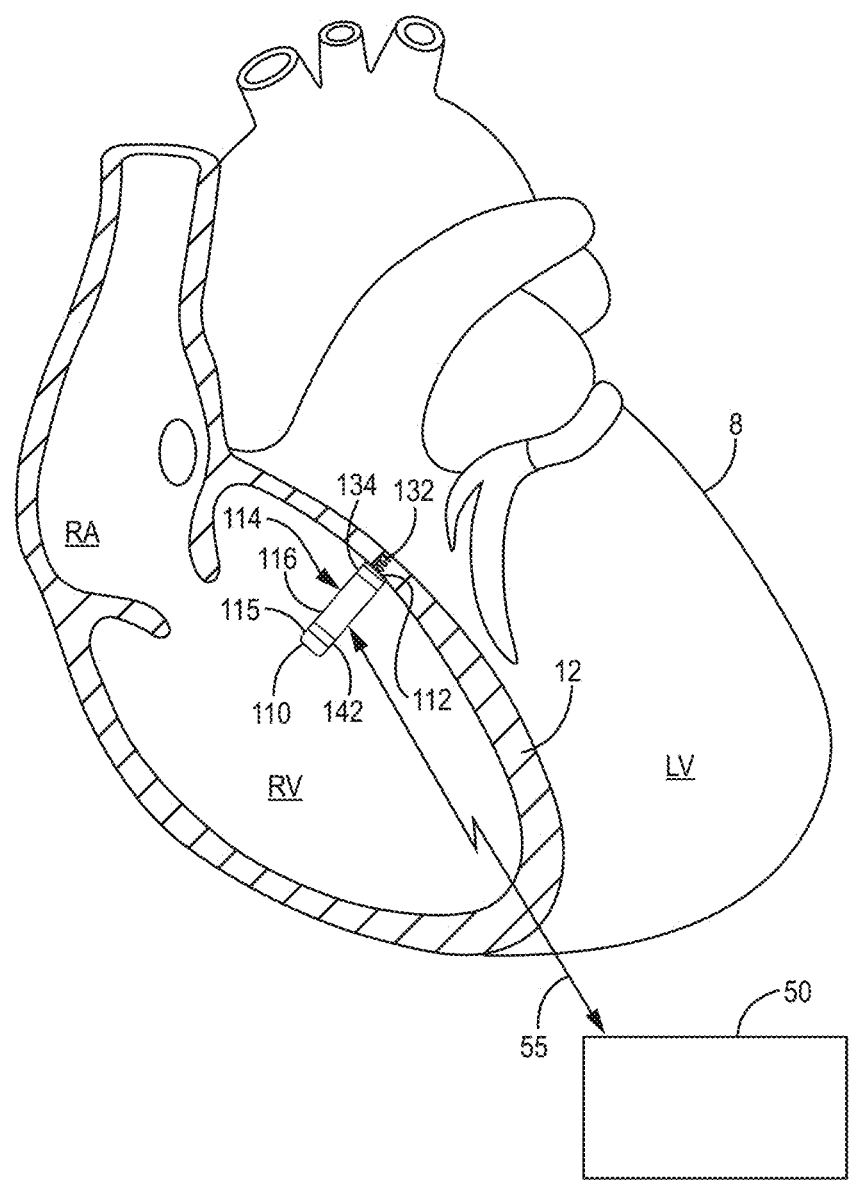
FIG. 3 is a conceptual diagram of a leadless intracardiac pacemaker that may be configured to deliver VCS pacing therapies according to techniques disclosed herein.

FIG. 3 is a conceptual diagram of a leadless intracardiac pacemaker 114 positioned within the RV, along a septal location, for providing LBB pacing according to one example. The techniques disclosed herein for selecting a pacing therapy and delivering BB pacing according to the selected pacing therapy may be used in conjunction with a leadless pacemaker, such as pacemaker 114, having a pacing electrode coupled to and extending from the pacemaker housing, without an intervening medical lead coupled to the pacemaker and extending therefrom.

Pacemaker 114 may include an elongated housing 115 having a longitudinal sidewall 116 extending from a housing proximal end 110 to a housing distal end 112. Pacemaker 114 is shown to include a BB pacing tip electrode 132 extending from a distal end 112 of pacemaker housing 115. BB pacing tip electrode 132 is shown as a "screw-in" helical electrode, extending away from distal end 112 of the pacemaker housing 115. Pacemaker 114 may include a distal housing-based ring electrode 134 along the distal end 112 of pacemaker housing 115 that may be selectable as the return anode electrode with BB pacing tip electrode 132 for bipolar pacing of the LBB or RBB in the vicinity of the tip electrode 132. Bipolar bilateral BB pacing may be achieved by cathodal capture of the LBB at tip electrode 132 and anodal capture of the RBB by distal ring electrode 134 near the distal end 112 of housing 115. The polarities of the LBB pacing tip electrode 132 and the distal ring electrode 134 may be reversed to achieve cathodal capture of the RBB and anodal capture of the LBB in some examples. Distal ring electrode 134 is shown a ring electrode circumscribing a distal portion of the housing 115 at distal end 112 but may alternatively be a distal housing-based electrode in the form of a button electrode, hemispherical electrode, segmented electrode or the like along the distal end 112 of housing 115.

In the example shown, a housing-based proximal ring electrode 142, which may circumscribe all or a portion of the longitudinal sidewall 116 of the housing 115, may be provided as a return anode electrode. In other examples, a return anode electrode used in sensing and pacing may be positioned on housing proximal end 110 or on housing distal end 112 and may be a button, ring or other type of electrode. Pacing of the LBB may be achieved using the distal pacing tip electrode 132 as the cathode electrode and the proximal ring electrode 142 as the return anode. Pacing of the RBB may be achieved using the distal ring electrode 134 as a cathode electrode and the proximal ring electrode 142 as the return anode. In this way, bilateral BB pacing may be achieved using two different pacing electrode vectors carried by housing 115.

Intracardiac pacemaker 114 may be implanted in the RV of the patient's heart 8 with BB pacing tip electrode 132 advanced into interventricular septum 12 for delivery of pacing pulses to the LBB or along the distal His bundle, for example. A proximal portion of the BB pacing tip electrode 132 may be electrically insulated, e.g., with a coating, in some examples such that only a distal portion of BB pacing tip electrode 132, furthest from pacemaker housing distal end 112, is exposed to provide targeted pacing at a tissue site that includes the LBB.

BB pacing tip electrode 132 may be an active fixation electrode, e.g., a helical electrode, providing fixation to anchor the pacemaker 114 at the implant position. In other examples, tip electrode 132 may be formed having a straight shaft with a distal active electrode portion or other type of electrode that is advanceable through the interventricular septum 12 to deliver pacing in a left portion of the septum 12 in the area of the LBB. In some examples, pacemaker 114 may include a fixation member that includes one or more tines, hooks, barbs, helices or other fixation member(s) that anchor the distal end 112 of the pacemaker 114 at the implant site and may not function as an electrode. Examples of leadless intracardiac pacemakers that may be used in conjunction with the techniques described herein are generally disclosed in commonly-assigned U.S. Publication No. 2019/0111270 (Zhou), granted as U.S. Pat. No. 11,207,529, and U.S. Publication No. 2019/0083800 (Yang, et al.) granted as U.S. Pat. No. 11,478,653, both of which are incorporated herein by reference in their entirety.

Cardiac electrical signals produced by heart 8 may be sensed by pacemaker 114 using electrodes 132, 134 and/or 142. The raw cardiac electrical signal received via electrodes 132 and 142, electrodes 134 and 142 and/or electrodes 132 and 134, for example, may be processed and analyzed by sensing and control circuitry included in pacemaker 114, e.g., as described below in conjunction with FIG. 4. The EGM signals sensed by pacemaker 114 may be transmitted wirelessly to external device 50 via communication link 55 in some examples. The EGM signals may then be processed and analyzed by internal processing circuitry and/or the processor 52 of external device 50 for determining a ventricular conduction condition using the techniques disclosed herein and selecting a VCS pacing therapy.

Figure 4:
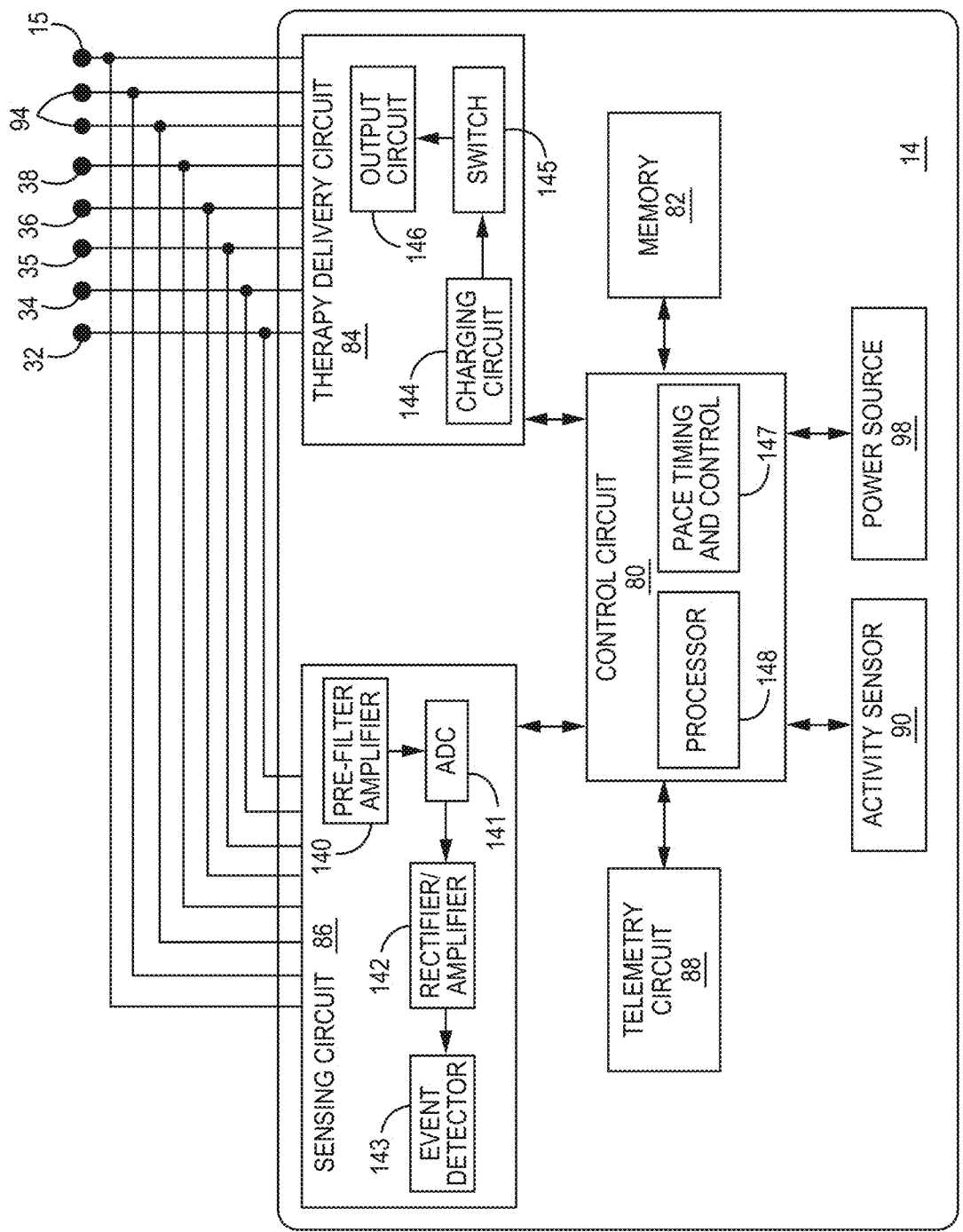
FIG. 4 is a conceptual diagram of circuitry that may be enclosed within an implantable pacemaker configured to deliver VCS pacing therapies and sense cardiac electrical signals according to the techniques disclosed herein.

FIG. 4 is a conceptual diagram of circuitry that may be enclosed within an implantable pacemaker configured to deliver pacing therapies and sense cardiac electrical signals according to the techniques disclosed herein. The diagram of FIG. 4 is described with reference to pacemaker 14, coupled to RA lead 19 carrying electrodes 32 and 34, BB pacing lead 18 carrying electrodes 32 and 34 and CS lead 92 carrying CS electrodes 94 as shown in FIG. 2D, for the sake of convenience. It is to be understood, however, that the functionality attributed to the various circuits and components shown in FIG. 4 may correspond to circuitry enclosed in pacemaker 14 when coupled to other pacing lead and electrode configurations as well as circuitry that may be enclosed by pacemaker 114 of FIG. 4, which may include housing based electrodes 132, 134 and 142.

Furthermore, while only electrodes 32, 34, 35, 36, 38 and 94 are shown coupled to circuitry of pacemaker 14 in the example of FIG. 4, it is to be understood that all available electrodes carried by a lead coupled to pacemaker 14, which may include defibrillation coil electrodes in addition to pacing and sensing electrodes and/or any additional housing-based electrodes, may be coupled to circuitry enclosed by housing 15 to enable selection of a variety of pacing and/or sensing electrode configurations and for supporting determination of a ventricular conduction condition and selection of different VCS pacing therapies. Housing 15 is depicted as an electrode coupled to pacemaker circuitry in FIG. 4 for the sake of convenience because housing 15 may be selected as an electrode in a unipolar pacing or sensing electrode vector in some examples.

The electronic circuitry enclosed within housing 15 includes software, firmware and hardware that cooperatively monitor cardiac electrical signals, determine when a pacing pulse is necessary, and deliver electrical pacing pulses to the patient's heart as needed according to selected VCS pacing therapy and pacing control parameters. The electronic circuitry may include a control circuit 80, memory 82, therapy delivery circuit 84, sensing circuit 86, telemetry circuit 88, an activity sensor 90 and power source 98.

Power source 98 provides power to the circuitry of pacemaker 14 including each of the components 80, 82, 84, 86, 88 and 90 as needed. Power source 98 may include one or more energy storage devices, such as one or more rechargeable or non-rechargeable batteries. The connections between power source 98 and each of the other components 80, 82, 84, 86, 88 and 90 are to be understood from the general block diagram of FIG. 4 but are not shown for the sake of clarity. For example, power source 98 may be coupled to one or more charging circuits included in therapy delivery circuit 84 for providing the power needed to charge holding capacitors included in therapy delivery circuit 84 that are discharged at appropriate times under the control of control circuit 80 for delivering pacing pulses. Power source 98 is also coupled to components of sensing circuit 86, such as sense amplifiers, analog-to-digital converters, switching circuitry, etc., telemetry circuit 88, activity sensor 90 and memory 82 to provide power to the various components and circuits as needed.

The components shown in FIG. 4 represent functionality included in pacemaker 14 (or pacemaker 114) and may include any discrete and/or integrated electronic circuit components that implement analog and/or digital circuits capable of producing the functions attributed to pacemaker 14 (or pacemaker 114) herein. The various components may include an application specific integrated circuit (ASIC), an electronic circuit, a processor (shared, dedicated, or group) and memory that execute one or more software or firmware programs, a combinational logic circuit, state machine, or other suitable components or combinations of components that provide the described functionality. Providing software, hardware, and/or firmware to accomplish the described functionality in the context of any modern medical device, given the disclosure herein, is within the abilities of one of skill in the art.

Control circuit 80 communicates, e.g., via a data bus, with therapy delivery circuit 84 and sensing circuit 86 for cooperatively sensing cardiac electrical signals and controlling delivery of cardiac electrical stimulation pulses in response to sensed cardiac event signals (or absence thereof), e.g., R-waves attendant to ventricular depolarization and/or P-waves attendant to atrial depolarization, in accordance with a selected VCS pacing therapy. Electrodes 32, 34, 35, 36, 38, 94 and housing 15 may be electrically coupled to therapy delivery circuit 84 for delivering electrical stimulation pulses generated by therapy delivery circuit 84. Electrodes 32, 34, 35, 36, 38 and 94 and housing 15 may be electrically coupled to sensing circuit 86 for sensing cardiac electrical signals produced by the heart. Sensing circuit 86 may sense intrinsic signals (such as intrinsic P-waves and intrinsic QRS signals) produced by the heart in the absence of a pacing pulse that captures the heart. Sensing circuit 86 may sense evoked response signals, e.g., pacing-evoked P-waves and pacing evoked R-waves, following a delivered pacing pulse of sufficient energy to cause cardiac capture.

Sensing circuit 86 may include an input pre-filter and amplifier 140 for receiving a cardiac electrical signal from a pair of sensing electrodes, e.g., LBB tip electrode 32 and ring electrode 34, LBB tip electrode 32 and housing 15, ring electrode 34 and housing 15, RA electrodes 36 and 38, and any pair of CS lead electrodes 94a-94d. In some examples, sensing circuit 86 may receive a cardiac electrical signal from a sensing electrode vector that includes coil electrode 35. The filtered and amplified signal may be passed to an analog-to-digital converter (ADC) 141 and a wide bandpass filter for producing a multi-bit digital cardiac electrical signal that may be passed to control circuit 80 and is referred to herein as a cardiac electrogram or "EGM" signal when the raw signal is sensed from electrodes on or within a heart chamber. Features of the EGM signal may be determined by processor 148 of control circuit 80 for use in determining a ventricular conduction condition for selecting a VCS pacing therapy as described below and for verifying pacing capture and selecting a pacing interval.

As further described below, control circuit processor 148 may analyze EGM signals received from sensing circuit 86 to determine the intrinsic ventricular conduction condition and/or the ventricular conduction condition in response to one or more pacing pulses for selecting a VCS pacing therapy, which may be a combination of ventricular pacing sites including at least one VCS pacing site. The VCS pacing therapy may include at least one BB pacing site and may include a second BB pacing site and/or one or more myocardial pacing sites (e.g., via CS electrodes 94) in some examples. Processor 148 may be configured to determine a correction of an abnormal ventricular conduction condition and resulting improvement in ventricular electrical synchrony based on the EGM signal analysis, such as correction of LBB block, correction of RBB block and/or correction of LV conduction delay. The EGM signal(s) and/or data derived therefrom may be transmitted to external device 50 for processing and analysis in some examples. As disclosed herein, in some instances, external device processor 52 may analyze EGM signals received from pacemaker 14 and/or ECG signals sensed from surface electrodes 40 (see FIG. 1) for selecting a VCS pacing therapy.

Sensing circuit 86 may further include a rectifier and narrowband filter/amplifier 142 for receiving the ADC signal and passing a rectified, filtered signal to cardiac event detector 143. Cardiac event detector 143 may produce a cardiac sensed event signal, e.g., a sensed ventricular event signal or a sensed atrial event signal, in response to the rectified signal crossing a sensing threshold amplitude, e.g., an R-wave sensing threshold amplitude or a P-wave sensing threshold amplitude. The sensed event signal is passed to control circuit 80 for use in controlling pacing pulses. For example, in response to receiving an atrial sensed event signal and/or a ventricular sensed event signal from event detector 143, pace timing and control circuit 147 included in control circuit 80 may set a pacing escape interval timer for scheduling a ventricular pacing pulse, e.g., a LBB pacing pulse, at a desired pacing interval, e.g., an AV delay or a ventricular lower rate interval (LRI). Pace timing and control circuit 147 may include various timers or counters for counting down various pacing escape intervals set according to a permanent or temporary pacing mode. The pacing modes may include dual chamber atrial synchronous pacing, ventricular demand pacing, or rate response pacing, as examples. A sensed event signal may cause pace timing and control circuit 147 to trigger or inhibit a pacing pulse depending on the particular pacing mode of the VCS therapy.

Sensing circuit 86 may include multiple sensing channels, e.g., one or more ventricular sensing channel and an atrial event sensing channel. For example, sensing circuit 86 may receive an atrial signal from atrial electrodes 36 and 38, which may be filtered, amplified, rectified and passed to an atrial event detector of event detector circuit 143. Cardiac event detector 143 may sense an atrial event in response to the atrial signal crossing a P-wave sensing threshold. Pace timing and control circuit 147 may receive the atrial sensed event signal and start an AV delay. Upon expiration of the AV delay the therapy delivery circuit 84 may generate a ventricular pacing pulse to be delivered by a selected pacing electrode configuration to provide atrial synchronized ventricular pacing to at least one VCS pacing site, which may be a BB pacing site, according to the selected VCS pacing therapy. A ventricular sensing channel of sensing circuit 86 may include a different narrowband filter than the atrial sensing channel. A ventricular event detector of event detector 143 is configured for sensing ventricular event signals in response to the narrowband filtered ventricular signal crossing an R-wave sensing threshold.

Each atrial sensing channel and ventricular sensing channel may include separate pre-filter/amplifiers 140, ADC 141, rectifier and narrowband filter/amplifier 142 and event detector 143 or some components may be shared between different sensing channels. When multiple ventricular sensing channels are available, control circuit 80 may receive multiple ventricular EGM signals for analysis for determining a ventricular conduction condition, selecting a VCS pacing therapy, and selecting pacing control parameters used to control therapy delivery circuit 84 for generating and delivering pacing pulses according to the VCS pacing therapy. Such pacing control parameters may include the pacing mode, pacing pulse amplitude, pacing pulse width, AV delay, VV delay, LRI, pacing electrode polarity, and pacing electrode vector used to deliver pacing pulses to a given ventricular pacing site of the VCS pacing therapy.

Control circuit 80 may be configured to control therapy delivery circuit 84 to deliver the VCS pacing therapy as a minimized VCS pacing therapy, His bundle pacing therapy, LBB pacing therapy, RBB pacing therapy, bilateral BB pacing therapy, and/or VCS plus LV myocardial pacing therapy. When an RV pacing lead is available as shown in FIG. 2A, a VCS pacing therapy may include an RV myocardial pacing site in some examples. Therapy delivery circuit 84 is a pulse generator configured to generate pacing pulses according to multiple VCS pacing therapies and associated pacing modes and pacing sites under the control of control circuit 80. Therapy delivery circuit 84 includes a charging circuit 144 including one or more charge storage devices such as one or more holding capacitors, an output circuit 146, and switching circuitry 145. Switching circuitry 145 is controlled by control signals from control circuit 80 to control when the holding capacitor(s) of charging circuit 144 are charged and when the charged holding capacitor(s) are discharged through the output circuit 146 to deliver a pacing pulse via selected pacing electrode vector(s) for pacing the desired pacing sites corresponding to the selected VCS pacing therapy.

Output circuit 146 may include switching circuitry for selecting the pacing electrode vector(s) and associated pacing electrode polarities coupled to a holding capacitor of charging circuit 144 via switch 145. For instance, output circuit 146 may include switching circuitry for selecting LBB pacing tip electrode 32 as a pacing cathode electrode with return anode electrode 34 for bipolar pacing or with housing 15 for unipolar pacing. Alternatively, ring electrode 34 may be selected as a cathode electrode with tip electrode 32 selected as the return anode in a bipolar pacing electrode vector or with housing 15 in a unipolar pacing electrode vector. Other pacing electrode vectors may include unipolar or bipolar pacing electrode vectors that include at least one of the CS lead electrodes 94 for pacing the LV myocardium.

Charging of a holding capacitor to a programmed pacing voltage amplitude and discharging of the capacitor for a programmed pacing pulse width may be performed by therapy delivery circuit 84 according to control signals received from control circuit 80. For example, pace timing and control circuit 147 included in control circuit 80 may include programmable digital counters set by a microprocessor of processor 148 for controlling the basic pacing time intervals, which can also be referred to as "escape intervals,"

associated with various single chamber, dual chamber, biventricular, and multi-chamber pacing modes. Control circuit 80 may also set the amplitude, pulse width, polarity, or other characteristics of the cardiac pacing pulses, which may be based on programmed values stored in memory 82.

Therapy delivery circuit 84 may include multiple pacing channels for delivering pacing pulses to the RA, the LBB, the RBB or other locations along the VCS and/or the LV myocardium (and in some cases RV myocardium). Each pacing channel may be coupled to selected electrodes via switching circuitry included in output circuit 146 for selecting various unipolar or bipolar pacing electrode combinations for delivering pacing according to a selected pacing therapy as described herein. In some examples, multiple ventricular pacing sites may be coupled to a common ventricular pacing channel to simultaneously deliver a pacing pulse to multiple sites, e.g., to the LBB and RBB simultaneously or to the LBB and the LV myocardium simultaneously or to the LBB, RBB and LV myocardium simultaneously.

In some examples, additional leads and electrodes may be available, e.g., along BB pacing lead 18 which may be provided as a quadripolar or other multipolar lead (see FIG. 2C, for example) instead of a bipolar lead, to enable bipolar pacing of the RBB and bipolar pacing of the LBB using one bipolar pair of electrodes positioned in the vicinity of the RBB and a second bipolar pair of electrodes position in the vicinity of the LBB. As described above, when the CS lead 92 is coupled to pacemaker 14, one or more pacing electrode vectors may be selected for delivering LV myocardial pacing, which may include any of the electrodes 94 carried by CS lead 92, in combination with LBB, RBB or bilateral BB pacing or other VCS site pacing, e.g., along the superior or inferior portion of the His bundle. An RV lead, e.g., RV lead 17 in FIG. 2A, may include electrodes that may be coupled to sensing circuit 86 and/or therapy delivery circuit 84 for sensing and pacing in the RV and for assessing RV conduction delays and overall ventricular electrical synchrony for determining ventricular conduction conditions using an RV EGM signal in some examples.

Activity sensor 90 may be provided for sensing a signal correlated to patient physical activity for use by control circuit 80 in controlling rate response pacing. In one example, activity sensor 90 includes an accelerometer, e.g., a single or multi-axis piezoelectric sensor or MEMS device, for sensing an acceleration signal. Activity sensor 90 may produce an electrical signal correlated to motion or vibration of activity sensor 90 (and pacemaker 14), e.g., when subjected to patient body motion. Activity sensor 90 may include one or more filter, amplifier, rectifier, analog-to-digital converter (ADC) and/or other components for producing an acceleration signal that may be passed to control circuit 80 for use in determining a patient physical activity metric for controlling rate response pacing.

In various examples, the acceleration signal received from activity sensor 90 may be filtered by a band pass or low pass filter, e.g., a 1-10 Hz bandpass filter or a 10 Hz low pass filter, digitized by an ADC and rectified for use by processor 148 of control circuit 80 for determining a patient physical activity metric. Various activity metrics may be derived from the acceleration signal by control circuit 80 that are correlated to patient physical activity. For instance, the activity metric derived from the acceleration signal may be obtained by integrating the absolute value of an acceleration signal received from activity sensor 90 over a predetermined time duration (such as 2 seconds). The amplitude of the sampled data points over a two-second interval may be summed to obtain the activity metric. This activity metric may be referred to as an "activity count" and is correlated to the acceleration due to patient body motion imparted on the pacemaker 14 during the predetermined time interval. The 2-second (or other time interval) activity counts may be used by control circuit 80 for determining a sensor indicated pacing rate (SIR) for use in controlling rate response pacing. In other examples, the activity count may be further processed, e.g., the 2-second interval activity counts may be averaged or summed over multiple intervals, to determine a patient physical activity metric for use in controlling rate response pacing.

A patient activity metric or SIR may be used to control the rate of ventricular pacing pulses delivered to a combination of ventricular pacing sites according to a VCS pacing therapy. As described below, the patient activity metric or SIR may be used during a selected VCS pacing therapy to control intended ventricular pacing burden by delivering pacing to a combination of ventricular pacing sites including at least one VCS pacing site when the patient activity metric or SIR is greater than a threshold, which may be an indication of a change in a ventricular conduction condition in some patients.

Telemetry circuit 88 includes a transceiver and antenna for communicating with external device 50 (shown in FIG. 1) using radio frequency communication or other communication protocols as described above. Control parameters utilized by control circuit 80 for sensing cardiac events, analyzing EGM signals, and controlling VCS pacing therapy delivery may be programmed into memory 82 via telemetry circuit 88 for retrieval and execution by processor 148 of control circuit 80. Under the control of control circuit 80, telemetry circuit 88 may receive downlink telemetry from and send uplink telemetry to the external device 50. Telemetry circuit 88 may be used to transmit one or more EGM signals acquired using one or more sensing electrode vectors selected from the available electrodes and/or data derived therefrom such as QRS signal features.

Figure 5:
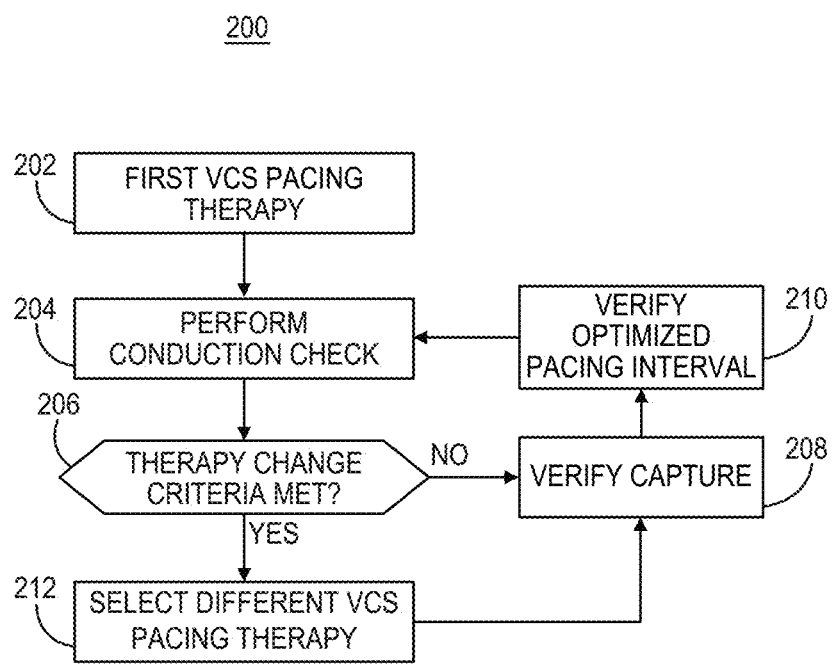
FIG. 5 is a flow chart of a method for selecting and controlling VCS pacing therapy according to one example.

FIG. 5 is a flow chart 200 of a method for controlling VCS pacing therapy according to one example. For the sake of convenience, the process of FIG. 5 is described in the context of control circuit 80 performing processing and analysis of EGM signals and making various determinations, decisions and selections based on that analysis for controlling therapy delivery circuit 84 to deliver pacing pulses according to a selected VCS pacing therapy. However, it is to be understood that at least a portion of the processing and analysis and determinations, decisions and selections attributed to control circuit 80 may be performed by external device processor 52 in some instances, such as at the time of pacemaker implant or during telemetry interrogation sessions or follow up visits or procedures.

Pacemaker 14 may be programmed to operate according to a first VCS pacing therapy at block 202 for controlling the therapy delivery circuit 84 to generate pacing pulses delivered to a first combination of pacing sites that includes at least a VCS pacing site and may include one or more additional pacing sites. The first VCS pacing therapy may be a default initial VCS pacing therapy or programmed by a user based on a clinical assessment of the patient's ventricular conduction condition. For example, the first VCS pacing therapy may be a minimized VCS pacing therapy in which therapy delivery circuit 84 delivers pacing pulses to a combination of ventricular pacing sites including at least one VCS pacing site according to pacing control parameters that are set to minimize the ventricular pacing burden. The minimized VCS pacing therapy may be minimized LBB pacing therapy, minimized RBB pacing therapy, minimized His bundle pacing therapy, minimized bilateral BB pacing therapy or minimized VCS plus LV myocardial pacing therapy as examples. One or more ventricular pacing sites including at least one VCS pacing site may be included in the first VCS pacing therapy.

The ventricular pacing burden of the first VCS pacing therapy may be minimized by setting a VCS pacing interval, which may be set to an AV delay or a ventricular LRT, to a relatively long or extended interval. The ventricular pacing site(s) included in the first VCS pacing therapy may be paced only when the extended AV delay or relatively long ventricular LRT expires without a sensed R-wave. The minimized VCS pacing therapy provides ventricular rate support only when needed while promoting intrinsic conduction of the depolarization arriving from the atria via the AV node through the native His-Purkinje system a majority of the time. The VCS pacing interval, for example, may be set according to a relatively slow ventricular lower rate, e.g., to 30, 40, 50 or 60 pulses per minute, in order to promote intrinsic conduction through the His-Purkinje system. The VCS pacing interval is also be referred to herein as a "BB pacing interval" because it may be used to control pacing of the LBB, RBB or both, either in the area of one or both bundle branches or from a His bundle pacing location. The VCS pacing interval may alternatively be set to a relatively long AV delay, e.g., 160 to 200 ms, to provide atrial synchronous pacing in the absence of a sensed R-wave while promoting intrinsic conduction through the His-Purkinje a majority of the time. It is to be understood that the term "BB pacing interval" may generally refer to a pacing interval used to control the timing of a pacing pulse delivered to any VCS pacing site, which may be the His bundle, LBB, RBB, both the LBB and RBB simultaneously, Purkinje fibers or any combination of VCS pacing sites. As such, the term "BB pacing interval" as used herein is not necessarily limited to controlling a pacing pulse delivered to only to a bundle branch and, unless stated otherwise, may refer to a pacing interval used to control the timing of a pacing pulse to any location of the VCS.

Additionally or alternatively, control circuit 80 may control the therapy delivery circuit 84 to minimize the frequency of delivering VCS pacing pulses during the minimized VCS pacing therapy by controlling therapy delivery circuit 84 to generate VCS pacing pulses when predefined or programmed pacing criteria are met. The pacing criteria are defined by one or more patient conditions during which a ventricular conduction condition abnormality is detected or known to be more likely to occur. For example, delayed conduction or conduction block through the His-Purkinje system may occur during an increased heart rate or increased physical activity. In this case, the therapy delivery circuit 84 may be controlled by control circuit 80 to operate in the minimized VCS pacing therapy by withholding ventricular pacing when pacing criteria are not met, e.g., when the heart rate is less than a threshold rate and/or a sensor indicated pacing rate or activity level is less than a threshold level. Some patients may experience LBB block, RBB or bilateral BB block only during high heart rates or exertion but may have no clinically significant conduction delays through the His-Purkinje system at resting heart rates.

Accordingly, the initial VCS pacing therapy may be a minimized VCS pacing therapy during which therapy delivery circuit 84 generates VCS pacing pulses, e.g., BB pacing pulses delivered to the LBB, RBB or both, at an optimized AV delay when pacing criteria are met and otherwise withholds ventricular pacing. In some examples, the minimized VCS pacing therapy may include setting a BB pacing interval to an extended interval, e.g., a long AV delay or long ventricular LRI, when pacing criteria are not met. When pacing criteria are met, control circuit 80 may control the therapy delivery circuit to adjust the BB pacing interval to a more optimal interval, e.g., an AV delay between 80 to 120 ms, or a LRI, e.g., 60 pulses per minute or set according to the SIR determined from the activity sensor signal, to provide consistent ventricular pacing when patient conditions are likely to be associated with ventricular conduction delays or abnormalities.

In yet another example, the minimized VCS pacing therapy may include an analysis of the intrinsic QRS signals sensed from one or more EGM signals for detecting when a conduction delay or conduction block, e.g., intrinsic BB block, is present and when the conduction delay or conduction block is corrected. During one or more non-paced ventricular cycles, either beat-by-beat or on a periodic basis, control circuit 80 may analyze the QRS signal to detect BB block or corrected BB block, for example, during the intrinsic ventricular rhythm. In response to detecting BB block, control circuit 80 may enable therapy delivery circuit 84 to deliver ventricular pacing using the combination of ventricular pacing sites of the selected VCS pacing therapy. While ventricular pacing is enabled, the control circuit 80 may control therapy delivery circuit 84 to withhold ventricular pacing during one or more ventricular cycles. If control circuit 80 determines that the intrinsic BB block is corrected, control circuit 80 may disable ventricular pacing by therapy delivery circuit 84 until BB block is detected again.

When ventricular pacing is enabled to correct the intrinsic BB block, the ventricular pacing may be delivered to each pacing site of the selected VCS pacing therapy at an optimized AV delay to provide atrial synchronized ventricular pacing. The AV delay may be a rate adaptive AV delay and may be set differently in response to an atrial pacing pulse than a sensed atrial event signal. In other examples, the ventricular pacing may be delivered to each pacing site at an LRI interval, which may be set according to the SIR to provide rate response pacing.

In other examples, the patient may be known to experience more persistent ventricular conduction delays or block, e.g., over a wider range of heart rates or all heart rates, such that the first VCS pacing therapy provided at block 202 may be programmed to single or bilateral BB pacing therapy to correct LBB block and/or RBB block with an intended ventricular pacing burden being at or near 100% of the time (e.g., at or near 100% of ventricular cycles being paced cycles) or at least 50% or a majority of the time (e.g., 50% or more of ventricular cycles being paced cycles). The VCS pacing therapy may operate in an atrial synchronous ventricular pacing mode, e.g., DDD pacing mode, such that a BB pacing interval is set to an AV delay, which may be a rate adaptive AV delay. In other examples, the VCS pacing therapy may be delivered in an atrial non-tracking ventricular pacing mode such that the BB pacing interval is set to an LRI or temporary LRI based on an SIR rate to provide ventricular rate support, e.g., a DVI, DVIR, VVI or VVIR pacing mode. In some examples, the VCS pacing therapy may include pacing mode switching between a permanent atrial synchronous ventricular pacing mode and a temporary non-atrial tracking ventricular pacing mode, e.g., when the atrial rate is greater than a maximum atrial tracking rate. The VCS pacing therapy may be LBB pacing therapy, RBB pacing therapy or bilateral BB pacing therapy to correct a conduction delay in one or both bundle branches and promote temporal fusion of the electrical activation or simultaneous electrical activation of the LBB and the RBB. Other examples of VCS pacing therapies that may be the initial first VCS pacing therapy at block 202 are described below, e.g., VCS plus LV myocardial pacing therapy.

The ventricular conduction condition that is addressed by the first VCS pacing therapy may change over time. As such, at block 204 control circuit 80 may perform a conduction check periodically during the first VCS pacing therapy. The conduction check may be performed at scheduled intervals or times of day. In other examples, the conduction check may be triggered in response to detecting a change in the QRS signal during beat-by-beat or less frequent monitoring of the QRS signal. For example, during the first VCS pacing therapy, control circuit 80 may determine a QRS signal feature, e.g., QRS width, amplitude, or overall morphology, at predetermined time intervals or after a predetermined number of BB pacing pulses. If the QRS signal feature, which may be determined from a single beat or averaged over multiple cycles, is different than a previously determined QRS signal feature, the ventricular conduction condition of the ventricles may have changed. Control circuit 80 may perform a conduction check in response to detecting the change in a QRS signal feature, which may be performed after first verifying capture at the ventricular pacing sites of the first VCS pacing therapy and optimizing the ventricular pacing interval, e.g., the AV delay.

The conduction check may include withholding a ventricular pacing pulse from at least one pacing site of the first VCS pacing therapy. In some examples, control circuit 80 performs the conduction check by controlling the therapy delivery circuit 84 to withhold pacing pulse delivery from all ventricular pacing sites of the first VCS pacing therapy for at least one ventricular cycle and determining one or more features of intrinsic QRS signals from one or more EGM signals received from sensing circuit 86. Control circuit 80 may control therapy delivery circuit 84 to withhold the ventricular pacing pulses for one or more ventricular cycles to enable determination of the intrinsic QRS signal feature(s), which reflect the intrinsic ventricular conduction condition of the His-Purkinje system.

When the first VCS pacing therapy includes ventricular pacing at multiple ventricular pacing sites, the conduction check may include controlling the therapy delivery circuit 84 to withhold pacing pulse delivery to at least one pacing site of the multiple pacing sites and determining QRS signal features following ventricular pacing pulse(s) delivered to fewer than the multiple pacing sites. When ventricular pacing is delivered to fewer than the multiple pacing sites of the first VCS pacing therapy, control circuit 80 may determine the ventricular conduction condition in order to determine if pacing at fewer sites sufficiently corrects an abnormal ventricular conduction condition. It is to be understood that, before determining the ventricular conduction condition when pacing at fewer pacing sites, control circuit 80 may first verify capture at each of the ventricular pacing sites of the VCS pacing therapy and/or optimize the ventricular pacing interval being used to deliver the pacing pulses to the pacing sites, e.g., an AV or VV delay. An abnormal ventricular conduction condition may be detected during pacing at the fewer pacing sites due to loss of capture or inappropriate timing of the pacing pulse. As such, before determining a ventricular conduction condition present during the conduction check, control circuit 80 may at least verify pacing capture at each pacing site that is to be paced during the conduction check and may optimize a ventricular pacing interval such as an AV delay. Techniques for verifying capture and optimizing pacing timing intervals are described below.

As described in various examples below, by removing ventricular pacing sites one at a time from a combination of pacing sites of a VCS pacing therapy, control circuit 80 may determine if a ventricular conduction condition being addressed by pacing at the multiple pacing sites of the VCS pacing therapy has improved or remained the same. If the ventricular conduction condition determined while pacing at fewer than the multiple pacing sites corresponds to a corrected abnormal ventricular conduction condition and corresponding ventricular electrical synchrony, e.g., narrow QRS width and early, synchronous electrical activation times, therapy change criteria may be met at block 206. VCS pacing therapy delivered to fewer pacing sites may be appropriate. If an abnormal ventricular conduction condition is detected when fewer pacing sites are paced during the conduction check, the multiple pacing sites of the VCS pacing therapy may still be needed. In this way, pacing at fewer sites during the conduction check enables control circuit 80 to determine if the VCS pacing therapy including the multiple pacing sites can be adjusted to a different VCS pacing therapy that includes fewer pacing sites or if the first VCS pacing therapy is still needed.

For instance, if the first VCS pacing therapy is LBB plus LV myocardial pacing for addressing a ventricular conduction condition of LBB block and LV conduction delay, control circuit 80 may withhold the LV myocardial pacing pulse and analyze the QRS signal following a LBB pacing pulse (that is verified to be greater than the LBB capture threshold). If the LV conduction delay is corrected, control circuit 80 may determine that therapy change criteria are met at block 206. A change in VCS pacing therapy from the LBB plus LV myocardial pacing therapy to LBB pacing therapy (without LV myocardial pacing) may be made at block 212.

Control circuit 80 may determine one or more QRS signal features for determining the ventricular conduction condition at block 204. The ventricular conduction condition may be determined as being normal conduction, LBB block, RBB block, bilateral BB block, or delayed LV conduction, as examples. Based on the ventricular conduction condition determined from QRS signal features, control circuit 80 may determine if pacing therapy change criteria are met at block 206. Control circuit 80 may determine that the pacing therapy change criteria are met when the ventricular conduction condition addressed by pacing at the ventricular pacing site(s) of the first VCS pacing therapy has changed to a different ventricular conduction condition, which may be an improved condition, which may indicate a need for fewer pacing sites and/or minimized VCS pacing, or a worsened condition, which may indicate a need for more pacing sites and/or non-minimized VCS pacing.

Control circuit 80 may determine a QRS signal feature during the conduction check at block 204 by determining activation times from a VCS pacing pulse to a fiducial point of the QRS signal subsequent to the pacing pulse and/or activation times between QRS signals of two different EGM signals sensed from two different sensing electrode vectors, which may be determined during an intrinsic, non-paced ventricular cycle. Control circuit 80 may additionally or alternatively determine a QRS signal feature during the conduction check by determining a QRS width from one or more EGM signals received from sensing circuit 86. Other QRS signal features that may be determined from one or more sensed EGM signals for determining a ventricular conduction condition and whether VCS pacing therapy change criteria are met may include QRS signal polarity, maximum peak amplitude, time of maximum peak amplitude, maximum positive slope, maximum negative slope, time of maximum positive slope, time of maximum negative slope, polarity pattern of QRS signal peaks, and/or overall QRS waveform morphology compared to that of a representative paced or intrinsic beat. As described below, the QRS signal features may be determined using one or more EGM signals sensed from unipolar and/or bipolar sensing electrode pairs, which may include a sensing electrode positioned in the vicinity of the LBB, RBB, and/or along the LV epicardium.

At block 206, control circuit 80 determines if the QRS feature(s) meet pacing therapy change criteria. Depending on what the first VCS pacing therapy is, the pacing therapy change criteria may be met when the QRS signal feature(s) indicate a different ventricle conduction condition than the condition being treated by the first VCS pacing therapy. Determination of whether therapy change criteria are met may include determining whether the QRS signal feature(s) meet normal conduction criteria, LBB block criteria, RBB block criteria, bilateral (complete) BB block criteria or LV conduction delay criteria, as examples. The pacing therapy change criteria can be met when an abnormal ventricular conduction condition is no longer present when pacing is withheld from at least one pacing site of the first VCS pacing therapy site(s). The pacing therapy change criteria can be met when an abnormal ventricular conduction condition is present, based on the determined QRS signal features, and all of the pacing sites of the first VCS pacing therapy are being paced (and pacing capture is verified and pacing interval(s) optimized). An abnormal ventricular conduction condition is not corrected by the first VCS pacing therapy. When control circuit 80 determines that pacing therapy change criteria are met, control circuit 80 may select a different VCS pacing therapy at block 212 and control therapy delivery circuit 84 to deliver ventricular pacing according to the second VCS pacing therapy at block 212.

For example, when the first VCS pacing therapy is minimized LBB pacing therapy and control circuit 80 determines that LBB block criteria are met during a resting, intrinsic heart rate during the conduction check, control circuit 80 may change from the minimized LBB pacing therapy to LBB pacing therapy at block 212 to promote ventricular electrical synchrony through LBB pacing on most (or at least a majority) of the ventricular cycles. When the first VCS pacing therapy is (non-minimized) LBB pacing therapy and control circuit 80 determines that LBB block criteria are not met based on intrinsic QRS signal features, control circuit 80 may determine that therapy change criteria are met and select the minimized LBB pacing therapy at block 212 to promote intrinsic conduction through the His-Purkinje system a majority of the time. The LBB pacing therapy is intended to have a relatively higher ventricular pacing burden than the minimized LBB pacing therapy.

Control circuit 80 may determine that the pacing therapy change criteria are not met when the ventricular conduction condition determined at block 204 is the same condition being treated by the first VCS pacing therapy. When the pacing therapy change criteria are not met, control circuit 80 continues to control therapy delivery circuit 84 according to the first VCS pacing therapy at block 202.

In some examples, during the currently operating VCS pacing therapy, control circuit 80 may periodically determine if pacing control parameters need to be adjusted or optimized at blocks 208 and 210. The currently selected VCS pacing therapy may be appropriate for the intrinsic ventricular conduction condition, but intrinsic conduction abnormalities may not be corrected when the pacing pulse output is too low resulting in loss of capture at one or more ventricular pacing sites and/or when the ventricular pacing interval, e.g., an AV delay or VV delay, is not optimized. VCS pacing therapy, e.g., LBB pacing as an illustrative example, may be appropriate for the current ventricular conduction condition, e.g., LBB block. However the LBB pacing control parameters may not be optimized. The AV delay may be too short or too long for correcting the LBB block, for example, and/or the pacing pulse output may be set too low for successfully capturing the LBB to correct the LBB block.

Accordingly, during a currently operating VCS pacing therapy, control circuit 80 may determine if pacing parameter adjustment criteria are met by determining one or more post-pace QRS signal features from the EGM signal(s) sensed after therapy delivery circuit 84 delivers a pacing pulse according to the VCS pacing therapy. Control circuit 80 may compare the one or more post-pace QRS signal features to pacing parameter adjustment criteria to determine that pacing parameter adjustment is required. Control circuit 80 may determine an activation time, QRS width or other features of the QRS signal following pacing at the ventricular pacing site(s) of the VCS pacing therapy as described in various examples below.

Control circuit 80 may determine that pacing parameter adjustment criteria are met when the post-pace QRS signal feature(s) indicate that the ventricular conduction condition determined at block 204 is expected to be corrected by the currently selected VCS pacing therapy but is not corrected or another ventricular electrical conduction abnormality is present or introduced during delivery of the selected VCS pacing therapy. Continuing the illustrative example of LBB pacing therapy, LBB block determined at block 204 may not be corrected if the pacing pulse output is too low such that the LBB is not captured. When the LBB block is corrected, ventricular electrical dyssynchrony may still be present if, for example, AV delay is not optimized. Ventricular electrical dyssynchrony may be present when a LBB pacing pulse is delivered below the LBB capture threshold or too early (too short AV delay) causing pacing-induced RBB block. In some examples, control circuit 80 may therefore determine that pacing control parameter adjustment criteria are met when the delivered VCS pacing therapy does not result in a corrected ventricular conduction condition or other ventricular dyssynchrony is present.

As such, control circuit 80 may verify pacing capture at block 208. Control circuit 80 may control the therapy delivery circuit 84 to deliver a pacing pulse to each of the ventricular pacing sites of the VCS pacing therapy one at a time to verify capture at each pacing site individually during a pacing capture test. The pacing pulse output may be increased to ensure capture of the ventricular pacing sites included in the selected VCS pacing therapy. Each pacing pulse may be delivered at a premature pacing interval, e.g., a shortened AV delay or shortened LRI, in order to promote pacing pulse delivery earlier than an intrinsic depolarization. Capture verification may be performed during premature pacing in order to avoid fusion with an intrinsically conducted depolarization, which would lead to confounding results of the capture verification test. In contrast, pacing pulses delivered during the conduction checks performed for determining VCS pacing therapy changes and for optimizing AV or VV delays are delivered at time intervals that are intended to achieve fusion, e.g., between a paced BB and an intrinsically activated BB.

The pacing capture test may include delivering one or more premature pacing pulses at the currently set pacing pulse output (amplitude and pulse width). When an evoked response is detected following the pacing pulse output, e.g., based on a negative deflection of a near-field EGM signal following the pacing pulse, capture is verified. The pacing capture test may include varying the pacing pulse output, e.g., by adjusting the pacing pulse amplitude to multiple settings, for determining the capture threshold based on detecting a pacing evoked response at the lowest pacing pulse output tested. The pacing pulse output may be set to a safety margin greater than the capture threshold. In some cases, when capture is not detected at a given pacing site and the maximum pacing pulse output is reached, control circuit 80 may change a pacing electrode vector or an electrode polarity selected for pacing at a given site in order to improve the likelihood of achieving capture. For example, a different unipolar or bipolar pacing electrode vector may be selected or the pacing electrode polarities may be changed.

At block 210, control circuit 80 may perform a pacing interval test to verify an optimized AV or VV delay. Control circuit 80 may control the therapy delivery circuit 84 to deliver pacing at each ventricular pacing site of the VCS pacing therapy at multiple pacing intervals, e.g., multiple AV delays, to identify an optimal AV delay. The AV delay may be adjusted to promote fusion of the LBB depolarization with an intrinsic RBB depolarization (or vice versa) to correct LBB block and/or RBB block features of the post-pace QRS signals. One example of QRS signal analysis for determining an optimal AV delay is described below in conjunction with FIG. 9. When LV myocardial pacing is provided, control circuit 80 may control therapy delivery circuit 84 to deliver the LV myocardial pacing pulse at multiple VV delays relative to an LBB, RBB or bilateral BB pacing pulse to determine an optimal VV delay based on QRS signal features, e.g., narrowest QRS width and electrical activation time synchrony (minimized activation time differences between QRS signals sensed from different sensing vectors).

While the conduction check, capture verification and pacing interval optimization are shown in three sequential steps in FIG. 5, it is to be understood that these three operations may be performed in a different order and may not be performed sequentially. Conduction checks, capture verification, and timing optimization may each be performed according to independent schedules. However, conduction checks may be performed after verifying capture or include verifying capture so that an uncorrected abnormal ventricular conduction condition is not falsely determined due to loss of capture at a pacing site.

In some cases, control circuit 80 may determine that a maximum number of pacing parameter adjustments have been attempted or all available settings for a given pacing interval have been tested and pacing interval optimization criteria are unmet. In this case, the ventricular conduction condition may have changed requiring a different VCS pacing therapy. A conduction check may be performed by control circuit 80 when pacing interval adjustments do not result in a correction of an abnormal ventricular conduction condition as indicated, for example, by a relatively wide QRS signal, electrical activation time differences at different sensing sites, or an abnormal QRS signal morphology.

Figure 6:
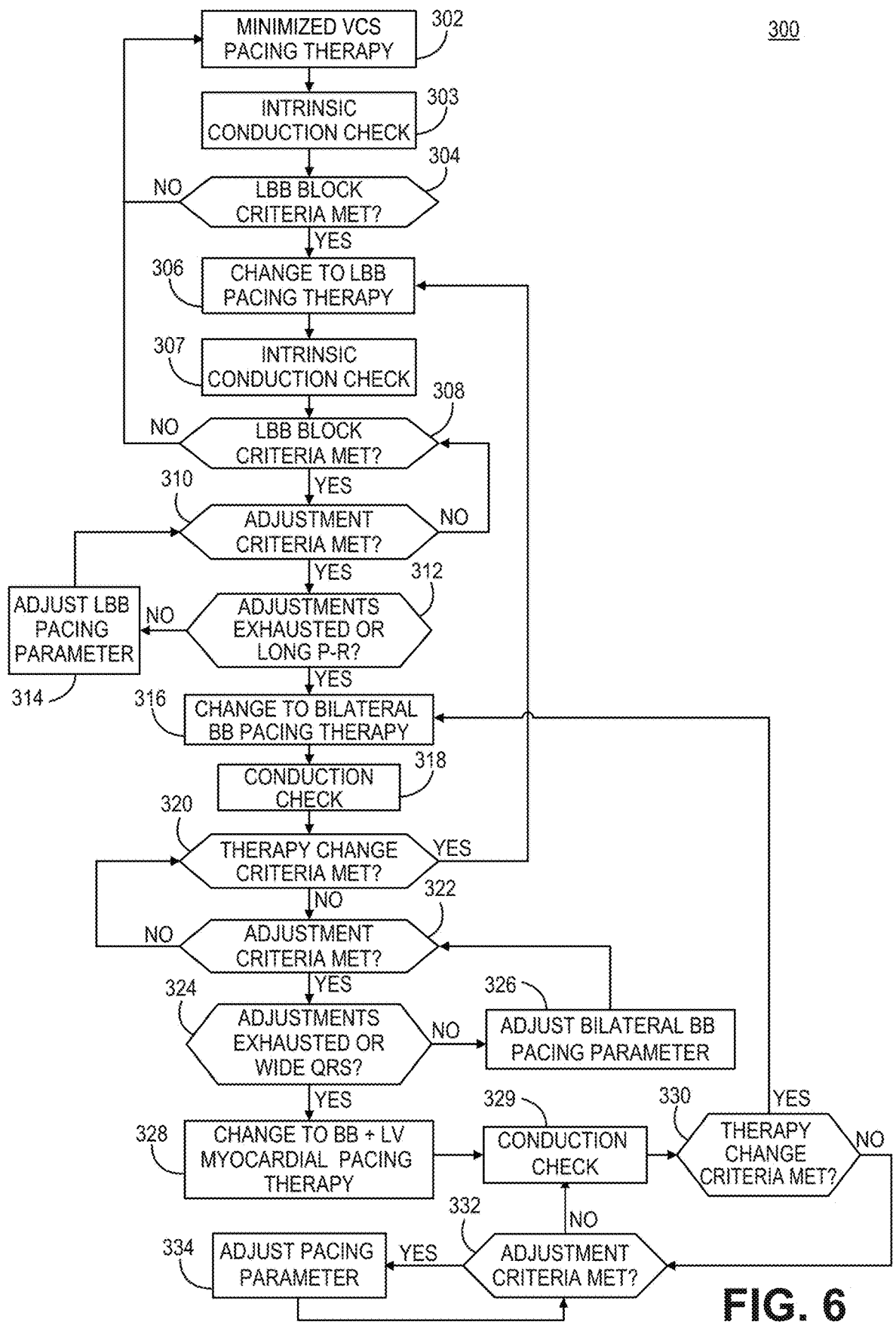
FIG. 6 is a flow chart of a method for selecting and changing between multiple VCS pacing therapies according to one example.

FIG. 6 is a flow chart 300 of a method for controlling VCS pacing therapy according to one example. At block 302, control circuit 80 sets the first VCS pacing therapy to a minimized LBB pacing therapy. The minimized LBB pacing therapy may include atrial pacing and sensing for providing atrial synchronized LBB pacing when pacing does occur. Therapy delivery circuit 84 may be controlled to generate an LBB pacing pulse in response to an extended AV pacing interval expiring before a ventricular event is sensed by sensing circuit 86. The extended AV pacing interval is started in response to an immediately preceding sensed atrial event or atrial pacing pulse). The AV pacing interval may be set to a relatively long interval, e.g., 200 to 300 ms. In other examples, therapy delivery circuit 84 may be controlled to generate an LBB pacing pulse in response to an LRI expiring before a ventricular sensed event signal is sensed by sensing circuit 86. The LRI is started in response to a preceding ventricular sensed event or LBB pacing pulse. The LBB pacing interval may be set to a LRI of 1500 ms or more, as an example.

In this way, the minimized LBB pacing therapy may provide pacing to prevent ventricular asystole while promoting intrinsic His-Purkinje system conduction a majority of the time, with a low ventricular pacing burden. In some patients, the minimized LBB pacing therapy may result in relatively few paced cycles during relatively slower intrinsic heart rates, e.g., at night when the patient is asleep and during resting heart rates, when intrinsic conduction through the His-Purkinje system is sufficient to maintain physiological electrical synchrony of the ventricular chambers. In some examples, the minimized LBB pacing therapy includes monitoring the QRS signal for detection of LBB block and enabling LBB pacing for a limited period of time or number of ventricular cycles. In still other examples, the minimized LBB pacing therapy includes enabling LBB pacing when the heart rate is greater than a threshold rate or when a patient activity metric or SIR is greater than a respective threshold so that the ventricular pacing burden is less than a majority of the time overall, e.g., VCS pacing pulses are less than 50% of all ventricular events, but the ventricular pacing burden is increased during times of increased heart rate or exertion, when LBB block may be more likely to be present. The ventricular pacing burden may be more than 50% during certain limited intervals of time over a 24-hour period during the minimized LBB pacing therapy.

During the minimized LBB pacing therapy, control circuit 80 may perform a conduction check at block 303 to determine if therapy change criteria are met. In this case, therapy change criteria may be met based on LBB block be detected during the intrinsic rhythm, e.g., at a relatively slow or resting heart rate, when an LBB pacing pulse is withheld. In some examples, control circuit 80 may perform the conduction check at block 303 in response to therapy delivery circuit 84 generating a LBB pacing pulse, e.g., due to an expired pacing interval. In other examples, control circuit 80 may perform the conduction check in response to therapy delivery circuit 84 generating a threshold number or frequency of LBB pacing pulses during the minimized LBB pacing therapy.

In other examples, control circuit 80 may perform the conduction check at scheduled time intervals, schedules time(s) of day, or on a beat-by-beat basis to evaluate the intrinsic QRS EGM signal(s) to determine if the VCS pacing therapy change criteria are met, based on a change in the ventricular conduction condition, e.g., a change from normal intrinsic ventricular conduction during a resting heart rate to LBB block. The process of performing a conduction check at block 303 and determining if LBB block criteria are met at block 304 based on EGM signal analysis may be performed on a scheduled basis, e.g., once per minute, once per hour, once per day or other schedule. One or more EGM signals received from sensing circuit 86 may be analyzed for determining when LBB block criteria are met.

LBB block criteria may be met at block 304 when control circuit 80 determines that a QRS width or activation time is greater than a threshold. The threshold may be set based on a previously determined QRS width or activation time so that an increase in QRS width or activation time is detected indicating an LBB block condition. In other examples, control circuit 80 may evaluate the QRS signal morphology of a sensed EGM signal and determine that the morphology is a LBB block morphology. In other examples, control circuit 80 may detect an LBB block condition based on an absence of an LBB potential on the EGM signal from the LBB pacing tip electrode. The presence of the LBB potential signal indicates that the LBB has been depolarized. Determining that the LBB potential signal is present when the minimized LBB pacing therapy is selected and then determining that it is absent during a conduction check is one technique control circuit 80 may be configured to perform for detecting LBB block. Examples of other QRS signal analysis for determining that LBB block criteria are met are described below, e.g., in conjunction with FIGS. 7 and 13. Example methods of operation of pacemaker 14 during the minimized LBB pacing therapy are further described in conjunction with FIG. 8.

Control circuit 80 remains in the minimized LBB pacing therapy (by returning to block 302) when the LBB block criteria are not met and a normal ventricular conduction condition is detected at block 304. A normal ventricular conduction condition with transient LBB block or LBB block only at elevated heart rates is appropriately treated by the minimized LBB pacing therapy.

In response to the LBB block criteria being met at block 304, however, control circuit 80 may change the VCS pacing therapy at block 306 from minimized LBB pacing therapy to (non-minimized) LBB pacing therapy. During the LBB pacing therapy that is not minimized, control circuit 80 is configured to adjust pacing control parameters to increase the likelihood of delivering LBB pacing pulses more frequently, e.g., at least a majority of the time (e.g., majority of ventricular cycles over a 24 hour period) or with a greater ventricular pacing burden than during the minimized LBB pacing therapy.

For example, control circuit 80 may adjust the AV delay for delivering LBB pacing pulses on a beat-by-beat manner that promotes fusion between the LBB evoked response and the RBB intrinsically conducted depolarization. As described below in conjunction with FIG. 9, for example, control circuit 80 may initially adjust the AV delay in an increasing and/or decreasing manner until control circuit 80 determines that an EGM signal received from sensing circuit 86 presents a QRS signal that corresponds to fusion between the intrinsic RBB depolarization and the pacing-evoked LBB depolarization. Control circuit 80 may determine, with no limitation intended, the QRS polarity, QRS maximum and minimum peak polarity pattern, maximum to minimum peak amplitude ratio, QRS width, peak-to-peak time interval, time from LBB pacing pulse to QRS onset or another QRS fiducial point such as QRS peak amplitude (which may be a negative or minimum peak amplitude or a positive or maximum peak amplitude), maximum positive slope, maximum negative slope, time to maximum positive slope (from delivered LBB pacing pulse), time to maximum negative slope, overall waveform morphology match to a previously established normal QRS template, or other example QRS signal features listed herein or any combination thereof. Based on one or more of these QRS signal features, control circuit 80 may set the AV delay to promote fusion between the RBB and LBB depolarizations during the LBB pacing therapy.

The term "fusion" as used herein refers to multiple electrical impulses originating from different locations in the heart depolarizing the same region of the heart at the same time. For example, the patient's native electrical conduction through the RBB may coincide in time with the electrical conduction produced by a LBB pacing pulse (or vice versa). For example, when the LBB pacing pulse is delivered at an optimal time interval, fusion occurs between the native, intrinsic depolarization normally conducted through the RBB and the pacing evoked response to the LBB pacing pulse. Fusion of the LBB pacing evoked response and the intrinsic RBB depolarization (or vice versa) can lead to coordinated, synchronous electrical depolarization of the right and left ventricles and subsequent right and left ventricular contraction (when other ventricular conduction abnormalities are not present). Fusion of a VCS pacing pulse evoked response and an intrinsic depolarization of a BB may be achieved by adjusting the AV delay used to deliver a BB pacing pulse or a His Bundle pacing pulse, e.g., along the distal portion of the His Bundle, that captures one of the LBB or the RBB for fusion with the intrinsic conduction along the opposite bundle branch (RBB or LBB). Fusion can be indicated by a narrow QRS, short activation time differences between different EGM signals, a QRS waveform that does not have a BB block morphology or other QRS features.

After changing to the non-minimized LBB pacing therapy with optimized AV delay, control circuit 80 may periodically perform a conduction check at block 307 to determine the ventricular conduction condition and whether LBB block criteria are still met at block 308. LBB block may be intermittent in some patients or arise during different patient conditions such as activity or increased heart rate. Control circuit 80 may control therapy delivery circuit 84 to withhold one or more LBB pacing pulses at block 307 to analyze the intrinsic QRS signal to determine if LBB block criteria are met. If LBB block criteria are no longer met, control circuit 80 may switch back to the minimized LBB pacing therapy by returning to block 302. Control circuit 80 may determine if LBB block criteria are met using any of the techniques disclosed herein. The LBB pacing may be withheld for one or more cardiac cycles to enable analysis of the intrinsic EGM signal(s) by not starting an escape interval for scheduling the LBB pacing pulse. Alternatively, control circuit 80 may withhold the LBB pacing for one or more cycles by reducing the LBB pacing pulse output (amplitude and/or pulse width) to a low, subthreshold value that does not capture the LBB. In other examples, the LBB pacing is withheld by extending the LBB pacing interval, e.g., the AV delay, for one or more cycles.

When control circuit 80 determines that the LBB block criteria are still met at block 308, control circuit 80 may remain in the LBB pacing therapy that is not minimized. Methods for operating during the non-minimized LBB pacing therapy delivery are described below in conjunction with FIG. 10. During the LBB pacing therapy, control circuit 80 may determine if pacing parameter adjustment criteria are met, e.g., periodically or beat-by-beat, at block 310 by performing pacing capture threshold tests and/or pacing interval optimization tests as generally described above in conjunction with FIG. 5.

When adjustment criteria are met at block 310, control circuit 80 may determine if pacing control parameter setting adjustments have been exhausted at block 312. If not, control circuit 80 may adjust one or more LBB pacing control parameters at block 314. For example, the AV delay may be increased or decreased, which may depend on the adjustment criteria met at block 310. The AV delay may be adjusted based on whether the adjustment criteria met at block 310 indicated the appearance of RBB block or LBB block, after verifying LBB capture by the LBB pacing pulses and adjusting the pacing pulse output as needed. Methods for analyzing the QRS signals and adjusting the AV delay during LBB pacing therapy are described below in conjunction with FIG. 9.

Control circuit 80 may recheck if adjustment criteria are still met at block 310 after adjusting the LBB pacing parameter(s) at block 314. If so, additional adjustments may be made until the adjustment criteria are no longer met or until available settings of adjustable LBB pacing control parameters have been exhausted as determined at block 312. When adjustment criteria are no longer met, control circuit 80 may return to block 308 to remain in the LBB pacing therapy and periodically perform the conduction check to verify that LBB block criteria are still met and that LBB pacing is still needed.

In some cases, the available pacing control parameter settings may be exhausted without achieving LBB capture or corrected LBB block. For instance, if a highest pacing pulse output is reached during a capture test, when premature LBB pacing pulses are delivered, control circuit 80 may switch to a different pacing electrode vector in an attempt to achieve capture. If control circuit 80 has adjusted the AV delay to a shortest AV delay available and LBB block features are still being detected from the EGM signal by control circuit 80, further LBB pacing parameter adjustment may be unavailable for resolving the LBB block. Control circuit 80 may switch the pacing therapy to a bilateral BB pacing therapy at block 316.

By pacing both the RBB and the LBB simultaneously, fusion of the electrical activation of the RBB and LBB may correct the intrinsic LBB block and provide ventricular electrical synchrony. In other instances, control circuit 80 may adjust the AV delay to a longest AV delay available in response to RBB block features being detected from the EGM signal. If RBB block features persist at all available AV delay settings that correct the LBB block, control circuit 80 may determine that adjustments are exhausted at block 312 and change to bilateral BB pacing therapy at block 316 to correct the RBB block. Bilateral BB pacing therapy may include pacing the His bundle when electrodes are positioned in the area of the His bundle in order to recruit both the RBB and LBB. Bilateral BB pacing may therefore include a His bundle pacing site, LBB plus RBB pacing sites, LBB plus His bundle pacing sites, or RBB plus His bundle pacing sites.

In some examples, in addition or alternatively to determining that adjustment criteria are met at block 310, control circuit 80 may determine the P-R interval from EGM signals received from sensing circuit 86. The P-R interval may be determined by control circuit 80 at block 312 during a non-paced ventricular cycle to determine the intrinsic conduction time from an atrial pacing pulse or atrial sensed event signal from sensing circuit 86 to a ventricular sensed event signal received from sensing circuit 86 or to an onset, maximum peak or other fiducial point of the QRS signal of an EGM signal received from sensing circuit 86. If the intrinsic P-R interval is greater than a threshold, control circuit 80 may switch to the bilateral BB pacing therapy at block 316. A long P-R interval is evidence of first degree AV block or possibly other ventricular conduction abnormalities. A long P-R interval may result in poor hemodynamic performance of the heart, which could lead to worsening heart failure symptoms, even when LBB pacing may be timed appropriately for fusion with the RBB activation. Pacing the LBB to promote fusion of the pacing evoked electrical activation of the LBB with the intrinsic electrical activation of the RBB that occurs at a relatively long P-R interval, therefore, is avoided by switching to bilateral BB pacing at block 316 in response to detection of a long P-R interval at block 312. A long P-R interval may be detected by control circuit 80 at block 312 when the P-R interval is determined to be greater than 200 ms, greater than 250 ms, greater than 280 ms or other selected threshold, which may be set differently for detecting AV block following a sensed atrial event vs. AV block following a paced atrial event.

At block 316, control circuit 80 switches to the bilateral BB pacing therapy by selecting a pacing electrode vector configuration and pacing pulse output for pacing both the RBB and the LBB. In some examples, control circuit 80 switches to the bilateral BB pacing therapy by increasing the pacing pulse output to achieve anodal capture when a bipolar pacing electrode pair includes the cathode electrode in the vicinity of the LBB and the anode electrode in the vicinity of the RBB. Thus, in some examples, changing to the bilateral BB pacing therapy involves increasing the pacing pulse output of therapy delivery circuit 84 to greater than the anodal capture threshold, while still using a bipolar pacing electrode pair that may be used for pacing the LBB during the LBB pacing therapy. Simultaneous capture of the LBB and the RBB during the bilateral BB pacing therapy may be achieved to correct for an intrinsic LBB block that occurs with a long intrinsic P-R interval or intrinsic or pacing-induced RBB block that is not corrected during LBB block pacing.

In other examples, control circuit 80 may change to the bilateral BB pacing therapy by selecting a pacing electrode configuration that includes a unipolar pacing electrode vector for pacing the LBB and a second unipolar pacing electrode vector for pacing the RBB. Depending on the electrodes available, two different bipolar pacing electrode vectors may be available for delivering bilateral BB pacing. The bilateral BB pacing is delivered by setting pacing pulse output parameters to a pacing pulse amplitude and width sufficient to capture the RBB and the LBB. The RBB and the LBB may be paced simultaneously, either by a single bipolar pacing electrode pair (anodal plus cathodal capture) or by delivering the RBB pacing pulses and the LBB pacing pulses at equal AV delays when two different pacing electrode vectors are used to promote simultaneous capture of the RBB and the LBB.

Periodically during the bilateral BB pacing therapy, control circuit 80 may perform a conduction check at block 318 to determine QRS signal features during an intrinsic ventricular cycle and/or during an LBB paced cycle. Control circuit 80 may first perform a capture threshold test to verify that each of the RBB and LBB are being captured by the bilateral BB pacing pulses. When each BB is being paced individually by a pacing electrode vector during a capture threshold test, each BB may be paced prematurely by therapy delivery circuit 84 by setting a shortened pacing interval to enable control circuit 80 to detect an evoked response without fusion with the intrinsic depolarization. When being paced by a single bipolar pacing electrode vector, control circuit 80 may verify cathodal and anodal capture following a premature bipolar pacing pulse. Cathodal and anodal capture may be verified as generally disclosed in the above-incorporated U.S. Patent Application No. 63/057,263 and U.S. Patent Application No. 63/112,980 and corresponding U.S. Pat. No. 11,964,160.

After verifying capture of premature pacing pulses of each bundle branch, control circuit 80 may perform the conduction check at block 318 by determining if the QRS signal features determined during an intrinsic rhythm and/or during pacing at fewer than both BB pacing sites meet therapy change criteria. Control circuit 80 may control therapy delivery circuit 84 to withhold one or more bilateral BB pacing pulses for determining if LBB block is still present. Control circuit 80 may determine the P-R interval from an atrial event (sensed P-wave or atrial pacing pulse) to the intrinsic QRS signal. If LBB block is still present and the P-R interval is still longer than a threshold interval, or complete BB block is detected, control circuit 80 may determine that therapy change criteria are not met at block 320 and remain in the bilateral BB pacing therapy. Bilateral BB pacing therapy to capture both the RBB and LBB is still needed to correct the abnormal ventricular conduction condition.

In other examples, control circuit 80 may withhold RBB pacing for one or more ventricular cycles to receive the EGM signal during only LBB pacing and determine if RBB block features are present in the QRS signal(s) during LBB paced cycles. Control circuit 80 may withhold the RBB pacing by decreasing the pacing pulse output delivered by a bipolar pacing electrode to less than a known anodal capture threshold of the RBB or withholding pacing from a RBB bipolar or unipolar pacing electrode vector being used to pace the RBB. Control circuit 80 may adjust the AV delay one or more times to determine if LBB pacing at an appropriately adjusted AV delay results in ventricular electrical synchrony without pacing-induced RBB block. Accordingly in some examples, the conduction check 318 may include withholding RBB pacing and delivering LBB pacing at one or more AV delays to determine if the EGM signal presents a RBB block feature or morphology that still warrants bilateral BB pacing therapy.

When control circuit 80 determines that the intrinsic EGM signal and/or the EGM signal during only LBB pacing does not include a long P-R interval or a RBB block feature or morphology, control circuit 80 may determine that therapy change criteria are met based on LBB block being detected but bilateral BB pacing therapy criteria no longer being met (e.g., based on determining RBB block, bilateral BB block and/or long P-R interval). Control circuit 80 may switch back to the LBB pacing therapy at block 306. During the LBB pacing therapy, control circuit 80 may confirm that LBB block criteria are met at block 308 using any of the techniques described herein. If LBB block criteria are not met, control circuit 80 may switch back to the minimized LBB pacing therapy at block 302 to promote intrinsic His-Purkinje conduction. If LBB block criteria are met at block 308, control circuit 80 may adjust one or more LBB pacing parameters as needed, such as the AV delay and/or pacing pulse output, by checking at block 310 if adjustment criteria are met as described above.

When the therapy change criteria are not met at block 320, based on bilateral BB pacing criteria still being met due to detection of LBB block and intrinsic or non-corrected, pacing-induced RBB block or a long intrinsic P-R interval, control circuit 80 may remain in the bilateral BB pacing therapy.

During the bilateral BB pacing therapy, control circuit 80 may determine on a periodic or beat-by-beat basis if pacing control parameter adjustment criteria are met at block 322. Control circuit 80 may perform capture threshold tests to verify capture of both the LBB and RBB by delivering premature bipolar bilateral BB pacing pulses or individual premature LBB pacing pulses and premature RBB pacing pulses at varying pulse outputs. Control circuit 80 may adjust the pacing pulse output as needed at block 326 to promote bilateral BB pacing capture. Control circuit 80 may adjust the pacing pulse output and/or the pacing electrode configuration to regain capture of both of the RBB and the LBB at block 326 when loss of capture is detected at block 322.

During bilateral BB pacing at one or more AV delays, control circuit 80 may analyze the pacing evoked QRS signal to determine the QRS width, polarity or other features such as the number of peaks and respective polarities, overall waveform morphology, or other example QRS signal features listed herein to verify corrected BB block. When the adjustment criteria continue to be met at block 322 with available adjustments exhausted at block 324, indicating an abnormal ventricular conduction condition even after pacing capture is verified, control circuit 80 may switch to a BB pacing plus LV myocardial pacing therapy at block 328. The ventricular conduction condition may have worsened such that bilateral BB pacing does not fully correct the abnormal ventricular conduction condition. For example, control circuit 80 may determine that the septal to LV myocardial activation time is prolonged, indicating delayed LV conduction that is not corrected during bilateral BB pacing through AV delay adjustments. When the septal to LV myocardial activation time determined by control circuit 80 during bilateral BB pacing at block 322 remains greater than a threshold interval, even after adjusting bilateral BB pacing parameters, LV myocardial pacing to provide improved ventricular electrical synchronization may be required in addition to pacing one or both of the RBB and the LBB. Methods for determining delayed LV conduction based on a septal to myocardial activation time are described below, e.g., in conjunction with FIGS. 13-16.

As such, when the septal to LV myocardial activation time is greater than a threshold and adjustments to the bilateral BB pacing parameters are exhausted without a narrowing of the QRS width or other normalization or correction of the QRS waveform morphology, control circuit 80 may switch to the VCS plus LV myocardial pacing therapy at block 328. This pacing therapy may only be available when pacemaker 14 is coupled to a coronary sinus lead, e.g., as shown in FIG. 2D, to enable pacing of the LV myocardium.

The VCS plus LV myocardial pacing therapy may include pacing of at least one VCS pacing site, which may be one bundle branch, e.g., the LBB or the RBB, or bilateral BB pacing. Pacemaker operations during the VCS plus LV myocardial pacing therapy are described below in conjunction with FIG. 17. Changing to the VCS plus LV myocardial pacing therapy may include delivering LBB pacing with the added LV myocardial pacing simultaneously at an AV delay interval that is adjusted to fuse the electrical activations of the LBB and LV myocardium with the intrinsic RBB activation time. In other examples, the RBB and LBB and LV myocardium may be paced simultaneously to achieve a narrower QRS width or other normalization of the pacing evoked EGM QRS signal. In still other examples, the VCS plus LV myocardial pacing therapy may include delivering the RBB pacing pulse separated from simultaneous LBB and LV myocardial pacing pulses by a VV delay to achieve a narrowing of the QRS width and shortened septal to LV myocardial activation time or other normalization of the pacing evoked EGM QRS signal.

For instance, in some patients, earlier pacing of the LBB and the LV myocardium than the RBB pacing (or vice versa) may improve the QRS width or overall QRS morphology, as evidence of overall improved ventricular electrical synchrony. The LBB and LV myocardial pacing pulses may be delivered simultaneously at an AV delay to provide atrio-ventricular synchrony followed by an RBB pacing pulse at a VV delay to promote ventricular electrical synchrony. In some patients, the RBB pacing pulse may be delivered an AV delay followed by simultaneous LBB and LV myocardial pulses at a VV delay, and in some cases the LBB and LV myocardial pacing pulses may be separated by a VV delay.

During the VCS plus LV myocardial pacing therapy, control circuit 80 may periodically perform a conduction check at block 329 to determine the ventricular conduction condition. Based on the ventricular conduction condition, control circuit 80 may determine if therapy change criteria are met at block 330. As described above, the conduction check may be performed after verifying pacing capture at each of the pacing sites of the VCS plus LV myocardial pacing sites to avoid determining a change in a ventricular conduction condition when loss of capture is occurring during the conduction check. The conduction check at block 329 may include withholding an LV myocardial pacing pulse to determine if the septal to myocardial activation time is less than a threshold when the LV myocardial pacing is not delivered. Control circuit 80 may determine that therapy change criteria are not met at block 330 when the ventricular conduction condition determined at block 329 includes an LV conduction delay based on a relatively long septal to myocardial activation time, which may be determined from EGM QRS signals sensed following VCS pacing pulses, e.g., LBB or bilateral BB pacing pulses. Control circuit 80 may determine that the therapy change criteria are not met by withholding the LV myocardial pacing for one or more ventricular cycles and determining the QRS signal width and/or the septal to myocardial activation time during VCS pacing without LV myocardial pacing, e.g., single or bilateral BB pacing. When the therapy change criteria are not met at block 330, control circuit 80 may remain in the VCS plus LV myocardial pacing therapy by advancing to block 332. Methods for performing a conduction check during VCS plus LV myocardial pacing are described below in conjunction with FIGS. 15 and 16.

If the septal to myocardial activation time is less than a threshold when LV myocardial pacing is withheld, indicating an improved ventricular conduction condition that does not include an LV conduction delay, control circuit 80 may determine that therapy change criteria are met at block 330. While not shown in FIG. 6, in some examples, control circuit 80 may return to block 303 to determine if LBB block criteria are met at block 304 based on the intrinsic conduction check at block 303. Control circuit 80 may subsequently determine whether to change from the VCS plus LV myocardial pacing therapy back to the minimized LBB pacing therapy, or to the LBB pacing therapy (non-minimized) or to the bilateral BB pacing therapy based on analysis of the EGM QRS signals at blocks 304, 308 and 312, in some examples.

In the example shown in FIG. 6, control circuit 80 may return to block 316 in response to determining that the therapy change criteria are met at block 330. Control circuit 80 may change from the VCS plus LV myocardial pacing therapy to the bilateral BB pacing therapy at block 316. Control circuit 80 may perform the conduction check at block 318 during the bilateral BB pacing therapy to determine if RBB block is present when RBB pacing is withheld based on analysis of the EGM QRS signals following LBB pacing pulses. Control circuit 80 may determine that therapy change criteria are not met at block 320 when RBB block is detected and remain in the bilateral BB pacing therapy by advancing to block 322. Example techniques for determining that RBB block criteria are met are described in conjunction with FIG. 11. However, if therapy change criteria are met at block 320, based on RBB block not being detected during LBB pacing, control circuit 80 may return to block 306 to switch to the LBB pacing therapy and subsequently determine if LBB block criteria are met in a conduction check at block 308.

In this way, when the QRS width is less than a threshold width without LV myocardial pacing as determined at block 330 after the conduction check at block 329, control circuit 80 may evaluate the QRS signal by successively pacing at fewer ventricular pacing sites during each conduction check (e.g., at block 318 and block 306) to determine which VCS pacing therapy (e.g., minimized LBB pacing, non-minimized LBB pacing, or bilateral BB pacing) is appropriate to change to after the VCS plus LV myocardial pacing therapy based on the ventricular conduction condition.

When the therapy change criteria are not met at block 330 during the VCS plus LV myocardial pacing therapy, control circuit 80 may remain in the VCS plus LV myocardial pacing therapy and analyze the QRS signal during the pacing therapy to determine if adjustment criteria are met (block 332). If not, control circuit 80 returns to block 329 to wait for the next conduction check, e.g., according to a scheduled, periodic basis. If the adjustment criteria are met at block 332, control circuit 80 subsequently adjusts one or more pacing control parameters at block 334. For example, at block 332, control circuit 80 may perform a periodic capture test by delivering premature pacing pulses to each pacing site of the VCS plus LV myocardial pacing therapy sites one at a time. When an evoked response is detected at the pacing site, capture is verified. Pacing pulses may continue to be delivered at the given pacing site during the VCS plus LV myocardial pacing therapy according to the current pacing pulse output. In some instances, control circuit 80 may vary the pacing pulse output to determine the capture threshold at each pacing site to adjust the pacing pulse output to a safety margin greater than the capture threshold.

After verifying capture, control circuit 80 may determine if a QRS width and/or activation time is greater than a respective threshold during a paced cycle. If so, the AV delay and/or VV delay being used to control the relative timing of the RBB pacing pulses, the LBB pacing pulses and the LV myocardial pacing pulses may require adjustment. Control circuit 80 may adjust an AV delay and/or a VV delay at block 334 until the QRS signal feature(s) no longer meet adjustment criteria at block 332. In some cases, the adjustment criteria are not met at block 332 when a maximum number of adjustments or all adjustable settings of a given pacing control parameter are exhausted even if the QRS signal features do not meet an expected improvement in ventricular electrical synchrony during the VCS plus LV myocardial pacing therapy.

In FIG. 6 and other flow charts presented herein, control circuit 80 changes the VCS pacing therapy by selecting one or more pacing electrode vectors for pacing the desired ventricular pacing sites according to the selected VCS pacing therapy. Changing the VCS pacing therapy may also include changing pacing control parameters to reduce (or increase) the percentage of paced cycles (pacing burden), when changing between the minimized VCS pacing therapy and a non-minimized VCS pacing therapy, for example.

Changing the pacing electrode vectors selected for pacing at the VCS pacing therapy pacing sites may include adding or removing a pacing electrode vector that is switchably coupled to therapy delivery circuit 84 for delivering pacing to a ventricular pacing site. For example, when a change is made from bilateral BB pacing therapy to bilateral BB plus LV myocardial pacing, a pacing electrode vector selected from the CS lead electrodes 94 may be added for pacing the LV myocardium. When a change from a bilateral BB pacing therapy to LBB pacing therapy is made, the pacing electrode configuration may be adjusted by removing a pacing electrode vector selected for pacing the RBB, e.g., a unipolar pacing electrode vector between the BB pacing ring electrode 34 and the housing 15. In other examples, control circuit 80 changes the bilateral BB pacing therapy to the LBB pacing therapy by adjusting the pacing pulse output to remove RBB pacing when bipolar bilateral BB pacing is delivered by cathodal and anodal capture at the BB pacing tip electrode 32 and BB pacing ring electrode 34. A change in the pacing electrode vector(s) coupled to output circuitry of therapy delivery circuit 84 for delivering the VCS pacing therapy may not be required in this instance. Only a change in pacing pulse output to a pulse energy that is less than the anodal capture threshold is required to change the VCS pacing therapy from a bilateral BB pacing therapy to LBB pacing therapy, for example.

In the example methods of FIG. 6, each conduction check performed during a given VCS pacing therapy (e.g., at blocks 303, 307, 318 and 329) may be performed during an intrinsic ventricular cycle (all ventricular pacing withheld) and/or by withholding pacing at the most recently added ventricular pacing site. When a new VCS pacing therapy is selected based on a ventricular conduction condition, a pacing site may be added, such as the RBB or an LV myocardial pacing site, to correct the ventricular conduction condition. The conduction check may be performed by withholding pacing from the most recently added pacing site (e.g., at the RBB or the LV myocardial site) to determine if pacing at that added pacing site is still needed or if the ventricular conduction condition is corrected without pacing at the most recently added site. If this is the case, the VCS pacing therapy is changed to remove the most recently added pacing site (e.g., LV myocardium or RBB).

Figure 7:
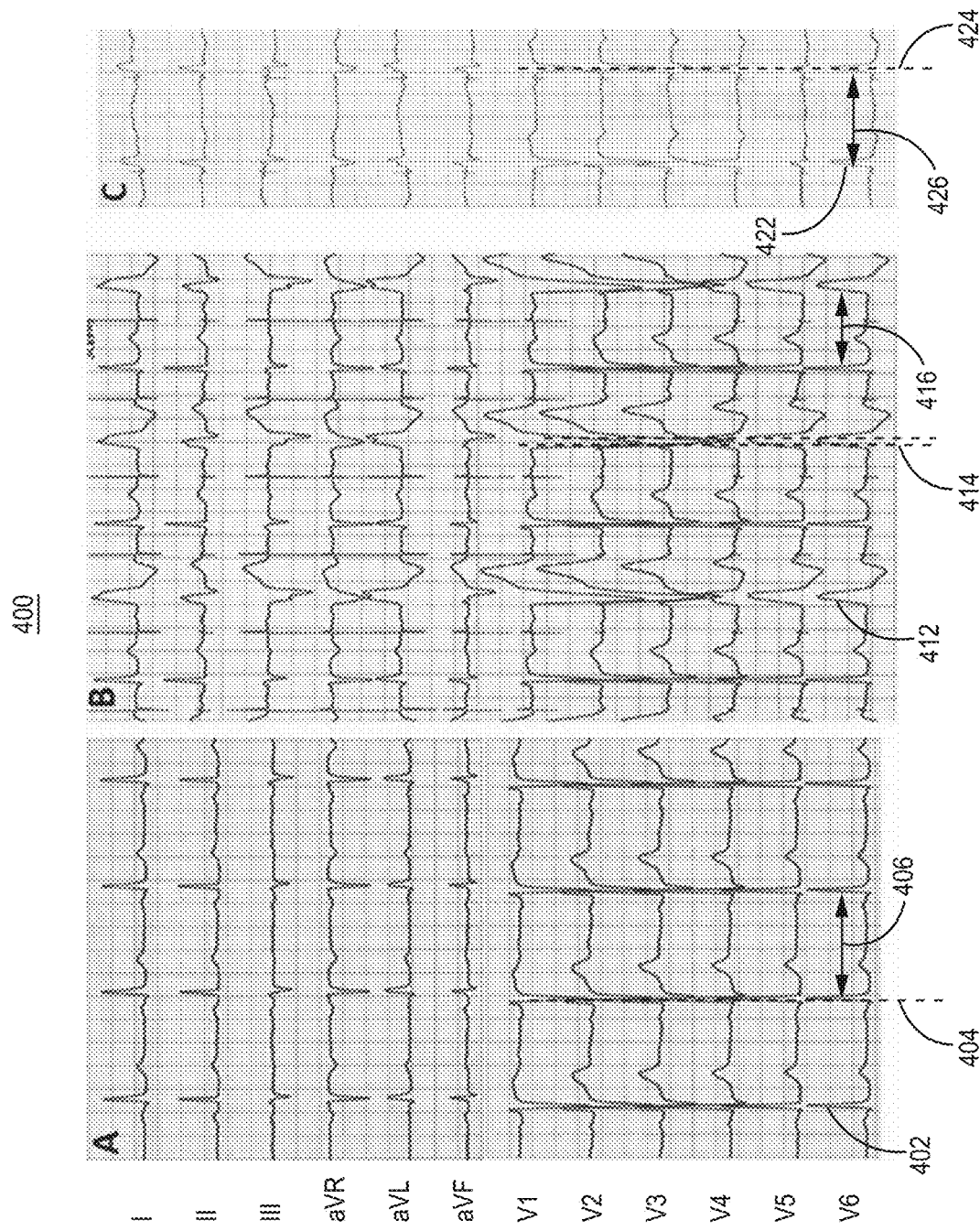
FIG. 7 is a diagram of electrocardiogram (ECG) signals that may be sensed during a normal ventricular conduction condition (panel A) and during a left bundle branch (LBB) block condition (panel B) and during LBB pacing therapy (panel C) selected in response to detecting the LBB block condition according to one example.

FIG. 7 is a diagram 400 of electrocardiogram (ECG) signals that may be sensed during a normal ventricular conduction condition (panel A) and during an LBB block condition (panel B) and during LBB pacing (panel C) delivered in response to detecting the LBB block condition according to one example. In panel A, ECG signals obtained from surface electrodes are shown during an intrinsic cardiac rhythm (no pacing) and a heart rate of 65 beats per minute (corresponding to RR interval 406). The QRS waveforms 402 are narrow and the QRS peaks are aligned in time in the V1-V6 signals indicating a short or no activation time difference 404 between the right and left ventricles, indicating normal conduction through the RBB, LBB and Purkinje fibers. The narrow QRS width and short activation time difference indicate normal intrinsic ventricular conduction with electrical synchrony between the RBB and the LBB activations. These conditions, e.g., QRS width less than a threshold width and activation time difference between maximum peaks of different sensing electrode vectors less than a threshold activation time difference, may be determined as a normal ventricular conduction condition during a conduction check performed by processing circuitry of IMD system 10 of FIG. 1.

In panel B, ECG signals sensed from surface electrodes 40 (FIG. 1) during an increased heart rate of 78 beats per minute (corresponding to RR interval 416) present wider QRS waveforms 412 and electrical dyssynchrony between the RV and LV electrical depolarizations as observed by a shift in the alignment of the maximum QRS peaks in the V5 and V6 signals compared to the V1 and V2 signals, which may be determined as an increased activation time difference 414. These changes in the ECG signals of a wider QRS signal 412 and an increase in the activation time difference 414 corresponding to later activation of the LV than the RV may be determined as an LBB block condition during a conduction check performed by processing circuitry of IMD system 10 of FIG. 1. While the cardiac electrical signal sensed from implanted electrodes by the pacemaker 14 is not shown in FIG. 7, it is to be understood that, while operating in the minimized LBB pacing therapy at block 302 of FIG. 6, control circuit 80 may determine a QRS width from one or more sensed EGM signals and/or an activation time difference between two EGM signals sensed by pacemaker 14 from different ventricular sensing electrode vectors for determining a normal ventricular conduction condition or an LBB block condition during one or more intrinsic, non-paced ventricular cycles during a conduction check (e.g., at block 303 during minimized LBB pacing therapy or at block 307 during LBB pacing therapy).

In some patients, an increase in heart rate may lead to abnormal conduction condition, such as LBB block as illustrated by panel B. As such, an increase in intrinsic heart rate may be detected by control circuit 80 as an LBB block condition in some examples, in addition to or alternatively to determining the QRS width and/or an activation time difference from sensed cardiac electrical signals. In response to detecting the increased heart rate, e.g., a heart rate greater than 75, 80, 85, or 90 beats per minute (which may be tailored to a patient's need), control circuit 80 may enable therapy delivery circuit 84 to generate and deliver LBB pacing pulses. As shown in panel C, during LBB pacing the width of QRS signal 422 is decreased compared to panel B and the peak amplitudes of the QRS signals from different ECG sensing electrode vectors are aligned in time reducing the activation time difference 424.

Minimized LBB pacing may correct LBB block that occurs intermittently or at increased heart rate in some patients. As such, control circuit 80 may enable therapy delivery circuit 84 to temporarily deliver LBB pacing pulses during the minimized LBB pacing therapy in response to determining that LBB block criteria are met during a conduction check and/or when a sensed ventricular rate, atrial rate (sensed or paced), or patient physical activity-based SIR is greater than a threshold rate.

In other examples, control circuit 80 may change from the minimized LBB pacing therapy to LBB pacing therapy when LBB block criteria are met, which may include determining that the heart rate or SIR is greater than a threshold rate. The therapy delivery circuit 84 may be controlled to deliver LBB pacing pulses during the LBB pacing therapy in an atrial synchronous ventricular pacing mode by setting an AV delay and generating the LBB pacing therapy in response to the expiration of the AV delay. In other instances, therapy delivery circuit 84 may be controlled to deliver LBB pacing pulses during the LBB pacing therapy by setting LBB pacing interval to an LRI set according to a programmed minimum pacing rate or a temporary rate response pacing rate. The paced ventricular cycle length 426 may therefore vary over time during the LBB pacing therapy, e.g., according to atrial rate or according to a rate response pacing interval set according to an SIR.

Control circuit 80 may enable therapy delivery circuit 84 to generate and deliver LBB pacing pulses until the LBB block condition is no longer detected, e.g., during the intrinsic conduction check at block 307 of FIG. 6. In some examples, the LBB block criteria are no longer met at block 307 of FIG. 6 when the heart rate or SIR is less than a threshold. Control circuit 80 may respond to determining a normal conduction condition at block 307 of FIG. 6 by changing from the LBB pacing therapy back to the minimized LBB pacing therapy. In this way, in a patient that may not experience sustained LBB block, LBB pacing therapy is provided when control circuit 80 determines an LBB block condition or a heart rate or patient physical activity that is greater than a threshold associated with the onset of LBB block in a given patient.

It is to be understood that when heart rate is determined for comparison to a threshold for use in selecting the VCS pacing therapy, control circuit 80 may determine the atrial rate, e.g., based on the intervals between sensed P-waves and/or atrial pacing pulses. LBB block may be present when the atrial intrinsic or paced rate is increased above a threshold rate, which may cause control circuit 80 to change to the LBB pacing therapy and change back to the minimized LBB pacing when the atrial rate decreases below the threshold rate. In other examples, instead of changing to LBB pacing therapy in response to a threshold heart rate, SIR or activity level, control circuit 80 may be configured to perform a conduction check in response to determining that the heart rate, SIR, or activity level is greater than a respective threshold. In some patients, the physiological conditions that cause LBB block (or RBB block) to appear may not be predictable. As such, control circuit 80 may perform a conduction check, or more frequent conduction checks, when conditions such as heart rate, SIR or activity level increase or decrease in order to detect a change in the ventricular conduction condition and appropriately change the VCS pacing therapy.

In some examples, the criteria such as various thresholds or other requirements used by control circuit 80 for determining an LBB block during the minimized LBB pacing therapy may be set differently than the criteria for determining the LBB block during a conduction check during the LBB pacing therapy. In this way, frequent changes between VCS pacing therapies may be avoided and changing back to a minimized LBB pacing therapy may be performed when normal ventricular conduction is determined with a high degree of confidence.

Figure 8:
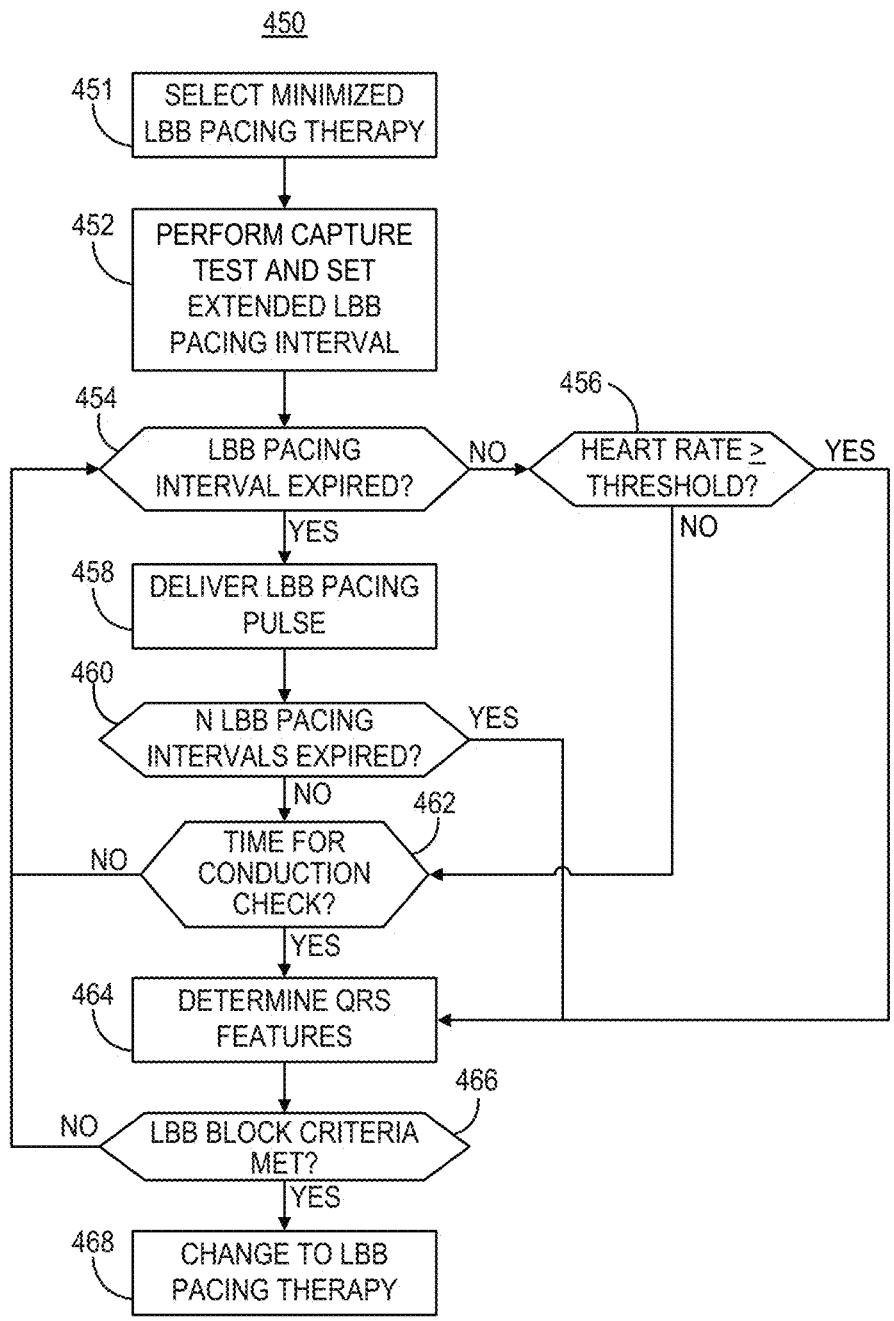
FIG. 8 is a flow chart of a method for operating according to a minimized VCS pacing therapy according to one example.

FIG. 8 is a flow chart 450 of a method of operating to deliver the minimized LBB pacing therapy according to one example. The operations described in conjunction with flow chart 450 may correspond to operations performed by control circuit 80, in cooperation with therapy delivery circuit 84 and sensing circuit 86, during the minimized LBB pacing therapy.

Upon selecting the minimized LBB pacing therapy at block 451, control circuit 80 may perform a capture test at block 452 to verify that the LBB is captured by an LBB pacing pulse delivered by therapy delivery circuit 84. Control circuit 80 may control therapy delivery circuit 84 to deliver a pacing pulse at a premature pacing interval, e.g., at a ventricular pacing rate that is at least 10 to 30 beats faster than the intrinsic or paced atrial rate. Capture of the LBB is verified by analysis of a sensed QRS signal. LBB capture may be verified based on the presence of an evoked QRS signal following the LBB pacing pulse. In some examples, LBB capture is verified when a post-pace QRS signal has features or morphology corresponding to RBB block which may appear due to early capture of the LBB. Control circuit 80 may verify capture at the current pacing pulse output settings and determine that no adjustment is needed when capture is verified. In other instances, control circuit 80 may perform a capture threshold search, particularly if LBB capture is not verified, by varying the pacing pulse amplitude between multiple settings to identify the lowest pacing pulse amplitude resulting in LBB capture. Control circuit 80 may set the pacing pulse output to an amplitude and pulse width that is a safety margin greater than the determined capture threshold.

After confirming capture and setting the pacing pulse amplitude to be greater than the capture threshold, control circuit 80 may set an extended LBB pacing interval at block 452 in order to minimize the ventricular pacing burden during the minimized LBB pacing therapy and promote intrinsic ventricular conduction. The LBB pacing interval may be an AV delay set to control the timing of an LBB pacing pulse following an atrial pacing pulse or sensed atrial P-wave. In other examples, the LBB pacing interval may be an LRI set to control the timing of the LBB pacing pulse following a sensed R-wave or delivered LBB pacing pulse to maintain a minimum ventricular rate. The LBB pacing interval may be set to a maximum available pacing interval to effectively inhibit or withhold LBB pacing during the minimized LBB pacing therapy to promote intrinsic ventricular conduction.

If the LBB pacing interval does not expire ("no" branch of block 454) control circuit 80 may determine if the heart rate is greater than or equal to a threshold rate (block 456). Control circuit 80 may require that at least a threshold number of most recent atrial event intervals or sensed ventricular event intervals be less than a rate interval corresponding to the heart rate threshold or that a mean or median rate interval be less than or equal to the interval associated with the heart rate threshold. The heart rate may be the sensed ventricular rate, the atrial rate (sensed and/or paced) or an SIR based on the activity sensor signal in various examples. In other examples, instead of determining a heart rate or SIR and comparing the rate (or associated interval) to a threshold, control circuit 80 may compare an activity metric to an activity level threshold at block 456.

If the rate (or activity) does not meet the threshold requirement at block 456, control circuit 80 may advance to block 462 to determine if it is time for a conduction check. If the rate (or activity) is greater than or equal to the threshold at block 456, control circuit 80 may advance to block 464 to determine QRS signal features to determine the ventricular conduction condition. In other examples, control circuit 80 may advance directly to block 468 to change to the LBB pacing therapy in response to the heart rate being greater than a threshold rate. As described above, some patients may be known to experience LBB block at elevated heart rates or activity levels. As such, control circuit 80 may proactively change to the (non-minimized) LBB pacing when a rate or activity level reaches a threshold above which LBB block is likely to occur.

In some examples, control circuit 80 may proactively change between the LBB pacing therapy and the minimized LBB pacing therapy based on the time of day. Instead of checking the heart rate at block 456, control circuit 80 may respond to the time of day reaching a programmed time of day for changing VCS pacing therapy. The patient may be likely to have normal ventricular conduction at rest, during sleeping hours, such that control circuit 80 and therapy delivery circuit 84 may operate in the minimized LBB pacing therapy during nighttime hours, for example. During daytime hours, control circuit 80 and therapy delivery circuit 84 may operate in the LBB pacing therapy. In other instances, instead of proactively changing between minimized and non-minimized VCS pacing therapies based on time of day, control circuit 80 may alter the rate of performing conduction checks at block 462. Conduction checks may be performed less frequently during nighttime hours and more frequently during daytime hours, for example, for controlling changes between minimized and non-minimized VCS pacing therapies.

Referring again to block 454, if the LBB pacing interval expires without a ventricular sensed event signal received from sensing circuit 86, therapy delivery circuit 84 may generate and deliver an LBB pacing pulse at block 458 in response to the expiration of the extended LBB pacing interval. In some examples, however, delivery of the LBB pacing pulse during the minimized LBB pacing therapy is optional. The extended LBB pacing interval may be set by control circuit 80 as a method for triggering a conduction check or a VCS pacing therapy change when the LBB pacing interval expires a threshold number of times without a sensed R-wave.

At block 460, control circuit 80 may determine if a threshold number of the extended LBB pacing intervals have expired. The threshold number may be one, two, three or other selected number. When the threshold number is greater than one, the control circuit 80 may require that two or more consecutive extended LBB pacing intervals expire at block 460 for triggering a conduction check. In other examples, the two or more extended LBB pacing intervals that expire may reach the threshold criteria at block 460 when the expired LBB pacing intervals are non-consecutive but occur at a specified frequency, e.g., two out of 10, three per minute, or other specified frequency.

When control circuit 80 determines that the threshold number of expired LBB pacing intervals is reached at block 460, control circuit 80 may advance to block 464 to determine QRS signal features as part of a conduction check to determine the ventricular conduction condition and whether there is a need for changing the VCS pacing therapy. In other examples, in response to the threshold number of expired LBB pacing intervals, control circuit 80 may advance directly to block 468 to change from the minimized LBB pacing therapy to the LBB pacing therapy without requiring a conduction check.

When the threshold number of LBB pacing intervals has not expired, control circuit 80 may determine if it is time for a conduction check at block 462. In some examples, control circuit 80 may determine that it is time for a conduction check at block 462 in response to one or more LBB pacing intervals expiring but fewer than the threshold number N applied at block 460. When the threshold number N LBB pacing intervals have expired, control circuit 80 may advance directly to block 468 to switch to the LBB pacing therapy without further analysis of the cardiac electrical signal. However, when at least one LBB pacing interval has expired, control circuit 80 may determine that it is time for a conduction check at block 462.

In other examples, a conduction check may be performed in response to the threshold number of extended LBB pacing intervals expiring at block 460 or in response to the heart rate, SIR or activity level being greater than or equal to a corresponding threshold at block 456. Control circuit 80 may additionally or alternatively determine that it is time for a conduction check according to a periodic schedule, e.g., once per day, once per hour, once per minute, every N ventricular cycles or other scheduled basis. In some examples, when a scheduled time for a conduction check has arrived, control circuit 80 may verify that other conduction check conditions are satisfied before performing the conduction check. For example, the control circuit 80 may verify that a ventricular tachyarrhythmia is not being detected.

It is to be understood that while flow chart 450 is described as performing a conduction check during the minimized LBB pacing therapy on a scheduled and/or triggered basis, in other examples, the conduction check may be performed on a beat-by-beat basis. Control circuit 80 may determine QRS signal features at block 466 from the sensed EGM signals(s) on each ventricular cycle and make the determination as to whether LBB block criteria are met at block 466 on each ventricular cycle. The decision that LBB block criteria are met at block 466 may require more than one ventricular cycle be detected as an LBB block cycle. Nonetheless, when the determination at block 466 is made on a beat-by-beat basis, detection of LBB block and the decision to switch to the non-minimized LBB pacing therapy may be made promptly when LBB block first develops. In this way, the response time of control circuit 80 in starting non-minimized LBB pacing therapy may be kept to a minimum when the ventricular conduction condition changes from normal conduction to LBB block.

The QRS signal features determined by control circuit 80 at block 464 may include the QRS width, an activation time difference between two different sensing sites, the overall QRS morphology, the maximum or minimum QRS peak amplitude, the time of the maximum or minimum QRS peak following an atrial P-wave or atrial pacing pulse, the maximum positive slope, the maximum negative slope, the time of a maximum positive or negative slope relative to an atrial P-wave or atrial pacing pulse, the QRS polarity or polarity pattern of QRS signal peaks, or other examples of QRS signal features listed herein or any combination thereof. In some examples, the atrial-septal conduction time may be determined by determining the time from an atrial pacing pulse or atrial sensed event signal to a maximum peak amplitude of the QRS waveform sensed using the BB pacing tip electrode 32 and/or ring electrode 34. An activation time difference may be determined as the time interval from the maximum peak amplitude of the QRS waveform sensed from a first sensing electrode site, e.g., in the interventricular septum, to the maximum peak amplitude of the QRS waveform sensed from a second sensing electrode site, e.g., from along the LV epicardium. Maximum peak amplitude is one fiducial point of a QRS waveform that may be used as a reference time point for measuring activation times or activation time differences. It is contemplated that other fiducial points, such as the onset, offset, max positive slope, maximum negative slope, etc., may be identified and used as a reference time point for determining an activation time or activation time difference as a QRS signal feature for determining a ventricular conduction condition.

The QRS signal feature(s) may be determined from the EGM signal sensed using the LBB pacing tip electrode 32 in a bipolar sensing electrode vector with pacing ring electrode 34. Additionally or alternatively, QRS signal features may be determined from a unipolar EGM signal sensed using the pacing tip electrode 32 or pacing ring electrode 34 paired with pacemaker housing 15 or a coil electrode if available. The local activation time, e.g., at the LBB, of a short bipole EGM (e.g., sensed between pacing tip electrode 32 and ring electrode 34) may be determined based on the timing of the maximum peak amplitude of the EGM QRS signal. In other examples, the local activation time may be determined by control circuit 80 from a unipolar EGM signal based on the maximum negative slope of the QRS signal.

In some examples, control circuit 80 may establish a normal QRS morphology template when the ventricular conduction condition is known to be normal. Control circuit 80 may determine a QRS signal feature as a morphology match score between a QRS signal obtained during a conduction check and the normal QRS morphology template. The match score may be determined by comparing wavelet coefficients of a wavelet transform, as an example. The morphology match score may be compared to a threshold, e.g., a threshold of 50, 60, 70 or 80 out of a maximum possible score of 100, to detect a normal conduction condition when the match score is equal to or greater than the threshold or an abnormal conduction condition when the morphology match score is less than the threshold. The abnormal conduction condition may be further discriminated based on other QRS signal features.

The QRS signal features may be determined by control circuit 80 for a single QRS waveform (a single ventricular beat) when triggered or scheduled. In other examples, control circuit 80 may determine the one or more QRS signal features at block 464 for multiple consecutive or non-consecutive QRS waveforms when the conduction check is triggered or scheduled. The QRS signal features may be compared individually to LBB block criteria for classifying each ventricular cycle as a LBB block cycle or normal conduction cycle, for example. Once each cycle is classified, control circuit 80 may compare the number of LBB block cycles to a threshold number of cycles to determine LBB block criteria are met at block 466. When a threshold number, e.g., X out Y cycles, are classified as LBB block cycles, control circuit 80 may determine that the LBB block criteria are met at block 466 and advance to block 468 to switch to the non-minimized LBB pacing mode.

In other examples, control circuit 80 may determine a mean, median, maximum, minimum, range, standard deviation, variability or other metric representative of each QRS signal feature determined from a predetermined number of ventricular cycles and compare the metric(s) to LBB block criteria at block 466. In some examples, control circuit 80 may start determining the values of QRS signal features in response to the scheduled time or a triggering event of a conduction check. In other examples, control circuit 80 may determine the QRS signal features on a beat-by-beat basis and store each value in a first-in-first out buffer in memory 82. When the scheduled time or triggering event occurs, control circuit 80 may determine if the LBB block criteria are met based on the data stored in memory 82 without having to wait to accumulate the QRS signal feature for a desired number of ventricular cycles.

At block 466, the QRS signal features determined by control circuit 80 at block 464 are compared to LBB block criteria for determining if LBB block is present. In one example, the QRS width is compared to a threshold. In other examples, the QRS morphology match score is compared to a threshold match score. When the QRS width is greater than a respective threshold and/or the QRS morphology match score is less than a threshold for a predetermined number of ventricular beats, control circuit 80 may determine that LBB block criteria are met at block 466. Other QRS signal features listed herein may be compared to respective criteria or thresholds for determining when the QRS signal features meet LBB block criteria. When LBB block criteria are not met, control circuit 80 remains in the minimized LBB pacing therapy and returns to block 454. More generally, when the ventricular conduction condition is determined to be normal, e.g., based on the QRS signal features meeting normal QRS signal criteria, control circuit 80 may remain in the minimized LBB pacing therapy. Control circuit 80 changes from the minimized LBB pacing therapy to the LBB pacing therapy at block 468 in response to the LBB block criteria being met at block 466.

Control circuit 80 may change to the LBB pacing therapy by adjusting the AV delay or the ventricular LRI to an interval for controlling LBB pacing delivery. The LBB pacing interval, which may be set to an extended AV delay or extended LRI during the minimized LBB pacing therapy, is shortened to an interval that is expected to expire during the majority of ventricular cycles, increasing the likelihood of LBB pacing pulse delivery on each ventricular cycle. In this way, the VCS pacing therapy is changed from a VCS pacing therapy having a ventricular pacing burden that is expected to be relatively low, e.g., less than a majority of ventricular cycles, to the LBB pacing therapy expected to have a ventricular pacing burden that is relatively higher, e.g., at least a majority of the ventricular cycles. The intended ventricular pacing burden or percentage of paced ventricular cycles during the LBB pacing therapy is greater than the intended ventricular pacing burden or percentage of paced ventricular cycles during the minimized LBB pacing therapy.

While FIG. 8 is described according to the example of changing between the minimized LBB pacing therapy and the (non-minimized) LBB pacing therapy based on changes between a normal ventricular conduction condition and a LBB block condition, it is to be understood that during a minimized VCS pacing therapy, the pacing pulses may be delivered to VCS pacing sites other than the LBB pacing site or in addition to the LBB pacing site. Furthermore, an LV myocardial pacing site may be a pacing site included in the minimized VCS pacing therapy. When the ventricular conduction condition is determined to be an abnormal condition that may include LBB block, RBB block, bilateral BB block, or any combination of BB block with LV myocardial conduction delay, e.g., due to a conduction abnormality of the Purkinje fibers, the combination of one or more ventricular pacing sites included in the minimized VCS pacing therapy and the non-minimized VCS pacing therapy may be selected according to the type of ventricular conduction block that is determined. The VCS pacing therapy may be switched from the minimized VCS pacing therapy to a non-minimized VCS pacing therapy in response to an increase in heart rate, increased patient physical activity, increased SIR, a threshold number of expired pacing intervals, and/or detecting a change from a normal ventricular conduction condition to an abnormal ventricular conduction condition or uncorrected ventricular conduction condition.

Figure 9:
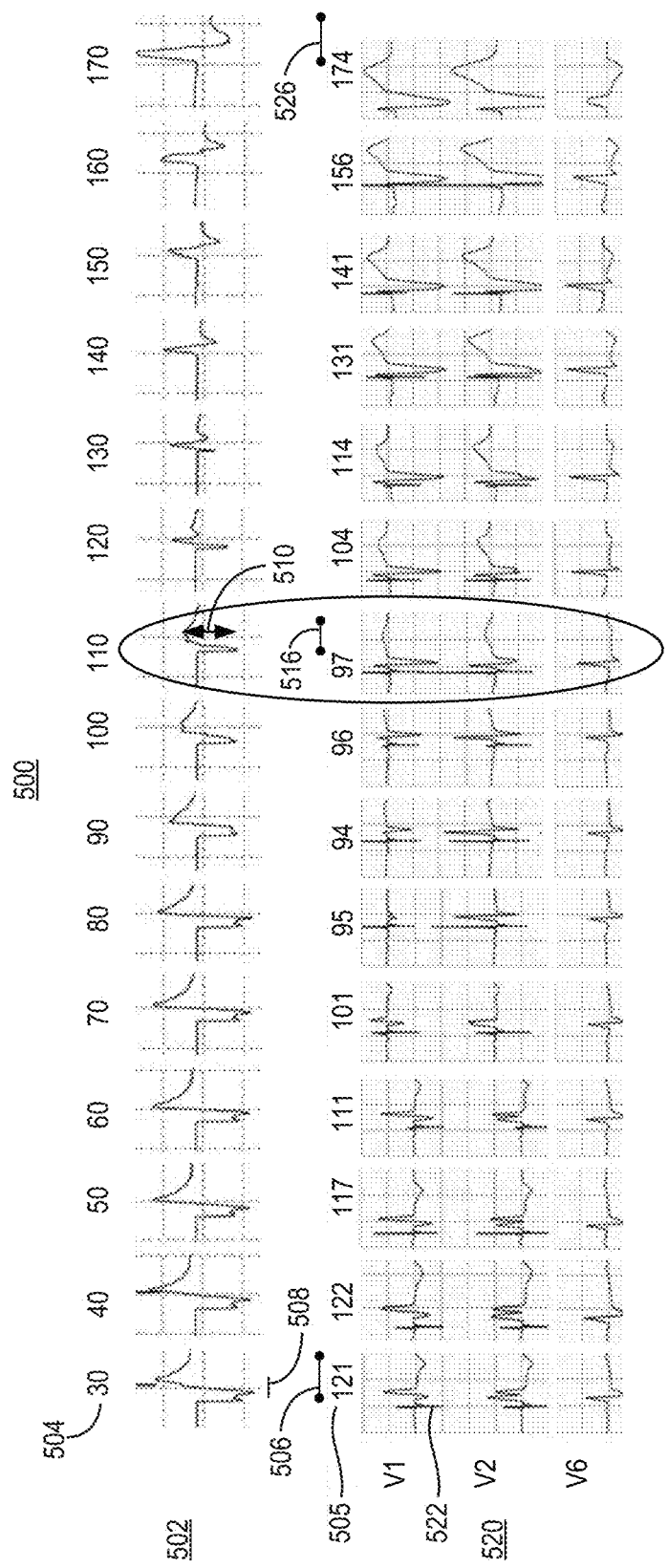
FIG. 9 is a diagram of cardiac electrical signals that may be sensed and analyzed during a pacing therapy over a range of LBB pacing intervals set to different AV delays.

FIG. 9 is a diagram 500 of cardiac electrical signals that may be sensed by pacemaker 14 during the LBB pacing therapy over a range of LBB pacing intervals set to different AV delays. Upon switching to the LBB pacing therapy, e.g., at block 468 of FIG. 8 or block 306 of FIG. 6, control circuit 80 may adjust LBB pacing control parameters to correct the LBB block and promote electrical synchrony of the ventricles and a QRS waveform that appears similar to a normal, physiological QRS waveform. Pacing parameter adjustment may be performed upon changing to the LBB pacing therapy and/or when adjustment criteria are met, as described above in conjunction with FIG. 6. When the LBB is paced too late or too early following an atrial event or relative to the electrical activation of the RBB, the cardiac electrical signal may appear similar to an LBB block signal or an RBB block signal, respectively. Accordingly, control circuit 80 may analyze the QRS waveform during LBB paced ventricular cycles to verify that the appearance of LBB block features are corrected or have improved (such as wide QRS signal being narrowed and/or late LBB activation time becoming earlier) and to verify that the appearance of pacing-induced RBB block features are not introduced by the LBB pacing.

In FIG. 9, the EGM signal 502 may be sensed using a unipolar sensing electrode, e.g., using an electrode placed at a ventricular location paired with pacemaker housing 15 or a CV/DF coil electrode. In the example shown, EGM signal 502 is sensed using an LV myocardial pacing electrode, e.g., one of CS lead pacing electrodes 94 as shown in FIG. 2D. The V1, V2 and V6 ECG signals 522 are sensed using surface electrodes, e.g., electrodes 40 shown in FIG. 1, and may be received by external device processor 52. Each of the QRS signals in EGM signal 502 and ECG signals 522 represent one QRS waveform following one LBB pacing pulse 522 delivered at each one of multiple LBB pacing intervals set to varying AV delay settings 504. The AV delay set to control the timing of LBB pacing pulse delivery is shown ranging from 30 ms to 170 ms in 10 ms increments. The QRS widths 505 measured from QRS signals recorded for each AV delay setting 504 are shown. Upon changing to the LBB pacing therapy, and at times during the LBB pacing therapy when adjustment criteria are met, control circuit 80 may verify LBB pacing capture and adjust the LBB pacing interval one or more times until an AV delay associated with a QRS waveform having features that indicate ventricular electrical synchrony, without LBB block features or pacing-induced RBB block features, is identified. If the LBB is being paced at an AV delay that is too long, the LBB electrical activation may lag the RBB electrical activation, leading to the appearance of uncorrected LBB block features in the EGM QRS signal.

In the example shown, the QRS waveform of EGM signal 502 sensed when the LBB pacing pulse is delivered at an AV delay of 30 ms is associated with a relatively wide QRS width 506 (of 121 ms) and a bipolar QRS signal morphology having time separated positive and negative peaks, in this case having a first negative-going peak followed by a second positive-going peak. These features are evidence of a pacing-induced RBB block due to the LBB pacing pulse occurring too early relative to an intrinsically conducted depolarization in the RBB.

As the LBB pacing interval set to an AV delay is increased, the morphology of the pacing evoked QRS signal changes with a decreasing QRS width, decreased peak-to-peak amplitude 510 and change in overall morphology. At short AV delays, the unipolar EGM signal 502 shows a QSr like morphology, which may indicate electrical conduction from the left to right through the interventricular septum with early LBB pacing. As AV delay increases the QRS morphology changes. The morphology changes at AV delays longer than 120 ms may indicate that pacing is no longer capturing the LBB due to intrinsic ventricular conduction. The AV delay to promote fusion of the intrinsic RBB and pacing-evoked LBB electrical depolarizations may be selected to be approximately 100 to 120 ms in this example. In the example shown, control circuit 80 may be configured to detect the QRS morphology corresponding to the AV delay of 110 ms as being optimized based on QRS signal features or overall morphology. The QRS width 516 is decreased to 97 ms compared to QRS width 506 and the substantially negative polarity of the QRS signal (very small positive peak) indicate fusion of the RBB and LBB electrical depolarizations and RV and LV electrical synchrony.

As the LBB pacing interval set to the AV delay continues to increase (moving left to right in diagram 500), the QRS signal changes to a morphology representative of uncorrected LBB block having an increased QRS width 526 (174 ms) and a high positive-going peak followed by a negative-going peak (e.g., as observed in the QRS signal following a LBB pacing pulse at an AV delay of 170 ms). The pacing-induced RBB block (at relatively short AV delays), uncorrected LBB block (at relatively long AV delays), and corrected LBB block without pacing-induced RBB block at an AV delay of 110 ms corresponding to ventricular electrical synchrony may be detected by control circuit 80 through analysis of the EGM signal 502 sensed following LBB pacing pulses delivered over a range of AV delays. For example, control circuit 80 may determine the QRS width, the peak-to-peak time interval 508, peak-to-peak amplitude 510, the polarity pattern (e.g., negative peak then positive peak or vice versa, which may depend on the sensing electrode location), ratio of the minimum peak amplitude to the maximum peak amplitude, area of rectified QRS signal, and/or overall waveform morphology.

Control circuit 80 may compare determined QRS signal features to different thresholds or criteria for discriminating between RBB block criteria, LBB block criteria and/or corrected LBB block without pacing-induced RBB block (ventricular electrical synchrony). Control circuit 80 may adjust the AV delay until the QRS morphology corresponding to optimized electrical synchrony, at AV delay of 100 to 120 ms in this example, is detected. The AV delay may be increased gradually from a starting value, decreased from a starting value, adjusted according to a binary search pattern or otherwise adjusted until an LBB block morphology of the QRS signal is corrected and/or a pacing-induced RBB block morphology is corrected and the ventricular electrical synchrony morphology is identified.

In order to evaluate the overall QRS waveform morphology, control circuit 80 may establish a normal QRS waveform morphology template, e.g., using wavelet or other transform techniques. The normal QRS waveform morphology template may be stored in memory 82 for comparison to an unknown QRS waveform morphology for determining a morphology match score. For instance, the template may be stored in memory 82 as wavelet transform coefficients for a normal QRS waveform. The normal QRS wavelet transform coefficients may be determined by control circuit 80 during LBB pacing at an optimized LBB pacing interval, e.g., as verified by a clinician, or during known, normal conduction through the His-Purkinje system without BB block or other conduction abnormalities. The wavelet transform coefficients may be determined for the unknown QRS waveform during LBB pacing at a given AV delay and compared to the stored template to obtain a morphology match score. When the morphology match score is high, control circuit 80 determines that LBB block is corrected and pacing-induced RBB block is not occurring.

When the morphology match score is low, control circuit 80 may determine that either the LBB block is not corrected or pacing-induced RBB block is present. Control circuit 80 may adjust the AV delay until the morphology match score is equal to or greater than a match threshold. In other examples, in response to the morphology match score being less than a match threshold, control circuit 80 may evaluate other QRS waveform features, such as polarity of first peak and/or second peak, time from the pacing pulse to the first positive peak, polarity of the maximum peak or any of the QRS features listed above to differentiate between uncorrected LBB block and pacing-induced RBB when the morphology match score is low in order to determine if the AV delay should be increased or decreased.

In some examples, the processor of an external device, e.g., external device 50 of FIG. 1, may be configured to receive and analyze ECG signals 520 during LBB pacing for detecting and discriminating between pacing-induced RBB block (at shorter AV delays 504), uncorrected LBB block (at longer AV delays), and optimized ventricular electrical synchrony (e.g., AV delay of 110 ms). The RBB block, uncorrected LBB block and optimized ventricular electrical synchrony may be determined based on the QRS width, activation time difference, overall QRS waveform morphology, peak polarity pattern, maximum and minimum peak ratio or other features of the QRS signals of ECG signals 520, as examples. In FIG. 9, at short AV delays, the QRS waveform in the V1 and V2 signals is representative of RBB block. For example, the notched waveform in the V2 ECG signal is characteristic of RBB block. The QRS waveforms at the long AV delays in the V6 signal are representative of uncorrected LBB block, e.g., very long QRS width. The QRS signals at the optimized 110 ms AV delay are observed to include a narrow QRS width with minimized AV activation time difference between the maximum peaks of the V2 and V6 signals, for example. External device processor 52 may determine an optimized AV delay based on the ECG QRS signal analysis during an implantation or patient follow-up visit. External device processor 52 may transmit the optimized AV delay to pacemaker 14 as a programming command.

Figure 10:
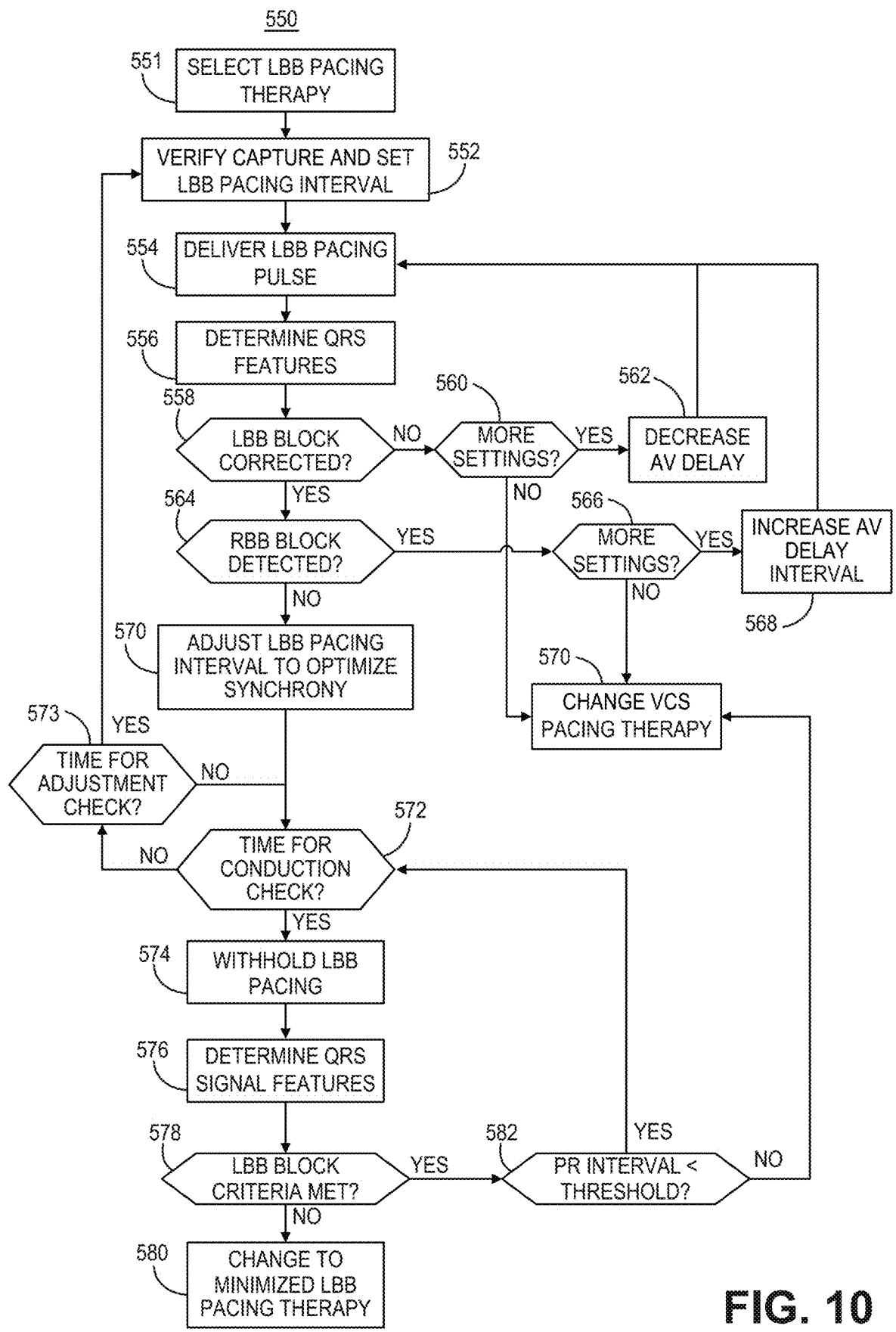
FIG. 10 is a flow chart of a method for delivering a LBB pacing therapy in some examples.

FIG. 10 is a flow chart 550 of a method for delivering the LBB pacing therapy in some examples. The LBB pacing therapy differs from the minimized LBB pacing therapy in that during the minimized LBB pacing therapy, pacemaker 14 may be operating in a ventricular sensing only mode with no ventricular pacing of the LBB (or any other ventricular pacing site) or ventricular sensing with a limited number of LBB pacing pulses or ventricular pacing burden before switching to the LBB pacing therapy. During the minimized LBB pacing therapy, if any LBB pacing pulses are delivered, they may be delivered at an extended LBB pacing interval to prevent asystole without necessarily attempting to provide optimized AV synchrony or ventricular electrical synchrony. During the LBB pacing mode, which is started in response to determining an LBB block condition, the LBB pacing interval is set with the intention of pacing the LBB on each cardiac cycle (or the majority of cardiac cycles) at an optimized pacing interval in order to promote AV synchrony and/or ventricular electrical synchrony on each heartbeat.

As such, upon selecting the LBB pacing therapy at block 551, control circuit 80 may verify LBB pacing capture at block 552 (or perform a threshold capture test and adjust the pacing pulse output accordingly). While the capture verification test is shown at block 552 upon changing to the LBB pacing therapy, it is to be understood that in the flow chart 550 and other flow charts presented herein for controlling VCS pacing therapies, control circuit 80 may perform a capture verification or capture threshold test periodically during the VCS pacing therapy, e.g., once every 24 hours or other scheduled frequency, to promote reliable capture of the ventricular pacing sites of a given VCS pacing therapy.

At block 552, control circuit 80 may initially set the LBB pacing interval to a nominal AV delay or to the last known AV delay that was found to promote QRS signals representative of ventricular electrical synchrony, without LBB or RBB block features. Control circuit 80 may control therapy delivery circuit 84 to deliver LBB pacing pulse at multiple AV delays to select an optimal AV delay as described above in conjunction with FIG. 9. For example, at block 554, therapy delivery circuit 84 generates and delivers an LBB pacing pulse upon expiration of the initial AV delay. Control circuit 80 receives one or more EGM signals from sensing circuit 86 at block 556 for determining one or more QRS signal features for evaluating ventricular electrical synchrony for determining any needed adjustment to LBB pacing interval.

At block 558, control circuit 80 may analyze the QRS signal features for verifying that LBB block is corrected by the LBB pacing pulse. Any of the techniques described herein for identifying an LBB block QRS waveform may be used at block 558. For example, as described above in conjunction with FIG. 9, control circuit 80 may receive the EGM signal from sensing circuit 86 that is sensed from an electrode 94 carried by CS lead 92 and coil electrode 35. Control circuit 80 may determine the QRS width, the peak polarity pattern, maximum to minimum peak ratio, the peak-to-peak amplitude, the activation time, the overall waveform morphology match score compared to a normal QRS waveform or any combination thereof and/or other waveform features that discriminate between LBB block, RBB block and corrected LBB block with ventricular electrical synchrony (no pacing-induced RBB block features of the QRS signal).

Control circuit 80 may determine that the LBB block is not corrected based on LBB block criteria applied to the QRS signal features at block 558. If control circuit 80 determines that the LBB block is not corrected at block 558, the AV delay may be decreased at block 562. Another LBB pacing pulse is delivered by therapy delivery circuit 84 at block 554 at the shortened AV delay and the QRS features may be redetermined and evaluated to determine if the LBB block is corrected at the shorter AV delay. If not, control circuit 80 may check if additional LBB pacing interval settings are available at block 560. For example, if the shortest available AV delay setting has been tested and LBB block is still present, control circuit 80 may change the VCS pacing therapy at block 570, e.g., by adding a ventricular pacing site. Control circuit 80 may verify that the LBB is being captured, increase the pacing pulse output as needed and re-check the QRS signal for corrected LBB block before changing VCS pacing therapy at block 570. Control circuit 80 may continue to adjust the AV delay and/or the pacing pulse output until the LBB block is corrected or available pacing control parameter settings are exhausted. Control circuit 80 may change to a VCS plus LV myocardial pacing therapy at block 570, for example, to improve ventricular electrical synchrony when LBB pacing alone does not correct LBB block or a delay in LV electrical activation, e.g., as evidenced by a wide QRS signal or LBB block morphology.

While the flow chart 550 depicts an order of verifying capture at block 552 and adjusting the AV delay at blocks 562 (and 568 as described below), it is to be understood that adjustments to the LBB pacing pulse output and adjusting the AV delay may occur at various times, which may be independent of each other, during the LBB pacing therapy. The LBB pacing pulses may be delivered at a premature pacing interval (e.g., at a ventricular pacing rate that is faster than the atrial rate or at a very short AV delay) to avoid fusion as described previously herein in order to verify capture, whereas the LBB pacing pulses are delivered at test AV delays during the AV delay optimization procedure in order to identify an AV delay that achieves fusion with the RBB intrinsic depolarization.

In the illustrative example of FIG. 10, LBB pacing is delivered at an AV delay intended to fuse the electrical activation of the LBB with the intrinsic electrical activation of the RBB to promote ventricular electrical synchrony as well as promote AV synchrony. In other examples, for example during atrial tachycardia or atrial fibrillation or an atrial rate that is greater than an atrial tracking rate limit, control circuit 80 may set to the LBB pacing interval to an LRI that is used to control the ventricular rate during non-atrial tracking (asynchronous) ventricular pacing. In this case, the LBB pacing interval is not adjusted by decreasing the pacing interval at block 562 when the LBB block is not corrected. Instead, the pulse output may be increased until the LBB block is corrected, based on the analysis of QRS features following an LBB pacing pulse, and then control circuit 80 may advance to block 564 to determine if pacing-induced RBB block is occurring.

At block 564, control circuit 80 may compare the QRS features determined from the sensed EGM signal following an LBB pacing pulse to criteria for detecting RBB block. As described above, in conjunction with FIG. 9, if the AV delay is too short, the QRS signal may exhibit pacing-induced RBB block features, such as a wide QRS signal, a large negative peak followed by a positive peak, a long activation time, and so on. One or more features, including the peak polarity pattern, maximum to minimum peak ratio, an overall morphology match score or other features may be compared to criteria for detecting RBB block at block 564. The RBB block may be pacing-induced, but in some instances the RBB block may be an actual intrinsic conduction block of the RBB. Any of the techniques disclosed herein, e.g., as described in conjunction with the QRS signals shown in FIG. 9, may be used for determining RBB block from the QRS signal at block 564.

When the RBB block criteria are met at block 564 and the LBB pacing interval is set to an AV delay, control circuit 80 may increase the AV delay at block 568. Therapy delivery circuit 84 delivers another LBB pacing pulse at the increased AV delay at block 554 and the QRS signal features may be re-evaluated by control circuit 80. If RBB block is still being detected at block 564, and available AV delay settings have been exhausted (for achieving LBB block correction without detecting RBB block), as determined at block 566, control circuit 80 may change the VCS pacing therapy at block 570. The detected RBB block may be pathological and not pacing-induced, in which case pacing of both the RBB and the LBB may be needed to promote improved ventricular electrical synchrony and a more physiologically normal QRS signal. For example, control circuit 80 may switch to bilateral BB pacing therapy at block 570.

In some instances, the LBB pacing interval may be set to an LRI (which may be a temporary LRI set based on an SIR to provide rate response pacing) instead of an AV delay. For example, during atrial tachyarrhythmia, the pacing mode may switch from an atrial synchronous ventricular pacing mode to a non-atrial tracking (asynchronous) ventricular pacing mode. Control circuit 80 may determine that LBB block is corrected by LBB pacing pulses delivered at an LRI but pacing-induced RBB may be present. In this case, control circuit 80 may change to bilateral BB pacing therapy at block 570 to promote ventricular electrical synchrony during non-atrial tracking ventricular pacing modes. Control circuit 80 can change to the bilateral BB pacing therapy at block 570 by controlling therapy delivery circuit 84 to select a pacing electrode configuration and pulse output that captures both the RBB and the LBB. Control circuit 80 may control therapy delivery circuit 84 to increase the pacing pulse output of a bipolar pacing electrode vector for capturing at both the anode and the cathode, e.g., at BB pacing tip electrode 32 and BB pacing ring electrode 34. Alternatively, control circuit 80 may control therapy delivery circuit 84 to select a pacing electrode vector configuration that includes a RBB pacing electrode vector and a LBB pacing electrode vector.

When corrected LBB block criteria are met at block 558 and RBB block criteria are not met at block 564 ("no" branch of block 564), control circuit 80 may remain in the LBB pacing therapy and may operate to make "fine tune" adjustments to the AV delay to optimize ventricular electrical synchrony. As observed in FIG. 9, over the range AV delays of approximately 100 ms to approximately 120 ms, the QRS signal may reach borderline criteria between detecting RBB block or LBB block and detecting corrected LBB block without RBB block. However, a QRS signal that has a narrow width and primarily negative polarity with very low positive going peak may be obtained when the AV delay is fine tuned to 110 ms in the example of FIG. 9. Accordingly, control circuit 80 may be configured to adjust the AV delay by a step increment and/or decrement once LBB block criteria and RBB block criteria are met to determine if further improvement in the QRS signal, e.g., narrower width, dominant negative polarity peak, higher morphology matching score with normal QRS template, etc., may be achieved. Control circuit 80 may adjust the LBB pacing interval to an AV delay at block 570 that is associated with the greatest improvement in QRS features toward a normal QRS signal or a QRS signal morphology known to be representative of LBB block correction without pacing-induced RBB block.

Therapy delivery circuit 84 may deliver LBB pacing at the adjusted pacing control parameter(s) (e.g., the adjusted LBB pacing interval and/or pacing pulse output corresponding to verified LBB capture) until control circuit 80 determines that it is time for a conduction check at block 572 or time for a pacing control parameter adjustment check at block 573. In some examples, control circuit 80 may return to block 552 at scheduled intervals to evaluate the QRS features following an LBB pacing pulse delivered at the current LBB pacing interval and pulse output. If LBB block or RBB block are determined, control circuit 80 may repeat the process described above for adjusting the LBB pacing interval (e.g., AV delay) and/or pacing pulse output as needed. For example, control circuit 80 may determine that it is time to check if pacing parameter adjustments are needed at block 573 at a specified time of day, after a specified number of delivered LBB pacing pulses or time interval, e.g., six to eight pacing pulses, every 30 pacing pulses, every minute, every hour, once per day or other selected frequency.

Control circuit 80 may additionally or alternatively determine when it is time for a conduction check a block 572. As described above, a conduction check may be scheduled during the LBB pacing mode once per minute, once per hour, once per day or other scheduled frequency. When control circuit 80 determines that it is time for a conduction check, control circuit 80 may withhold at least one LBB pacing pulse at block 574. The LBB pacing pulse may be withheld for one ventricular cycle by not starting the LBB pacing interval, or control circuit 80 may extend the LBB pacing interval to a maximum interval in some examples in order for control circuit 80 to evaluate the intrinsic QRS signal during at least one ventricular cycle. In other examples, control circuit 80 may reduce the pacing pulse output to below the pacing capture threshold. In this way, the conduction check is performed by delivering pacing to fewer sites than the combination of pacing sites of the VCS pacing therapy. In this case, ventricular pacing is withheld from the LBB pacing site to determine the intrinsic ventricular conduction condition.

Control circuit 80 may determine one or more intrinsic QRS signal features of one or more sensed EGM signals received from sensing circuit 86 at block 576. If control circuit 80 determines that the QRS signal features do not meet LBB block criteria at block 578 (or do meet normal ventricular conduction condition criteria), control circuit 80 may change back to the minimized LBB pacing therapy at block 580. The QRS signal features and LBB block criteria determined at block 576 and applied at block 578, respectively, may correspond to any of the examples described herein for detecting a LBB block QRS signal (and/or for detecting a normal QRS signal). When LBB block is no longer detected in the intrinsic rhythm, control circuit 80 changes from the non-minimized LBB pacing therapy to the minimized LBB pacing therapy at block 580 to promote intrinsic conduction through the His-Purkinje system.

It is to be understood that when control circuit 80 has switched to the LBB pacing therapy in response to a time of day, a heart rate or SIR being greater than a threshold rate or a patient activity level being greater than a threshold level, as described above in conjunction with FIG. 8, control circuit 80 may determine the time of day, heart rate, SIR or activity level at block 578. Control circuit 80 may determine that LBB block criteria are not met at block 578 in response to the time of day not being daytime or the heart rate, SIR or patient activity level falling below a respective threshold and switch back to the minimized LBB pacing therapy at block 580. As such in some examples, when changing between the minimized LBB pacing therapy and the non-minimized LBB pacing therapy is controlled based on time of day, heart rate, SIR or patient activity level, withholding the LBB pacing at block 574 and performing QRS signal analysis may be optional. Control circuit 80 may determine that the ventricular paced rate that is tracking an atrial rate has fallen below a threshold rate, below which the patient is expected to have normal ventricular conduction. As such, control circuit 80 may determine that LBB block criteria are no longer met at block 578 based on the paced ventricular rate being less than a rate threshold and switch to the minimized LBB pacing therapy at block 580.

When control circuit 80 determines that LBB block criteria are met at block 578, e.g., based on one or more intrinsic QRS signals, control circuit 80 may optionally verify that an intrinsic P-R interval is less than a threshold at block 582. The P-R interval may be determined by control circuit 80 starting from an intrinsic P-wave or atrial pacing pulse and ending at a fiducial point of the intrinsic QRS signal. Some patients may have a long intrinsic P-R interval resulting in poor AV synchrony. If the P-R interval is less than a threshold interval, LBB pacing therapy that promotes fusion with the intrinsic RBB depolarization may provide acceptable AV synchrony and ventricular electrical synchrony. Control circuit 80 may continue in the LBB pacing therapy by returning to block 572 to wait for the next conduction check. However, when the P-R interval is greater than or equal to the threshold interval, control circuit 80 may switch to bilateral BB pacing therapy at block 570 or another VCS pacing therapy in order to both improve AV synchrony and provide ventricular electrical synchrony.

Figure 11:
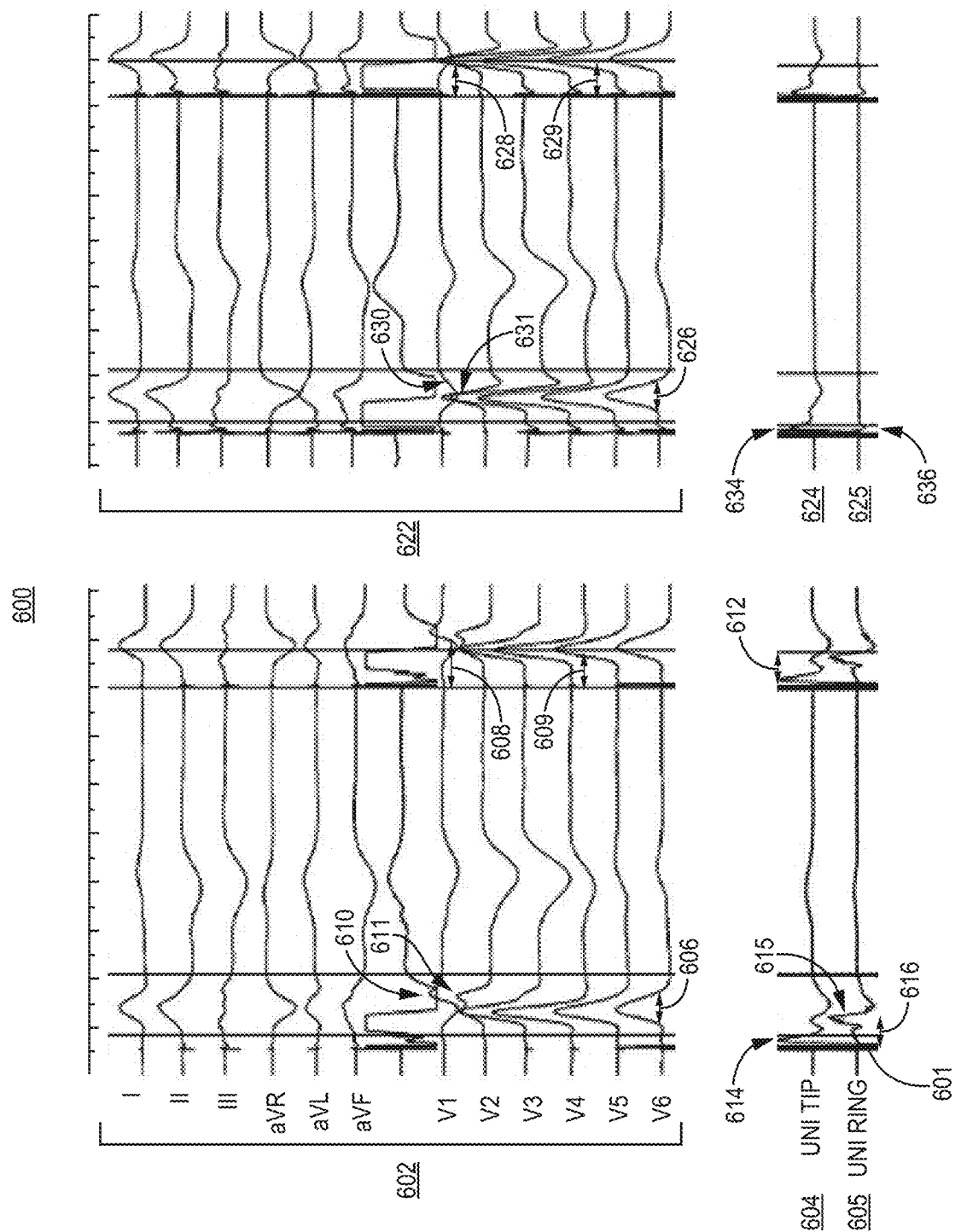
FIG. 11 is a diagram of cardiac electrical signals that may be sensed during LBB pacing therapy and during bilateral bundle branch (BB) pacing therapy.

FIG. 11 is a diagram 600 of cardiac electrical signals that may be sensed during the LBB pacing therapy and during bilateral BB pacing therapy. The ECG signals 602 and EGM signals 604 and 605 shown in the left panel are representative of signals sensed during LBB pacing therapy using the BB pacing tip electrode 32, which may be paired with the BB pacing ring electrode 34 for bipolar pacing or pacemaker housing 15 for unipolar pacing of the LBB. In the example shown, a unipolar EGM signal 604 sensed using the BB pacing tip electrode 32 (UNI TIP) and a unipolar EGM signal 605 sensed using the BB pacing ring electrode 34 (UNI RING) are shown. The unipolar sensed EGM signals 604 and 605 may be sensed using any available reference electrode, e.g., the pacemaker housing 15 or a defibrillation coil electrode (e.g., coil electrode 35 as shown in FIG. 2D). The morphology and/or specific signal features of one or more of the ECG signals 602 and/or EGM signals 604 and 605 may be determined by external device processor 52 and/or EGM signal features may be determined by control circuit 80 for determining if LBB block is corrected in response to the LBB pacing and determine if pacing-induced RBB block is present, as described above in conjunction with the flow chart 550 of FIG. 10.

The right panel including ECG signals 622 and EGM signals 624 and 625 are representative of signals sensed during bilateral BB pacing. Bilateral BB pacing may be delivered using a single bipolar pacing electrode vector when the BB pacing tip electrode 32 is in the LBB area (e.g., in the left ventricular septum) and the BB pacing ring electrode 34 is in the RBB area (e.g., in the right ventricular septum). In response to detecting RBB block during the LBB pacing therapy, control circuit 80 may adjust the LBB pacing pulse output, e.g., increase the pacing pulse amplitude and/or pulse width, until anodal capture of the RBB is achieved during bipolar pacing of the LBB. In other examples, control circuit 80 may select a different pacing electrode vector or combination of vectors (if available) for delivering pacing to both the LBB and the RBB to correct the QRS signal features associated with RBB block.

As described above in conjunction with FIG. 10, during the LBB pacing therapy, control circuit 80 may adjust the AV delay in an attempt to achieve fusion of the LBB and RBB electrical activations. However, when the RBB block criteria continue to be met after exhausting LBB pacing interval settings, or when the intrinsic P-R interval is greater than a threshold, control circuit 80 may change to the bilateral BB pacing therapy by increasing the pacing pulse output to achieve cathodal and anodal capture for bipolar bilateral BB pacing or selecting an electrode configuration including a combination of electrode vectors for pacing both of the RBB and the LBB, e.g., using two unipolar pacing electrode vectors, two bipolar pacing electrode vectors, or one unipolar and one bipolar pacing electrode vector.

During LBB pacing (left panel), the V1 ECG signal exhibits a QSR' morphology 610. The V2 ECG signal exhibits a notched morphology 611 during LBB pacing. These QRS signal morphologies of the V1 and V2 ECG signals 602 are representative of a RBB block condition, which may be induced during LBB pacing. The RBB block condition is corrected during bilateral BB pacing as evidenced by the disappearance of the R' signal in the QS morphology 630 of the V1 signal in ECG signals 622. The notched morphology disappears during bilateral BB pacing as represented by the narrow QRS morphology 631, indicating correction of the RBB block. In some examples, the external device processor 52 may receive the ECG signals 602 and 622 and select the bilateral BB pacing therapy based on a comparison of the V1/V2 ECG signals during the LBB pacing therapy and during bilateral BB pacing therapy. External device processor 51 may select the bilateral BB pacing therapy in response to the V1 ECG signal including a QS morphology (disappearance of R') and/or the V2 ECG signal having a narrow QRS morphology with a single peak (no notched waveform). External device 50 may transmit a command to pacemaker 14 to set the pacing therapy to bilateral BB pacing to pace the RBB and LBB simultaneously to correct for RBB block that may be present when only the LBB is paced.

In some examples, external device processor 52 may determine the QRS signal width 606 of the V6 EGM signal to detect a decrease in QRS signal width 626 determined as evidence of improved ventricular electrical synchrony when the VCS pacing therapy is changed from the LBB pacing therapy to the bilateral BB pacing therapy. The QRS signal widths 606 and 626 are shown relative to V6 ECG signals for the sake of convenience, however, the QRS signal width may be determined from any of the ECG signals vectors for analysis for determining correction of both LBB block and RBB block. During LBB pacing, the QRS signal width 606 of the V5/V6 ECG signal may be relatively narrower than when the LBB is not paced and may be detected as an indication of LBB block correction upon changing to LBB pacing therapy. However, when RBB block is detected during the LBB pacing therapy, control circuit 80 may change to bilateral BB pacing therapy for further narrowing of the QRS signal width 626 as evidence of RBB block correction and improved ventricular electrical synchrony.

In some examples, external device processor 52 may determine the RV activation time 608 and LV activation time 609, for example from the V1 or V2 ECG signals and V5 or V6 ECG signals, respectively, during LBB pacing therapy. When the RV activation time 608 is greater than the LV activation time or greater than a threshold, as evidence of RBB block, control circuit 80 may change to the bilateral BB pacing therapy to correct the RBB block. When the RV activation time 628 is determined to be decreased, less than a threshold value, or approximately equal to LV activation time 629, the external device processor 52 may determine that both the LBB block and RBB block are corrected. In other examples, the difference between the RV activation time 628 and the LV activation time 629 during LBB pacing therapy may be determined as the interventricular activation time difference. When this interventricular activation time difference decreases, improved ventricular electrical synchrony associated with corrected LBB block and corrected RBB block may be determined. As observed in FIG. 11, both the RV activation time 628 and the LV activation time 629 may decrease during bilateral BB pacing therapy due to simultaneous pacing of the RBB and LBB and improved ventricular electrical synchrony.

ECG signal analysis performed by external device processor 52 may be performed upon implantation of pacemaker 14 and/or during office visits to adjust the pacing therapy and corresponding pacing control parameters. In some examples, pacemaker 14 may transmit the sensed EGM signals, e.g., signals 604, 605, 624 and 625, to external device 50 for processing and analysis by external device processor 52, which may be in addition to or in combination with analysis of ECG signals 602 and/or 622 as described above. External device 50 may display a recommended VCS pacing therapy and pacing parameter settings based on ECG signal analysis and/or transmit programming commands to pacemaker 14 to set the VCS pacing therapy and pacing parameter settings.

In other examples, as described above in conjunction with FIG. 10, control circuit 80 may analyze one or more EGM signals received from sensing circuit 86 during LBB pacing therapy for determining correction of LBB block during pacing control parameter adjustment and controlling changes in VCS pacing therapy based determining a change in a ventricular conduction condition (when LBB pacing is withheld) or when an abnormal ventricular conduction condition is not corrected by LBB pacing. The EGM signals 604 and 605 may be sensed by pacemaker sensing circuit 86 during LBB pacing therapy and passed to control circuit 80 for analysis by processor 148 for use in optimizing the LBB pacing interval (AV delay) and determining when to change the VCS pacing therapy by adding at least one ventricular pacing site when an abnormal ventricular conduction condition is not corrected by LBB pacing.

The unipolar tip EGM signal 604 exhibits a fast LV activation time (the QRS signal 614 is almost immediately after LBB pacing pulse 601) and narrow QRS signal 614 during LBB pacing. The unipolar ring EGM signal 605 exhibits a relatively wider QRS signal 615 at a delayed RV activation time 616, which may be evidence of RBB block. Together the early, narrow QRS signal 615 of the unipolar tip EGM signal 604 and the relatively later, wider QRS signal 615 of the unipolar ring EGM signal 605 may be determined by control circuit 80 to be representative of corrected LBB block and pacing-induced RBB block during LBB pacing. In other examples, control circuit 80 may determine the RV activation time 616 from the unipolar ring EGM signal 605 following one or more LBB pacing pulses and detect pacing-induced RBB block. The interventricular activation time difference 612 determined between a maximum peak of the unipolar tip EGM signal 604 and a maximum peak of the unipolar ring EGM signal 605, as an example, may be determined by control circuit 80 (or external device processor 52) to detect LBB block correction with pacing-induced RBB block during LBB pacing therapy. If the interventricular activation time difference 612 is greater than a threshold, and the LV activation time is earlier than the RV activation time 616, control circuit 80 may determine LBB block correction with pacing-induced RBB block. When control circuit 80 determines LBB block correction with pacing-induced RBB block, control circuit 80 may adjust the AV delay until the RBB block is corrected. If the RBB block is not corrected by AV delay adjustment during the LBB pacing therapy (and LBB capture has been verified), control circuit 80 may change to the bilateral BB pacing therapy.

Control circuit 80 may increase the pacing pulse output to achieve bilateral BB pacing (e.g., by anodal capture of the RBB) or select another pacing electrode vector for pacing the RBB in addition to the LBB in response to detecting corrected LBB block with pacing-induced (or intrinsic) RBB block based on the analysis of the EGM signals 604 and/or 605. During bilateral BB pacing therapy, the early, narrow signals 634 and 636 in both the unipolar tip EGM signal 624 and the unipolar ring EGM signal 625 indicate simultaneous electrical activation of the RBB and LBB which may correct both the LBB block and the RBB block and improve ventricular electrical synchrony. The LV activation and the RV activation times are fast and simultaneous (or near simultaneous) such that a minimal or near zero interventricular activation time difference exists between the QRS signal 634 and QRS signal 636 of the unipolar tip EGM signal 624 and the unipolar ring EGM signal 625, respectively. Control circuit 80 may be configured to detect the disappearance of the delayed, wide QRS signal 615 that occurs in the unipolar ring EGM signal during LBB pacing due to pacing-induced RBB block (e.g., at short AV delays) or due to intrinsic RBB block by comparing the unipolar ring EGM signal sensed during LBB pacing to the unipolar ring EGM signal sensed during bilateral BB pacing. A far-field EGM signal, e.g., sensed using an LV myocardial electrode 94 carried by CS lead 92, may be analyzed to detect a narrow QRS signal indicating ventricular electrical synchrony.

Pacemaker control circuit 80 may determine corrected RBB block in response to determining a narrower EGM QRS width in the unipolar ring EGM signal, a shortening of the RV activation time determined from the unipolar ring EGM signal, and/or a near zero interventricular activation time difference between the maximum peak, maximum negative slope, or other fiducial point of the unipolar tip EGM signal and the maximum peak, maximum negative slope, or other fiducial point of unipolar ring EGM signal during bilateral BB pacing.

While not shown in FIG. 11, the bipolar EGM signal may be sensed between the BB pacing tip and the ring electrodes 32 and 34 during LBB pacing and bilateral BB pacing. In the bipolar EGM signal, no potential difference may exist between the simultaneously paced LBB and RBB at the cathode tip electrode 32 and anode ring electrode 34 resulting in no QRS signal or a very small amplitude QRS signal. Accordingly, a disappearance of the QRS waveform or a very small QRS peak amplitude in the bipolar EGM signal during bilateral BB pacing may be detected by control circuit 80 or external device processor 52 as evidence of simultaneous pacing capture of the LBB and RBB and improved ventricular electrical synchrony. Furthermore, a relatively more global EGM signal, e.g., sensed using an LV pacing electrode 94 carried by a CS lead 92, may be analyzed by control circuit 80 for detecting correction of LBB block, correction of RBB block and overall improved ventricular electrical synchrony, e.g., based on QRS width and overall QRS morphology.

Changes in the EGM signals shown in FIG. 11, which may include any of a change in peak (positive or negative) amplitude, change in polarity, change in peak timing, change in number of peaks, change in peak-to-peak amplitude difference, change in maximum (positive or negative) slope, change in timing of the maximum (positive or negative) slope, change in area of the waveform (QRS area), change in QRS width, and/or change in overall QRS waveform morphology may be detected by control circuit 80 or external device processor 52, alone or in any combination, as evidence of improved ventricular electrical synchrony achieved during bilateral BB pacing therapy compared to LBB pacing therapy. These EGM QRS signal feature comparisons may be made during a conduction check during bilateral BB pacing by withholding pacing from the RBB, LBB or both during the conduction check for determining if the ventricular conduction condition during pacing at fewer than both the RBB and LBB pacing sites indicates a need for remaining in bilateral BB pacing or if the ventricular conduction condition has changed so that control circuit 80 may change the VCS pacing therapy, e.g., back to the LBB pacing therapy, as described below in conjunction with FIG. 12.

Figure 12:
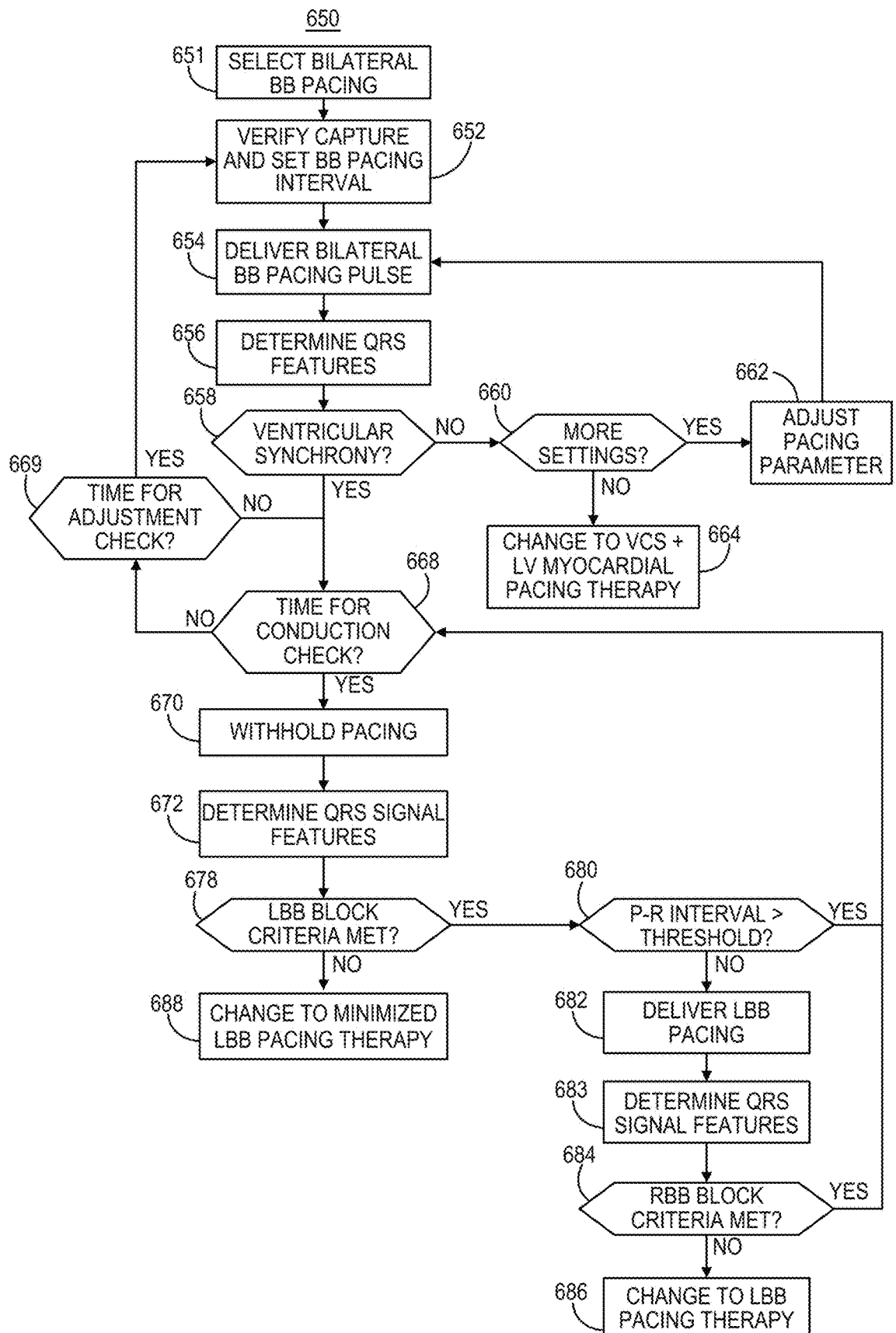
FIG. 12 is a flow chart of a method for delivering bilateral BB pacing therapy according to one example.

FIG. 12 is a flow chart 650 of a method for controlling bilateral BB pacing therapy according to one example. At block 651, control circuit 80 selects the bilateral BB pacing therapy. At block 652, control circuit 80 may begin a process for verifying capture of each of the RBB and LBB and setting the bilateral BB pacing interval, e.g., to an AV delay, for providing atrial synchronous ventricular pacing with fusion of the electrical activation of the simultaneously paced LBB and RBB. Premature pacing pulses, e.g., at a pacing rate faster than the intrinsic or paced atrial rate or at very short AV delay, may be delivered at block 652 to the RBB and LBB one at a time to verify capture of each. In some cases, a bipolar electrode vector may pace both the RBB and LBB simultaneously in which case cathodal and anodal capture may be verified, e.g., using the techniques disclosed in the above incorporated '980 application. After verifying bilateral BB pacing capture, the bilateral BB pacing interval may be set to an AV delay. In other examples, non-atrial tracking bilateral BB pacing therapy may be delivered by setting the bilateral BB pacing interval to a ventricular LRI, which may be a rate response pacing rate.

At block 654, therapy delivery circuit 84 may deliver a bilateral BB pacing pulse in response to the expiration of the pacing interval set at block 652 and according to an operating pacing mode. Control circuit 80 determines one or more features of the QRS signal immediately following the bilateral BB pacing pulse at block 656, such as any of the QRS signal features described above in conjunction with FIG. 11. At block 658, control circuit 80 may determine if ventricular synchrony criteria are met by the QRS feature(s). For example, the QRS width may be compared to a threshold width. The threshold width may be a default threshold value. In other examples the threshold width may be based on the QRS width determined when bilateral BB pacing is not delivered, e.g., during only LBB pacing or during no ventricular pacing. In this way, the ventricular synchrony criteria may be determined to be met when the QRS width is relatively narrower following the bilateral BB pacing pulse compared to when the RBB is not being paced. Ventricular synchrony criteria may be determined to be met by control circuit 80 at block 658 when LBB block criteria are not met and pacing-induced RBB block is not detected.

If control circuit 80 determines that ventricular synchrony criteria are not met and additional settings of one or more pacing control parameters, e.g., additional AV delay settings and/or pacing pulse amplitude settings, are available for adjusting the bilateral BB pacing, as determined at block 660, control circuit 80 may adjust a pacing control parameter at block 662. Control circuit 80 may verify pacing capture and increase the pacing pulse output to promote capture of both the LBB and RBB, for example. When the pacing output settings have reached a maximum allowable setting (e.g., maximum allowable pacing pulse amplitude and/or width) and/or all AV delay settings have been exhausted and the ventricular synchrony criteria are still not met, control circuit 80 may change the VCS pacing therapy from bilateral BB pacing therapy to the VCS plus LV myocardial pacing therapy at block 664. When LV myocardial pacing electrode(s) is/are available, e.g., on CS lead 92 in FIG. 2D, control circuit 80 may change to the VCS plus LV myocardial pacing therapy to promote ventricular electrical synchrony when single or bilateral BB pacing does not adequately improve the QRS signal features toward QRS signal features corresponding to normal ventricular conduction. The operation of the VCS plus LV myocardial pacing therapy is described below in conjunction with FIG. 17.

The process of determining QRS features at block 656 and determining if ventricular synchrony criteria are met at block 658 may be performed by control circuit 80 upon initially switching to the bilateral BB pacing therapy and repeated periodically when it is time for a pacing control parameter adjustment check (as determined at block 669) or beat-by-beat to maintain capture of both the RBB and LBB and promote ventricular electrical synchrony. Control circuit 80 may remain in the bilateral BB pacing therapy as long as the ventricular synchrony criteria are met at block 658. However, control circuit 80 may periodically perform a conduction check to determine if bilateral BB pacing therapy is still needed or if the ventricular conduction condition has changed.

At block 668, control circuit 80 may determine if it is time for a conduction check, which may be based on a scheduled time of day or scheduled time interval. If it is not time for a conduction check, therapy delivery circuit 84 continues delivering bilateral BB pacing pulses, and control circuit 80 waits for the time for a conduction check or returns to block 652 if it is time for checking if pacing control parameters need adjustment, such as performing a daily capture verification test. When it is time for a conduction check, control circuit 80 may withhold the bilateral BB pacing pulse for one or more cardiac cycles at block 670, e.g., by not scheduling the bilateral BB pacing pulses (by not starting a pacing interval) or by setting the bilateral BB pacing interval to an extended interval to allow an intrinsic QRS to occur before the extended pacing interval expires or by setting the pacing pulse output below the capture threshold. During the conduction check ventricular pacing is withheld from at least one BB pacing site, but the atrial rhythm may be paced or intrinsic.

Control circuit 80 determines one or more QRS signal features at block 672, which in this example are the intrinsic QRS signal features when pacing is withheld from both the RBB and LBB. Control circuit 80 may determine an activation time, an activation time difference, a QRS width, maximum peak, polarity, QRS morphology match score, or other QRS features according to any of the examples listed herein in any combination from one or more sensed cardiac electrical signals. In some examples, control circuit 80 may determine a P-R interval at block 672 from a sensed atrial P-wave or atrial pacing pulse to the intrinsic R-wave for determining the ventricular conduction condition. The determined QRS signal features are compared to LBB block criteria at block 678. Examples of LBB block criteria are described above. If the LBB block criteria are not met, control circuit 80 may change to the minimized LBB pacing therapy at block 688. If LBB block criteria are met at block 678, LBB pacing on a beat-by-beat basis is still needed, however bilateral BB pacing therapy may or may not be required depending on the current ventricular conduction condition.

As such, in response to determining that LBB block criteria are met at block 678, control circuit 80 may compare the P-R interval determined when pacing is withheld to a P-R interval threshold (corresponding to a long P-R interval indicative of AV conduction block). When the P-R interval is greater than the threshold at block 680, control circuit 80 remains in the bilateral BB pacing therapy to correct the long P-R interval and the LBB block. Control circuit 80 may return to block 668 to wait for the next conduction check or pacing control parameter adjustment check (block 669).

If the P-R interval is not greater than the threshold interval at block 680, control circuit 80 may continue the conduction check by controlling therapy delivery circuit 84 to deliver LBB pacing without RBB pacing for one or more ventricular cycles at block 682 to determine if the QRS signal(s) present evidence of RBB block during LBB pacing. Analysis of the QRS signal during only LBB pacing at block 683 enables control circuit 80 to determine if RBB block is present, either pacing induced or due to an actual conduction block of the RBB, during LBB pacing. Control circuit 80 may adjust one or more pacing control parameters, e.g., by adjusting the LBB pacing interval (AV delay) to promote fusion of the paced electrical activation of the LBB with the intrinsic activation of the RBB during the analysis at blocks 683 and 684. For example, following each LBB pacing pulse, control circuit 80 may determine one or more QRS signal features for determining if RBB block criteria are met at block 684 and, if not, adjust the AV delay until the RBB block criteria are not met or until available adjustments are exhausted. When RBB block criteria are met, even after one or more AV delay adjustments, control circuit 80 may determine that the ventricular conduction condition has not changed from the bilateral BB block condition and continue to deliver bilateral BB pacing therapy. Control circuit 80 may return to block 668 to wait for the next conduction check or pacing control parameter adjustment check.

When RBB block criteria are not met at block 684 by the QRS feature(s) determined following an LBB pacing pulse (which may be after one or more adjustments of the AV delay), control circuit 80 may determine that the ventricular conduction condition is LBB block and change to the LBB pacing therapy (without RBB pacing) at block 686 to provide correction of the LBB block. An optimized AV delay to control the timing of the LBB pacing pulses may promote fusion with the intrinsic RBB electrical activation to provide adequate ventricular electrical synchrony, e.g., based on the QRS width being less than a threshold width, an activation time difference being less than a threshold difference, peak polarity pattern and/or other QRS signal features resembling a normal ventricular conduction condition, e.g., as generally described in conjunction with FIG. 9 above.

In FIG. 12, the conduction check is described as withholding all ventricular pacing first to determine intrinsic QRS signal features at block 672 to enable control circuit 80 to change to a minimized VCS pacing therapy at block 688 if the ventricular conduction condition has returned to a normal condition. If not, the conduction check continues by delivering pacing to one BB, e.g., the LBB, while withholding pacing from the other BB, e.g., the RBB, to determine if the ventricular conduction condition has changed to a single BB block condition. If so, bilateral BB pacing therapy is no longer needed and control circuit 80 may change to the single BB pacing therapy at block 686, e.g., to LBB pacing therapy in the example of FIG. 12. In other examples, control circuit 80 may perform the conduction check by withhold pacing from one BB first to determine if bilateral BB pacing is still required and, if not, continue the conduction check by withholding all ventricular pacing to determine if changing to minimized VCS pacing therapy is appropriate.

FIG. 13 is a diagram of EGM signals 702 and ECG signals 712 that may be sensed during a conduction check during an intrinsic ventricular cycle, when ventricular pacing is withheld. EGM signals 702 and ECG signals 712 are sensed when ventricular pacing is withheld at all pacing sites of a VCS pacing therapy and represent the intrinsic QRS signals for each sensing electrode vector signal. The EGM signals 702 and ECG signals 712 may be sensed during a conduction check during any of the VCS pacing therapies described herein. Control circuit 80 may withhold the VCS pacing pulse by extending the pacing interval to the longest available pacing interval, not starting an escape interval, or reducing the pacing pulse output below capture threshold at each ventricular pacing site. The EGM signals 702 include a unipolar LBB EGM signal 704 sensed using the BB pacing tip electrode 32 (in the area of the LBB) and housing 15 and a unipolar RBB EGM signal 706 sensed between the BB pacing ring electrode 34 (in the area of the RBB) and housing 15. A bipolar septal EGM signal 708 is sensed between the BB pacing tip electrode 32 and the BB pacing ring electrode 34. The bipolar septal EGM signal represents a local EGM signal in the area of the LBB and RBB. The bipolar LV epicardial EGM signal 710 is the bipolar EGM signal sensed between two CS lead electrodes 94, e.g., between the tip electrode 94d and one ring electrode 94a, 94b or 94c, carried by CS lead 92 (as shown in FIG. 2D). Control circuit 80 may receive two or more of these EGM signals 702 sensed by sensing circuit 86 during a conduction check for determining a ventricular conduction condition, e.g., for determining when LBB block criteria, RBB block criteria, bilateral BB block criteria or normal ventricular conduction criteria are met.

The bipolar septal and bipolar epicardial EGM signals 708 and 710 may be sensed for use by control circuit 80 in determining a septal-epicardial activation time difference 705. The septal-epicardial activation time 705 may be determined as the time interval from the onset of the QRS signal (e.g., determined based on a threshold crossing), maximum peak of the QRS signal, maximum slope, or other fiducial point of the QRS signal in the bipolar septal EGM signal 708 to the onset, maximum peak, maximum slope, or other fiducial point of the bipolar LV epicardial EGM signal 710. In the example shown the septal-epicardial activation time 705 is determined as the time interval from the onset of the QRS signal of the bipolar septal EGM signal 708 to the maximum positive peak of the bipolar LV epicardial EGM signal 710. The septal-epicardial activation time 705 is an indication of the time for an electrical depolarization to propagate from the interventricular septum to the LV myocardium of the lateral wall. When the septal-epicardial activation time 705 is relatively long, the propagation of the intrinsic electrical depolarization via the LBB to the LV myocardium may be blocked or delayed, indicating LBB block and a need for LBB pacing.

In other examples, the septal-epicardial activation time may be determined from a fiducial point, e.g., the maximum negative slope, of the unipolar LBB EGM signal 704 to the maximum peak of the bipolar LV epicardial EGM signal 710 or from a fiducial point such as the maximum negative slope of the unipolar RBB EGM signal 706 to the onset or maximum peak of the bipolar LV epicardial EGM signal 710. In still other examples, a unipolar epicardial EGM signal (not shown in FIG. 13) may be sensed and the septal-epicardial activation time may be determined from a fiducial point, such as the maximum negative slope or maximum peak amplitude, of the unipolar LBB EGM signal 704, unipolar RBB EGM signal 706 or bipolar septal EGM signal 708 to a fiducial point such as the maximum negative slope of the unipolar epicardial EGM signal. The unipolar EGM signal may be sensed between an electrode 94 carried by the CS lead 92 and a coil electrode 35 or housing 15.

Control circuit 80 may determine that LBB block criteria are met when the septal-epicardial activation time 705 is greater than a threshold activation time. For example, the septal-epicardial activation time 705 is approximately 165 ms in the example shown, which may be greater than a threshold activation time of 120 ms, as an example, corresponding to a maximum acceptable activation time for the LV depolarization to be conducted along the LBB branch to the LV myocardium of the lateral free wall. Control circuit 80 may determine a need for LBB pacing in response to the septal-epicardial activation time 705 being greater than the threshold activation time and either change to or remain in a VCS pacing therapy that includes LBB pacing. The septal-epicardial activation time threshold may be between 100 and 150 ms, as non-limiting examples, and may be tailored to an individual patient.

Additionally or alternatively, control circuit 80 may determine that LBB block criteria are met during a conduction check by determining an intrinsic QRS signal width from two or more EGM signals 702. In the example shown, the time interval from the onset of the QRS signal of the bipolar septal EGM signal 708 to the end (or offset) of the QRS signal of the bipolar LV epicardial EGM signal 710 may be determined as the EGM QRS signal width 707. In some examples, control circuit 80 may receive more than two EGM signals, such as signals 704, 706, 708 and 710, and identify the EGM signal having the earliest onset of the QRS signal and identify the EGM signal having the latest offset of the QRS signal. Control circuit 80 may determine the EGM QRS signal width as the time interval from the earliest onset to the latest offset. Control circuit 80 may determine that the EGM QRS signal width 707 meets LBB block criteria when the QRS signal width 707 is greater than a threshold QRS signal width, e.g., greater than 120 to 180 ms or greater than 140 ms as examples without limitation. When LBB block criteria are not met, the control circuit 80 may switch to (or remain in) the minimized LBB pacing therapy. While not shown in FIG. 13, when RV myocardial electrodes are available, a septal to RV myocardial activation time may be determined and/or a QRS signal width based on an offset of the RV myocardial QRS signal may be determined. These QRS signal features determined using RV myocardial electrodes may be useful in determining a RBB block condition.

In some instances, the ECG signals 712 may be sensed during the conduction check, for example at pacemaker implantation or during an office visit. External device processor 52 may analyze the ECG signals 712 for determining if LBB block criteria are met, warranting a VCS pacing therapy that includes LBB pacing. In this example, the intrinsic QRS signal width 707 determined from EGM signals 708 and 710 and the QRS signal width 717 determined from the ECG signals 712 is about 200 ms, which may be compared to a threshold QRS signal width, e.g., 120 to 180 ms.

Based on the analysis of two or more of the EGM signals 702 (and/or one or more ECG signals 712), control circuit 80 (or external device processor 52) may determine that LBB block criteria are met during a conduction check. When not met, and no other abnormal ventricular conduction condition is detected based on the QRS signal analysis, control circuit 80 may change to the minimized LBB pacing therapy. When LBB block criteria are met during a conduction check, control circuit 80 may change to (or remain in) a VCS pacing therapy that includes LBB pacing. However, control circuit 80 may perform additional QRS signal analysis when LBB pacing pulses are being delivered for determining if bilateral BB pacing or LBB plus LV myocardial pacing therapy is warranted for further improvement in ventricular electrical synchrony.

FIG. 14 is a diagram of EGM signals 722 and ECG signals 732 that may be sensed following a LBB pacing pulse, e.g., during a conduction check to determine if a pacing therapy change is needed or during a pacing control parameter adjustment check during LBB pacing therapy to determine if LBB pacing parameters should be adjusted. As described above, the EGM signals 722 may be analyzed during LBB pacing delivery for determining if RBB block criteria are met indicating a need for pacing control parameter adjustment or a need for bilateral BB pacing. The EGM signals 722 may include unipolar LBB tip electrode signal 724, a unipolar RBB ring electrode signal 726, the bipolar septal signal 728 and the bipolar LV epicardial signal 730 as generally described in conjunction with FIG. 13.

In FIG. 14, the EGM signals 722 and ECG signals 732 are recorded following a unipolar LBB pacing pulse delivered with 1.5 V pulse amplitude. During a periodic conduction check during bilateral BB pacing, for example (see block 682 of FIG. 12), control circuit 80 may control therapy delivery circuit 84 to deliver only LBB pacing, e.g., unipolar pacing of the LBB or using a relatively lower pacing pulse output during bipolar pacing, and withhold RBB pacing, to check for RBB block during LBB pacing. Control circuit 80 may perform the conduction check during the bilateral BB pacing therapy for determining if bilateral BB pacing is still needed. In other instances, the LBB pacing pulse may be delivered during the LBB pacing therapy and the EGM signals may be analyzed by control circuit 80 beat-by-beat or less frequently, e.g., during a pacing control parameter adjustment check, to determine if LBB pacing parameter adjustment, e.g., AV delay adjustment, is needed to correct LBB block and/or pacing-induced RBB block.

In the example of FIG. 14, control circuit 80 may determine the septal-epicardial activation time 725 from the pacing pulse 721 (or from the onset or maximum peak of the QRS signal of the bipolar septal EGM signal 728) to the maximum peak amplitude of the bipolar LV epicardial EGM signal 730. In this example, the septal-epicardial activation time 725 is approximately 165 ms, unchanged from the intrinsic septal-epicardial activation time 705 of FIG. 13. Control circuit 80 may compare the septal-epicardial activation time 725 following an LBB pacing pulse to the intrinsic activation time 705 (FIG. 13) and/or an activation time threshold and determine that the LBB block is not corrected, which may be due to not capturing the LBB or delivering the LBB pacing pulse at too long of an AV delay. A capture verification test may be performed by delivering early LBB pacing pulses, and, after capture is verified, the AV delay may be varied to determine if the LBB block can be corrected.

Additionally or alternatively, the QRS width 727 may be determined. In some examples, the QRS width can be determined by control circuit 80 from the LBB pacing pulse 721 (or the onset of the bipolar septal EGM signal 728) to the end of the bipolar LV epicardial EGM signal 730. The paced QRS width 727 may be compared to the intrinsic QRS width 707 (FIG. 13) and/or a QRS width threshold by control circuit 80. When the paced QRS width 727 and/or the septal-epicardial activation time 725 following an LBB pacing pulse is greater than a threshold, or equal to or within a threshold range of the intrinsic QRS width 707 or septal-epicardial activation time 705, respectively, control circuit 80 may determine that LBB pacing parameter adjustment criteria are met. In other examples, the external device processor 52 may determine an ECG QRS width 737 from the onset of the QRS signal to the end of the QRS signal, e.g., of the V5 or V6 ECG signal. Additionally or alternatively, external device processor 52 may determine the LV activation time 735 from the pacing pulse 721 to the maximum peak of the V5 or V6 ECG signal.

In this example, the paced septal-epicardial activation time 725 is about 165 ms, similar to the intrinsic activation time 705 and the paced QRS width 727 remains relatively long, about 140 ms. Control circuit 80 may determine that the LBB block is not corrected and that LBB pacing parameter adjustment criteria are met based on the comparison to the intrinsic activation time 705 and intrinsic QRS width 707 associated with a LBB block condition and/or by comparing the paced septal-epicardial activation time 725 and paced QRS width 727 to respective LBB block thresholds. Control circuit 80 may increase the pacing pulse output (to ensure LBB capture) during a capture verification test, decrease the LBB pacing interval set to an AV delay, and/or change the pacing electrode vector selected to pace the LBB to determine if an improvement (shortening) in the QRS width and/or LV activation time is detected.

In the example shown, the paced septal-epicardial activation time 725 is unchanged from the intrinsic septal-epicardial activation time 705, but the paced QRS width 727 is shortened somewhat to 140 ms from the intrinsic QRS width 707 of 200 ms. The shortening of the paced QRS width 727 relative to the intrinsic QRS width 707 may be evidence of myocardial capture in the interventricular septum without capture of the LBB. As such, control circuit 80 may increase the pacing pulse output to promote LBB capture and/or change the LBB pacing electrode vector.

FIG. 15 is a diagram of EGM signals 742 and ECG signals 752 that may be sensed during LBB pacing therapy after adjusting LBB pacing control parameters to correct LBB block. In other examples, the EGM signals 742 and ECG signal 752 may be sensed during a conduction check performed during the bilateral BB pacing therapy or the BB pacing plus LV myocardial pacing therapy when control circuit 80 withholds pacing of the RBB or the LV myocardium to determine if a change in the ventricular conduction condition warrants changing to LBB pacing therapy. Control circuit 80 may receive the EGM signals 742 from sensing circuit 86, which may include the unipolar LBB tip electrode signal 744, the unipolar RBB ring electrode signal 746, the bipolar septal signal 748 and the bipolar LV epicardial signal 750 as generally described in conjunction with FIG. 13.

In this example, control circuit 80 increases the pacing pulse output from 1.5 volts as in FIG. 14 to 5.0 volts during LBB pacing using a unipolar pacing electrode vector to pace the LBB. Control circuit 80 may determine the EGM septal-epicardial activation time 745 and/or the EGM QRS width 747 using the techniques described above. Control circuit 80 may compare the paced EGM septal-epicardial activation time 745 and paced EGM QRS width 747 to respective LBB block threshold values, to the analogous values determined from intrinsic QRS signals (as shown in FIG. 13) and/or to the analogous values determined during unipolar LBB pacing at a lower pacing pulse output (as shown in FIG. 14).

The septal-epicardial activation time 745 is decreased to about 138 ms from the septal-epicardial activation time (705 in FIG. 13) of about 165 ms during the intrinsic rhythm and during unipolar LBB pacing at the lower pacing pulse output (septal-epicardial activation time 725 in FIG. 14). Control circuit 80 may determine correction of LBB block based on the decrease in septal-epicardial activation time. The paced QRS width 747 determined from EGM signals 742 may also be shortened compared to the intrinsic EGM QRS width 707 and the EGM QRS width 727 during unipolar LBB pacing at a lower pacing pulse output.

When ECG signals 752 are received by external processor 52, the LV activation time 755 and/or the ECG QRS width 757 may be determined, using the example techniques described above. The ECG LV activation time 755 and ECG QRS width 757 show improvements (shortening) compared to the analogous values determined from intrinsic ECG signals 712 (FIG. 13) and the LBB paced ECG signals 732 during a lower pacing pulse output (FIG. 14). Based on this shortening of the septal-epicardial activation time 745, EGM QRS width 747, LV activation time 755 and/or ECG QRS width 757 to less than respective threshold values or previously determined values, control circuit 80 (or external device processor 52) may determine that LBB block criteria are not met and that the LBB block is corrected. In this example, increasing the pacing pulse output results in LBB capture. It is to be understood, however, that in some examples control circuit 80 may continue adjusting the pacing pulse output to determine the LBB capture threshold in order to set the pacing pulse output to a safety margin above the capture threshold and/or adjust the AV delay (as described in conjunction with FIG. 9) to provide optimized LBB block correction using the lowest pacing pulse energy required and a fine tuned AV delay.

Even though the septal-epicardial activation time 745 and EGM QRS width 747 are improved and may be less than the analogous values determined during the intrinsic ventricular rhythm, in some instances the septal-epicardial activation time 745 and/or the EGM QRS width 747 may still be longer than respective threshold values. LBB block may be corrected, however ventricular electrical synchrony may not be optimized. RBB block or an LV conduction delay may be present, e.g., due to a conduction delay in the Purkinje fibers. As such, in some examples control circuit 80 may determine if further improvement in ventricular electrical synchrony can be achieved by adding LV myocardial pacing by changing to VCS plus LV myocardial pacing therapy and/or by changing to bilateral BB pacing therapy for further analysis of the QRS signals.

FIG. 16 is a diagram of EGM signals 762 and ECG signals 772 that may be sensed during a VCS plus LV myocardial pacing therapy. Control circuit 80 may control therapy delivery circuit 84 to deliver a LBB pacing pulse and an LV myocardial pacing pulse simultaneously. In some examples, control circuit 80 may perform a comparative analysis of multiple EGM signals sensed by sensing circuit 86 using the electrodes available on the CS lead 92 in order to identify the EGM signal sensing site having the latest maximum peak, latest maximum negative slope, or other fiducial point of the QRS signal. The latest QRS signal corresponds to the latest electrical activation site out of the CS lead electrode locations. During a VCS pacing therapy that includes LV myocardial pacing, control circuit 80 may deliver the LV myocardial pacing pulses using the CS lead electrode identified to be associated with the latest electrical activation site.

Any of the EGM signals 764, 766, 768 and/or 770 corresponding to the unipolar LBB tip electrode signal, unipolar LBB ring electrode signal, bipolar septal signal and bipolar LV myocardial signal as generally described above, may be sensed by sensing circuit 86 and passed to control circuit 80 for analysis. As observed in FIG. 16, the septal-epicardial activation time 765, the EGM QRS width 767, the ECG LV activation time 775 and the ECG QRS width 777 during simultaneous LBB and LV myocardial pacing may be further shortened compared to the analogous EGM signal features during LBB pacing only (as shown in FIG. 15). Accordingly, control circuit 80 may determine, e.g., during a pacing parameter adjustment check during the LBB pacing therapy or during bilateral BB pacing therapy, that pacing therapy change criteria are met based on a conduction delay that is not fully corrected and is further improved, e.g., based on the improvement (shortening) in activation times and/or QRS widths, in response to VCS plus LV myocardial pacing.

Figure 17:
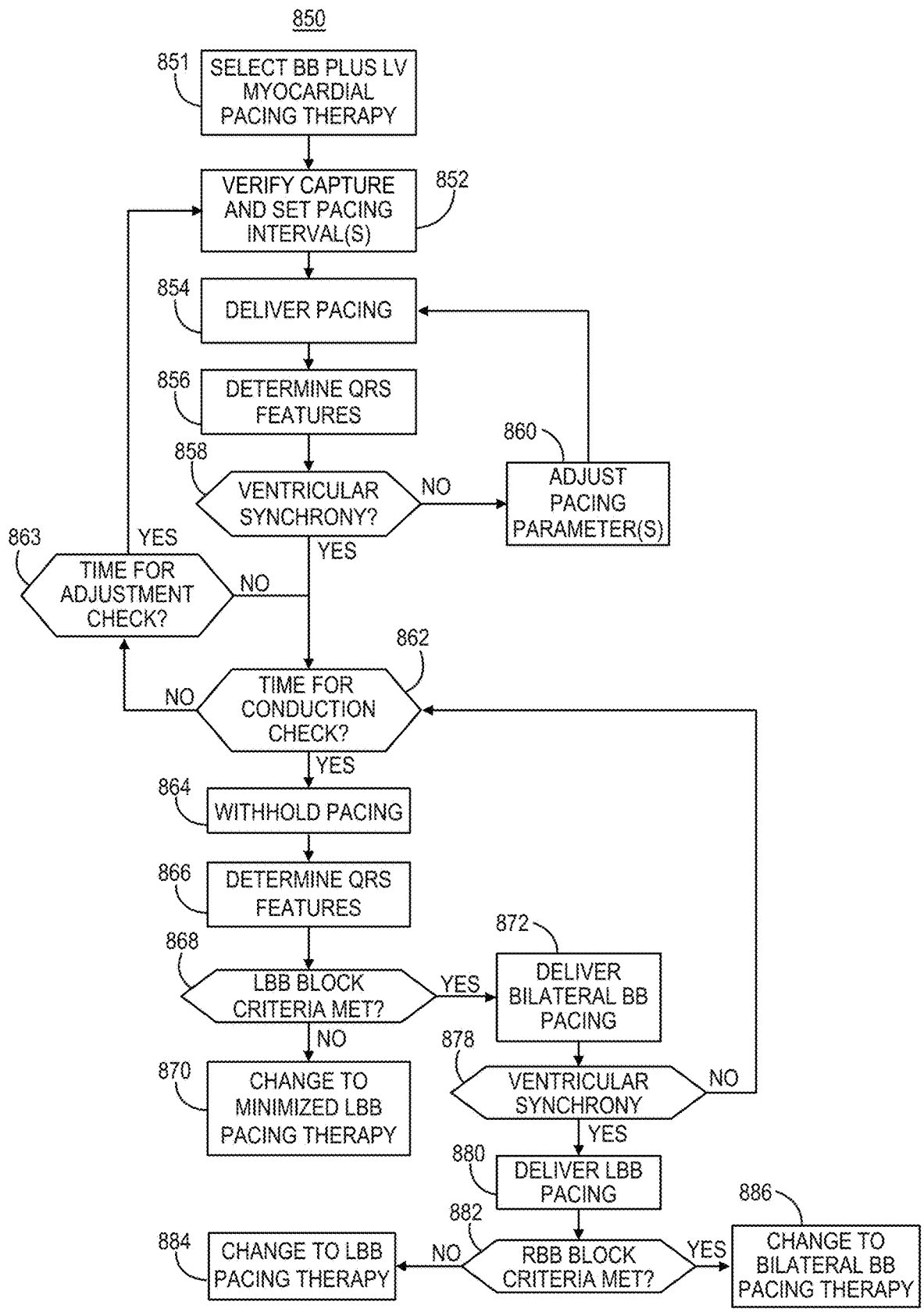
FIG. 17 is a flow chart of a method for controlling delivery of the VCS plus LV myocardial pacing therapy according to one example.

FIG. 17 is a flow chart 850 of a method for controlling delivery of the VCS plus LV myocardial pacing therapy according to one example. At block 851, control circuit 80 selects the VCS plus LV myocardial pacing therapy, e.g., based on a ventricular conduction condition or results of a pacing control parameter adjustments that do not fully resolve a conduction abnormality when LV myocardial pacing is not included. The VCS plus LV myocardial pacing therapy may include LBB pacing, RBB pacing or bilateral BB pacing in addition to the LV myocardial pacing in various examples. For example LBB pacing plus LV myocardial pacing therapy may be selected based on LBB block criteria being met without RBB block criteria being met but a relatively wide QRS width or long septal to myocardial activation time remaining after optimizing the AV delay during LBB pacing. Bilateral BB pacing plus LV myocardial pacing may be selected when pacing induced RBB block criteria exists or the intrinsic P-R interval is relatively long.

At block 852, control circuit 80 may verify pacing capture at each ventricular pacing site. Each pacing site may be paced, one at a time, by delivering an early pacing pulse to verify capture based on detecting an evoked response following the pacing pulse. After verifying capture at each pacing site, control circuit 80 may set the VCS plus LV myocardial pacing interval, e.g., to an AV delay, for providing atrial synchronous ventricular pacing. In other examples, non-atrial tracking VCS plus LV myocardial pacing therapy may be delivered by setting the pacing interval to a LRI, which may be a rate response pacing rate. As described below, pacing intervals set at block 852 may include a VV delay used to control a pacing interval between two ventricular pacing sites, e.g., between a BB pacing site and the LV myocardial pacing site.

At block 854, therapy delivery circuit 84 may deliver the VCS plus LV myocardial pacing pulse in response to the expiration of the pacing interval. Control circuit 80 may determine one or more features of the QRS signal(s) immediately following the pacing pulse at block 856, such as any of the QRS signal features described above. At block 858, control circuit 80 may determine if ventricular synchrony criteria are met by the QRS feature(s). For example, the QRS width and/or septal to myocardial activation time may be compared to respective thresholds as described above in conjunction with FIG. 16. The threshold QRS width may be a default threshold value. In other examples the threshold QRS width may be based on the QRS width determined when VCS plus LV myocardial pacing is not delivered, e.g., during only LBB pacing, during bilateral BB pacing or during no ventricular pacing, e.g., as described in conjunction with FIGS. 13-16. In this way, the ventricular synchrony criteria may be determined to be met when the QRS width is relatively narrower following the VCS plus LV myocardial pacing pulse compared to when the LV myocardium is not being paced. Ventricular synchrony criteria may be met when LBB block criteria are not met and pacing-induced RBB block is not detected and the QRS width and/or septal to epicardial activation time are shorter than when LV myocardial pacing is not delivered along with VCS pacing.

If control circuit 80 determines that ventricular synchrony criteria are not met, control circuit 80 may adjust a pacing control parameter at block 860. Control circuit 80 may perform a capture threshold search and increase the pacing pulse output delivered to one or more of the ventricular pacing sites to promote capture of the LV myocardium and at least one BB, for example. In other examples, a different pacing electrode vector may be selected for delivering the LV myocardial pacing pulses. For example, a different CS lead electrode 94 may be selected as the cathode electrode for delivering the LV myocardial pacing pulse to a pacing site corresponding to the latest activation site when LV myocardial pacing is not being delivered. When capture has already been verified at block 852, control circuit 80 may adjust the AV delay used to control the VCS plus LV myocardial pacing pulse timing, e.g., to reduce the likelihood of pacing-induced RBB block.

In some examples, control circuit 80 may be configured to deliver the VCS plus LV myocardial pacing pulses with a VV delay separating the timing of the pacing pulses delivered to different ventricular sites. For example, if bilateral BB plus LV myocardial pacing is being delivered, control circuit 80 may deliver the LBB plus LV myocardial pacing pulses simultaneously at a VV delay after (or before) the RBB pacing pulse, the earliest of which may be delivered at a desired AV delay after an atrial pacing pulse or sensed atrial P-wave. In another example, if LBB plus LV myocardial pacing is being delivered, the LBB pacing pulse may be delivered at an AV delay and the LV myocardial pacing pulse may be delivered at a VV delay relative to the LBB pacing pulse. The VV delay may be set to pace the LV myocardium earlier than the LBB in some instances. Control circuit 80 may be configured to adjust one or more pacing control parameters at block 760, e.g., an AV delay or VV delay. In some cases, pacing control parameter adjustment may include adjusting a pacing electrode vector used to pace the LV myocardium at the latest intrinsic activation site.

The process of determining QRS features at block 856 and determining if ventricular synchrony criteria are met at block 858 may be performed by control circuit 80 upon initially switching to the VCS plus LV myocardial pacing therapy and repeated periodically when it is time for a pacing control parameter adjustment check (as determined at block 863) or beat-by-beat to maintain capture of each pacing site and promote ventricular electrical synchrony. During the VCS plus LV myocardial pacing therapy, control circuit 80 may periodically perform a conduction check to determine if LV myocardial pacing is still needed to achieve optimal ventricular electrical synchrony or if the ventricular conduction condition has changed.

At block 862, control circuit 80 may determine if it is time for a conduction check, which may be based on a scheduled time of day or scheduled time interval. If it is not time for a conduction check, therapy delivery circuit 84 continues delivering VCS plus LV myocardial pacing therapy according to current pacing control parameters. Control circuit 80 waits for the time for a conduction check or returns to block 852 to perform a periodic capture verification or capture threshold test or for testing different AV and/or VV delays if it is time for checking for pacing control parameter adjustment. For example, control circuit 80 may perform a capture verification test by pacing each site individually at a shortened pacing interval once a day or other scheduled frequency. If capture is not verified at a given site, the pacing pulse output may be varied until the pacing capture threshold is determined to adjust the pacing pulse output delivered to a given site to a safety margin above the capture threshold. In conjunction with the pacing capture verification or at independently scheduled times, control circuit 80 may control therapy delivery circuit 84 to deliver the VCS pacing pulses and LV myocardial pacing pulses at varying AV and/or VV delays to optimize the timing of the ventricular pacing pulse delivery at each pacing site to promote the greatest ventricular electrical synchrony.

When it is time for a conduction check, control circuit 80 may withhold the VCS plus LV myocardial pacing pulses for one or more cardiac cycles at block 864, e.g., by not scheduling the pacing pulses (by not starting a pacing interval) or by setting the pacing interval to an extended interval to allow an intrinsic QRS to occur before the extended pacing interval expires or by reducing the pacing pulse output below the capture threshold for each pacing site.

Control circuit 80 may determine one or more intrinsic QRS signal features at block 866 during at least one non-paced ventricular cycle. Control circuit 80 may determine an activation time, an activation time difference, a QRS width, maximum peak or timing thereof, maximum positive slope or timing thereof, maximum negative slope or timing thereof, peak polarity pattern, QRS morphology match score, or other QRS features or combination of features from one or more sensed cardiac electrical signals as described in any of the examples given above for determining the ventricular conduction condition. In some examples, control circuit 80 may determine a P-R interval at block 866 for determining the ventricular conduction condition. In some examples, control circuit 80 may compare the determined QRS signal features to LBB block criteria at block 868. If the LBB block criteria are not met, control circuit 80 may change to the minimized LBB pacing therapy at block 870. If LBB block criteria are met at block 868, at least LBB pacing on a beat-by-beat basis may still be needed. However bilateral BB pacing and/or LV myocardial pacing may or may not be required depending on the current ventricular conduction condition.

As such, in response to determining that LBB block criteria are met at block 868, control circuit 80 may control therapy delivery circuit 84 to deliver a bilateral BB pacing pulse at block 872. Control circuit 80 may determine QRS signal features to determine if ventricular synchrony criteria are met at block 878. If a QRS width and/or septal to epicardial activation time is still relatively long, for example, control circuit 80 may determine that ventricular synchrony criteria are not met during bilateral BB pacing. Control circuit 80 may determine that an LV conduction delay condition exists and that therapy change criteria are not met. Control circuit 80 may remain in the VCS plus LV myocardial pacing therapy and return to block 862 to wait for the next conduction check or pacing control parameter adjustment check.

If the ventricular synchrony criteria are determined to be met by QRS signal features determined following bilateral BB pacing pulses at block 878, control circuit 80 may continue the conduction check by controlling therapy delivery circuit 84 to deliver LBB pacing at block 880. Control circuit 80 may determine QRS signal features following the LBB pacing pulse to determine if RBB block criteria are met. If RBB block criteria are not met, control circuit 80 may determine that the ventricular conduction condition is a LBB conduction block. In this case, therapy change criteria are met, and control circuit 80 may change from the VCS plus LV myocardial pacing therapy to the LBB pacing therapy at block 884.

In some examples, control circuit 80 may determine that the P-R interval, which may be determined from the intrinsic EGM signal, is greater than a threshold. When the P-R interval is greater than the threshold, control circuit 80 may determine that RBB block criteria are met and change from the VCS plus LV myocardial pacing therapy to bilateral BB pacing therapy at block 886.

Control circuit may control therapy delivery circuit 84 to deliver LBB pacing without RBB pacing for one or more ventricular cycles at block 880 to determine if the paced QRS signal(s) presents evidence of RBB block during LBB pacing. Analysis of the QRS signal during only LBB pacing at block 882 enables control circuit 80 to determine if RBB block is present, either pacing induced or due to an actual conduction block of the RBB, during LBB pacing. Control circuit 80 may adjust one or more pacing control parameters, e.g., by adjusting the LBB pacing interval set to an AV delay to promote fusion of the paced electrical activation of the LBB with the intrinsic activation of the RBB during the analysis at 882 as described above. When RBB block criteria are met, even after one or more AV delay adjustments during LBB pacing, control circuit 80 may select the bilateral BB pacing therapy at block 886.

In this way, control circuit 80 may perform a conduction check during the various VCS pacing therapies by determining a ventricular conduction condition based on intrinsic QRS signal analysis (when ventricular pacing is withheld) for determining if therapy change criteria are met. Depending on the currently selected VCS pacing therapy, control circuit 80 may also determine a ventricular conduction condition by withholding pacing at the most recently added pacing site(s) to determine if pacing at the added pacing site(s) is/are still needed. As such, the conduction check may be performed by pacing at fewer sites than the combination of ventricular pacing sites of a given VCS pacing therapy. While the analysis of QRS signals during intrinsic ventricular cycles, LBB paced cycles and bilateral BB paced cycles is shown in a particular order in FIG. 17, it is to be understood that the QRS signal analysis during ventricular cycles that are paced using fewer pacing sites than the VCS plus LV myocardial pacing therapy and during intrinsic ventricular cycles may be performed in a different order or in different combinations than the order shown in FIG. 17 in order to determine a ventricular conduction condition and select the most appropriate VCS pacing therapy for promoting ventricular electrical synchrony and corresponding hemodynamic benefit by pacing the fewest ventricular pacing sites needed according to the ventricular conduction condition.

Therefore, in some examples the VCS pacing therapy may be changed to a therapy that includes fewer ventricular pacing sites based on a determination of the ventricular conduction condition by control circuit 80. When the pacing therapy is minimized VCS pacing therapy, and a BB block or other abnormal conduction condition is detected during a conduction check, the VCS pacing therapy may be changed to increase the ventricular pacing burden or percentage of paced ventricular cycles. The VCS pacing therapy may be changed to a therapy that includes more ventricular pacing sites based on an analysis of QRS signals during pacing parameter adjustments, e.g., AV delay adjustments, when an abnormal ventricular conduction condition or conduction delay is not corrected by adjusting pacing control parameters.

It should be understood that, depending on the example, certain acts or events of any of the methods described herein can be performed in a different sequence, in parallel, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single processor, circuit or unit for purposes of clarity, it should be understood that the techniques of this disclosure may be performed by a combination of processors, units or circuits associated with, for example, a medical device system.

In one or more examples, the functions described may be implemented in hardware, software, firmware, or any combination thereof. If implemented in software, the functions may be stored as one or more instructions or code on a computer-readable medium and executed by one or more hardware-based processing units. Computer-readable media may include computer-readable storage media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

Thus, a medical device system has been presented in the foregoing description with reference to specific examples. It is to be understood that various aspects disclosed herein may be combined in different combinations than the specific combinations presented in the accompanying drawings. It is appreciated that various modifications to the referenced examples may be made without departing from the scope of the disclosure and the following claims.

What is claimed is:

1. A medical device, comprising:
   a sensing circuit configured to sense at least one cardiac electrical signal;
   a therapy delivery circuit configured to generate first pacing pulses according to a first pacing therapy by generating the first pacing pulses for delivery to a first combination of ventricular pacing sites for capturing the first combination of ventricular pacing sites during a first percentage of ventricular cycles of all ventricular cycles during a given time period, the first combination of ventricular pacing sites comprising at least a first ventricular conduction system pacing site; and
   a control circuit configured to:
      control the therapy delivery circuit to withhold a pacing pulse of the first pacing pulses from at least one ventricular pacing site of the first combination of ventricular pacing sites for at least one ventricular cycle;
      determine a QRS signal feature from the at least one cardiac electrical signal sensed by the sensing circuit during the at least one ventricular cycle; and
      determine a ventricular conduction condition by determining a normal intrinsic ventricular conduction condition based on the QRS signal feature;
   wherein the therapy delivery circuit is further configured to generate second pacing pulses according to a second pacing therapy different than the first pacing therapy by generating the second pacing pulses for capturing the first combination of ventricular pacing sites during a second percentage of ventricular cycles that is less than the first percentage of ventricular cycles in response to the control circuit determining the normal intrinsic ventricular conduction condition.

2. The medical device of claim 1, wherein the therapy delivery circuit is configured to generate the first pacing pulses for delivery to the first combination of ventricular pacing sites comprising at least the first ventricular conduction system pacing site by generating first pacing pulses for delivery to a left bundle branch.

3. The medical device of claim 1, wherein
the control circuit is configured to
control the therapy delivery circuit to withhold a pacing pulse of the first pacing pulses from at least one ventricular pacing site by withholding a pacing pulse from each ventricular pacing site of the first combination of ventricular pacing sites.

4. The medical device of claim 1, wherein:
the control circuit is further configured to:
determine a heart rate from the at least one cardiac electrical signal sensed by the sensing circuit; and
determine that the heart rate is less than a threshold rate; and
the therapy delivery circuit is configured to generate the second pacing pulses according to the second pacing therapy in response to the control circuit determining that the heart rate is less than the threshold rate.

5. The medical device of claim 1, further comprising an activity sensor sensing a patient activity signal,
wherein the control circuit is further configured to:
determine a pacing rate based on the patient activity signal, and
determine when the pacing rate is less than a threshold rate; and
wherein the therapy delivery circuit is configured to generate the second pacing pulses according to the second pacing therapy in response to the control circuit determining that the pacing rate is less than the threshold rate.

6. The medical device of claim 1, wherein:
the control circuit is further configured to determine a time of day; and
the therapy delivery circuit is configured to generate the second pacing pulses according to the second pacing therapy based on the time of day.

7. The medical device of claim 1, wherein the therapy delivery circuit is configured to generate the first pacing pulses for delivery to the first combination of ventricular pacing sites by generating the first pacing pulses for delivery to the first ventricular conduction system pacing site and at least one of a second ventricular conduction system pacing site and a myocardial pacing site.

8. The medical device of claim 1, wherein:
the control circuit is further configured to detect ventricular conduction block during the second pacing therapy; and
the therapy delivery circuit is configured to change from generating the second pacing pulses according to the second pacing therapy to generating the first pacing pulses according to the first pacing therapy in response to the control circuit detecting the ventricular conduction block during the second pacing therapy.

9. The medical device of claim 1, wherein the therapy delivery circuit is configured to generate the second pacing pulses according to the second pacing therapy by generating the second pacing pulses for delivery to a second combination of ventricular pacing sites, wherein the second combination of ventricular pacing sites is different than the first combination of ventricular pacing sites.

10. The medical device of claim 9, wherein the therapy delivery circuit is further configured to:
generate the first pacing pulses for delivery to the first combination of ventricular pacing sites by generating the first pacing pulses for delivery to the first ventricular conduction system pacing site and at least one of a second ventricular conduction system pacing site and a myocardial pacing site; and
generate the second pacing pulses according to the second pacing therapy by generating the second pacing pulses for delivery to the second combination of ventricular pacing sites comprising fewer ventricular pacing sites than the first combination of ventricular pacing sites.

11. The medical device of claim 1,
wherein the therapy delivery circuit is configured to generate the second pacing pulses according to the second pacing therapy by generating the second pacing pulses for delivery to the first combination of ventricular pacing sites comprising only the first ventricular conduction system pacing site.

12. The medical device of claim 1, wherein:
the therapy delivery circuit is further configured to generate each of the first pacing pulses according to the first pacing therapy by generating each of the first pacing pulses at an expiration of a pacing interval; and
the control circuit is further configured to:
control the therapy delivery circuit during the first pacing therapy to generate a test pacing pulse for delivery to at least one ventricular pacing site of the first combination of ventricular pacing sites at an expiration of each one of a plurality of test pacing intervals;
determine a QRS signal feature from the cardiac electrical signal sensed by the sensing circuit following each one of the plurality of test pacing pulses;
determine a corrected ventricular conduction block condition associated with one test pacing interval of the plurality of test pacing intervals based on the determined QRS signal features from the cardiac electrical signal sensed by the sensing circuit following each one of the plurality of test pacing pulses; and
set the pacing interval to the one test pacing interval associated with the corrected bundle branch block condition.

13. The medical device of claim 1, wherein:
the therapy delivery circuit is further configured to deliver each of the first pacing pulses according to the first pacing therapy by generating each of the first pacing pulses at an expiration of a pacing interval; and
the control circuit is further configured to:
control the therapy delivery circuit during the first pacing therapy to generate a test pacing pulse to at least one ventricular pacing site of the first combination of ventricular pacing sites at an expiration of each one of a plurality of test pacing intervals;
determine a QRS signal feature from the cardiac electrical signal sensed by the sensing circuit following each one of the plurality of test pacing pulses; and
determine an uncorrected ventricular conduction block condition associated with each test pacing interval of the plurality of test pacing intervals based on the QRS signal features determined from the cardiac electrical signal sensed by the sensing circuit following each one of the plurality of test pacing pulses; and
wherein the therapy delivery circuit is configured to generate third pacing pulses according to a third pacing therapy different than the first pacing therapy in response to the control circuit determining the uncorrected ventricular conduction block condition, wherein the third pacing therapy comprises a third combination of ventricular pacing sites including more ventricular pacing sites than the first combination of ventricular pacing sites.

14. The medical device of claim 13, wherein the therapy delivery circuit is configured to generate the third pacing pulses according to the third pacing therapy by generating the third pacing pulses for delivery to at least the first ventricular conduction system pacing site and at least one of a second ventricular conduction system pacing site and a ventricular myocardial pacing site.

15. The medical device of claim 13, wherein the therapy delivery circuit is configured to set the pacing interval to one of an atrioventricular delay and a ventricular-to-ventricular delay.

16. The medical device of claim 1, wherein the control circuit is configured to determine the QRS signal feature by determining at least one of:
a QRS width, a peak amplitude, a peak amplitude time, a maximum positive slope, a maximum negative slope, a maximum positive slope time, a maximum negative slope time, a QRS area, and a peak polarity.

17. The medical device of claim 1, wherein:
the sensing circuit is configured to sense a first cardiac electrical signal from a first sensing electrode vector and a second cardiac electrical signal from a second sensing electrode vector;
the control circuit is further configured to determine the QRS signal feature by determining an activation time difference as a time interval from a first fiducial point of a first QRS signal of the first cardiac electrical signal to a second fiducial point of a second QRS signal of the second cardiac electrical signal; and
determine the ventricular conduction condition based on the activation time difference.

18. The medical device of claim 1, wherein the control circuit is further configured to:
control the therapy delivery circuit during the first pacing therapy to generate a capture test pacing pulse for delivery to each ventricular pacing site of the first combination of ventricular pacing sites at a premature pacing interval; and
verify capture of each ventricular pacing site based on the at least one cardiac electrical signal sensed by the sensing circuit following each of the capture test pacing pulses.

19. The medical device of claim 1, wherein:
the control circuit is further configured to:
control the therapy delivery circuit during the first pacing therapy to generate a capture test pacing pulse for delivery to each ventricular pacing site of the first combination of ventricular pacing sites at a premature pacing interval; and
determine loss of capture of at least one ventricular pacing site based on the at least one cardiac electrical signal sensed by the sensing circuit following each of the capture test pacing pulses; and the therapy delivery circuit is configured to adjust at least one of a pacing pulse amplitude, pacing pulse width, and pacing electrode vector for delivering generated pacing pulses of the first pacing pulses to the at least one ventricular pacing site associated with the determined loss of capture.

20. The medical device of claim 1 wherein:
the therapy delivery circuit is further configured to generate the first pacing pulses for delivery to the first combination of ventricular pacing sites by generating the first pacing pulses for delivery to at least two ventricular pacing sites comprising the first ventricular conduction system pacing site and a second ventricular pacing site; and
the control circuit is further configured to control the therapy delivery circuit to withhold a pacing pulse of the first pacing pulses from at least one ventricular pacing site of the first combination of ventricular pacing sites by withholding the pacing pulse from only the second ventricular pacing site of the first combination of ventricular pacing sites.

21. A non-transitory, computer-readable medium storing a set of instructions which, when executed by a control circuit of a medical device, cause the medical device to:
sense at least one cardiac electrical signal;
generate first pacing pulses according to a first pacing therapy by generating the first pacing pulses for delivery to a first combination of ventricular pacing sites for capturing the first combination of ventricular pacing sites during a first percentage of ventricular cycles of all ventricular cycles during a given time period, the first combination of ventricular pacing sites comprising at least a first ventricular conduction system pacing site;
withhold a pacing pulse of the first pacing pulses from at least one ventricular pacing site of the first combination of ventricular pacing sites for at least one ventricular cycle;
determine a QRS signal feature from the at least one cardiac electrical signal sensed by the sensing circuit during the at least one ventricular cycle; and
determine a ventricular conduction condition by determining a normal intrinsic ventricular conduction condition based on the QRS signal feature; and
generate second pacing pulses according to a second pacing therapy different than the first pacing therapy by generating the second pacing pulses for capturing the first combination of ventricular pacing sites during a second percentage of ventricular cycles that is less than the first percentage of ventricular cycles in response to the control circuit determining the normal intrinsic ventricular conduction condition.

* * * * *